US011393035B2

(12) United States Patent
Kmak et al.

(10) Patent No.: US 11,393,035 B2
(45) Date of Patent: Jul. 19, 2022

(54) SYSTEM AND METHOD FOR EVALUATING A SERVICE PROVIDER OF A RETIREMENT PLAN

(71) Applicant: Fiduciary Benchmarks Insights, LLC, Lake Oswego, OR (US)

(72) Inventors: Thomas R. Kmak, Scottsdale, AZ (US); Matthew A. Golda, Sherwood, OR (US); Craig S. Rosenthal, Southbury, CT (US)

(73) Assignee: Fiduciary Benchmarks Insights, LLC, Lake Oswego, OR (US)

( * ) Notice: Subject to any disclaimer, the term of this patent is extended or adjusted under 35 U.S.C. 154(b) by 330 days.

(21) Appl. No.: 14/693,800

(22) Filed: Apr. 22, 2015

(65) Prior Publication Data
US 2015/0254778 A1    Sep. 10, 2015

Related U.S. Application Data

(63) Continuation-in-part of application No. 14/519,974, filed on Oct. 21, 2014.

(60) Provisional application No. 61/894,358, filed on Oct. 22, 2013.

(51) Int. Cl.
   *G06Q 40/06*    (2012.01)
(52) U.S. Cl.
   CPC .................... *G06Q 40/06* (2013.01)
(58) Field of Classification Search
   CPC ...................................................... G06Q 40/08
   USPC .......................................................... 705/4
   See application file for complete search history.

(56) References Cited

U.S. PATENT DOCUMENTS

| | | | |
|---|---|---|---|
| 6,799,184 | B2 | 9/2004 | Bhatt et al. |
| 7,590,582 | B2 | 9/2009 | Dunne |
| 7,698,158 | B1 | 4/2010 | Flagg |
| 7,840,470 | B2 | 11/2010 | Robinson |
| 8,060,428 | B1 | 11/2011 | Abrahamson |
| 8,200,562 | B2 | 6/2012 | Sheridan |
| 8,260,682 | B2 | 9/2012 | Rigole |
| 8,392,280 | B1 | 3/2013 | Kilshaw |
| 8,510,198 | B2 | 8/2013 | Kmak et al. |

(Continued)

OTHER PUBLICATIONS

"Assessing reasonableness of 403(b) retiremnet plan fees:—TIAA Cref—Jan. 2012, in U.S. Appl. No. 13/963,687 (12 pages)".

(Continued)

*Primary Examiner* — Cho Kwong
(74) *Attorney, Agent, or Firm* — Neal, Gerber & Eisenberg LLP; Thomas E. Williams

(57) ABSTRACT

A system and method for analyzing a service provider of a retirement plan and comparing the service provider against the service providers associated with a group of similar plans is disclosed. In one embodiment, a computer system for evaluating a service provider of a retirement plan comprises a computer server having a database comprising a plurality of data defining a plurality of characteristics of each of a plurality of retirement plans, software configured to identify a subset of the plurality of retirement plans having characteristics comparable to characteristics of the selected retirement plan in view of the type and characteristics of the service provider, software configured to permit the selection of at least one report providing the comparison of the service provider, and software configured to automatically generate and deliver the selected at least one report to a user for display on a user interface.

22 Claims, 91 Drawing Sheets

(56) References Cited

U.S. PATENT DOCUMENTS

| | | | |
|---|---|---|---|
| 2002/0007332 | A1 | 1/2002 | Johnson et al. |
| 2002/0032639 | A1 | 3/2002 | Hausken et al. |
| 2002/0077951 | A1 | 6/2002 | Gilbert et al. |
| 2003/0144868 | A1 | 7/2003 | Macintyre et al. |
| 2004/0138950 | A1 | 7/2004 | Hyman et al. |
| 2004/0225548 | A1 | 11/2004 | Aldrich |
| 2005/0187804 | A1 | 8/2005 | Clancy et al. |
| 2006/0149651 | A1 | 7/2006 | Robinson |
| 2006/0149688 | A1 | 7/2006 | Laubie |
| 2006/0248008 | A1 | 11/2006 | Lind |
| 2007/0038542 | A1 | 2/2007 | Armstrong |
| 2007/0168302 | A1 | 7/2007 | Giovinazzo et al. |
| 2009/0030740 | A1 | 1/2009 | Robinson |
| 2010/0121780 | A1 | 5/2010 | Sheridan |
| 2013/0090978 | A1 | 4/2013 | Vaughn |
| 2013/0325752 | A1 | 12/2013 | Kmak et al. |

OTHER PUBLICATIONS

"BrightScope About Page. Web page [online]. BrightScope, Inc., 2008-2009 [retrieved on Feb. 2009]. Retrieved from the Internet: ; (3 pages)".

"BrightScope Fact Sheet. Web page [online]. BrightScope Inc., 2008-2009 [retrieved on Feb. 9, 2009]. Retrieved from the Internet: ; (3 pages)".

"BrightScope Frequently Asked Questions (FAQ). Web page [online]. BrightScope, Inc., 2008-2009 [retrieved on Feb. 9, 2009]. Retrieved from the Internet: ; (13 pages)".

"BrightScope Glossary. Web page [online]. BrightScope Inc., 2008-2009 [retrieved] on Feb. 9, 2009] Retrieved from the Internet: ; (11 pages)."

"BrightScope History. Web page [online]. BrightScope, Inc., 2008-2009 [retrieved on Feb. 9, 2009]. Retrieved from the Internet: ; (2 pages)".

"BrightScope Homepage. Web page [online]. BrightScope, Inc., 2008-2009 [retrieved on Feb. 9, 2009]. Retrieved from the Internet: ; (1 page)".

"BrightScope in the News. Web page [online]. BrightScope, Inc., 2008-2009 [retrieved on Feb. 9, 2009]. Retrieved from the Internet: ; (3 pages)".

"BrightScope Newsroom. Web page [online]. BrightScope, Inc., 2008-2009 [retrieved on Feb. 9, 2009]. Retrieved from the Internet: ; (2 pages)".

"BrightScope Press Contact. Web page [online]. BrightScope, Inc., 2008-2009 [retrieved on Feb. 9, 2009]. Retrieved from the Internet: ; (2 page)".

"BrightScope Press Releases. Web page [online]. BrightScope, Inc., 2008-2009 [retrieved on Feb. 9, 2009]. Retrieved from the Internet: ; (3 pages)".

"BrightScope Qualcomm Incorporated 401k Rating. Web page [online]. BrightScope, Inc., 2008-2009 [retrieved on Feb. 9, 2009]. Retrieved from the Internet: ; (4 pages)".

"BrightScope Ratings. Web page [online]. BrightScope, Inc., 2008-2009 [retrieved on Feb. 9, 2009]. Retrieved from the Internet: ; (25 pages)".

"BrightScope Snap-On Incorporated 401k Rating. Web page [online]. BrightScope, Inc., 2008-2009 [retrieved on Feb. 9, 2009]. Retrieved from the Internet: ; (3 pages)".

"Determining reasonableness of retirement plan fees—Vanguard Sep. 2001, in U.S. Appl. No. 13/963,687 (7 pages)".

"Employee Benefit Resources—Retirement Plan Comparison Mar. 2014, in U.S. Appl. No. 13/963,687 (5 pages)."

"The Spark Institute; Testimony of Larry H. Goldburm, Esq., General Counsel, The SPARK Institute Before the United States Department of Labor Employment Benfits Security Administration Regarding the "Proposed 408(b)(2) Regulations Amendment"; Mar. 31, 2008; (4 pages)".

Table of Contents

Fiduciary Benchmarks
Independent | Comprehensive | Informative

INTRODUCTION

| | |
|---|---|
| Table of Contents | 1 |
| Reader's Guide | 2 |

INVESTMENT MANAGERS

| | |
|---|---|
| Benchmark Group | 3 |
| Total Expense Ratio Reasonableness | 4-5 |
| Investment Structure | 6 |
| Stable Value Option | 7 |
| Guaranteed Rate General Account Option | 8 |

RECORDKEEPER

| | |
|---|---|
| Benchmark Group | 9 |
| Summary | 10 |
| Quality of Service Provider | 11 |
| Fee Details | 12-14 |
| Participant Elected Service Fees | 15 |
| Plan Complexity | 16 |
| Recordkeeping Services | 17 |
| Administration Services | 18 |
| Compliance and Consulting Services | 19 |
| Communication and Education Services | 20 |

ADVISOR/CONSULTANT

| | |
|---|---|
| Benchmark Group | 21 |
| Summary | 22 |
| Quality of Service Provider | 23 |
| Fee Details | 24 |
| Investment Services | 25 |
| Vendor Management Services | 26 |
| Plan Management Services | 27 |
| Participant Services | 28 |

RETIREMENT READINESS

| | |
|---|---|
| Key Concepts | 29 |
| Participant Success Measures | 30 |
| Employer Contribution Comparison | 31 |

TOTAL PLAN FEE DETAIL

| | |
|---|---|
| Summary | 32-33 |
| Total Expense Ratio Breakdown | 34 |

APPENDIX

| | |
|---|---|
| Glossary | 35 |
| Disclosures | 36 |

Report Key

The following designations are referred to throughout the report:

Chart Designations
■ = This Plan
☐ = Benchmark Group/Standard

Blue = Greater than Median
Red = Less than Median

Page 1 of 36

FIG. 8

Reader's Guide

The intent of this report is to facilitate a prudent process that assists the Plan Fiduciary in insuring that the fees they pay their service providers are "reasonable". As such, each section provides both fees and value as well qualitative considerations. As you review this report please consider the following direction from the U.S. DOL to plan participants: "When you consider the fees in your 401(k) plan and their impact on your retirement income, remember that all services have costs. If your employer has selected a bundled program of services and investments, compare all services received with the total cost. Remember, too, that higher investment management fees do not necessarily mean better performance. Nor is cheaper necessarily better. Compare the net returns relative to the risks among available investment options. And, finally, don't consider fees in a vacuum. They are only one part of the bigger picture including investment risk and returns and the extent and quality of services provided."

– A Look at 401(k) Plan Fees, U.S. Department of Labor
October 2010

Fiduciary Benchmarks
Independent | Comprehensive | Informative

| What the Law Requires | How to Use this Report | About Our Firm |
|---|---|---|
| Fiduciaries have important responsibilities and are subject to standards of conduct because they act on behalf of participants in a retirement plan and their beneficiaries. These responsibilities include:<br><br>• Acting solely in the interest of plan participants and their beneficiaries and with the exclusive purpose of providing benefits to them;<br>• Carrying out their duties prudently;<br>• Following the plan documents (unless inconsistent with ERISA);<br>• Diversifying plan investments; and<br>• *Paying only reasonable plan expenses*<br><br>In addition, the final 408(b)(2) regulations also require that all fees be "reasonable" for services being provided. In fact, the word "reasonable" or "reasonableness" is mentioned 49 times in that regulation.<br><br>This means the following to you as a fiduciary per the Department of Labor:<br><br>• You must determine whether fees are reasonable *by service provider* (total plan fees is *not* the fiduciary duty).<br>• BUT...per the Department of Labor's booklet on 401(k) Plan Fees: *"don't consider fees in a vacuum. They are only one part of the bigger picture including investment risk and returns and the extent and quality of services provided."* | This report contains a great deal of important information specifically designed to help the Responsible Plan Fiduciary determine if the fees being paid to various service providers are "reasonable". For each service provider examined in the report, you should do the following:<br><br>1. Examine the Benchmark Group so you understand how Fiduciary Benchmarks built an "apples to apples" comparison group for the service provider.<br>2. Examine the Fees being paid to the Service Provider and consider the percentage above or below the Fiduciary Benchmarks' FeePoint.*<br>3. Examine the services being provided to you as the Plan Sponsor and your Participants. Reminder: higher cost drivers and higher value factors may be worth a higher fee.<br>4. Finally, consider the Quality of your Service Provider. The DOL has specifically noted in prior rulings that the Quality of a Service Provider can also be considered when determining Fee Reasonableness.<br><br>*See disclosure for additional information about FeePoint.* | Fiduciary Benchmarks is the industry's leading benchmark service. Our patented methodology uses accurate and normalized data and a method that is *independent, comprehensive* and *informative.*<br><br>Our Firm<br>• Established in October of 2007<br>• Strict Confidentiality and Data Security Policies<br><br>Our People<br>• Executive team averages 20+ years of experience<br>• History of providing innovative retirement solutions<br><br>Our Data and Methodology<br>• All data sourced directly from Service Providers<br>• Patented method U.S. 8,150,198 considers *fees and value*<br>• Independent system devoid of *conflicts of interest*<br><br>Our Clients<br>• Each year we deliver *thousands* of reports to the industry's most respected Service Providers who in turn help their Plan Sponsor clients fulfill this important Fiduciary Duty |

See *Important Information and Disclosures* at the end of this document for additional information, including key considerations about the information reflected in this report.

FIG. 9

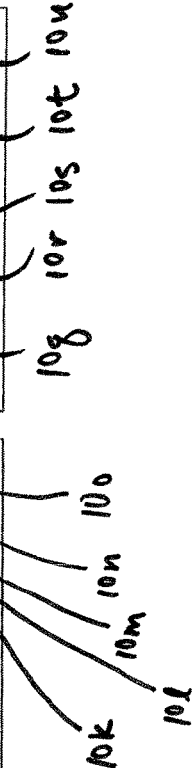
FIG. 10

Investment Managers – Total Expense Ratio Reasonableness

This page provides a high level comparison of investment structure and expenses versus the benchmark group. Investment expenses are typically the largest component of plan costs. These costs, however, should always be considered in conjunction with investment performance.

Fiduciary Benchmarks
Independent | Comprehensive | Informative

| Category | BMG | This Plan |
|---|---|---|
| Assets | $5-15 M | $10,000,000 |
| Plans in BMG | | 496 Total Plans |

Table 11-1

FeePoint for Investment Managers

Plan Weighted Investment Expense: 0.83
Average Weighted Investment Expense: 0.82

Average Weighted Investment Expense is calculated by applying the applicable Benchmark Group Average expense by asset category to the plan's asset allocation. By doing so, a truly custom benchmark is created to assess relative investment costs that is considerate of this plan's unique investment line-up, asset allocation and relative investment expense.

Table 11-2

Plan Investments by Cost Quartile

Lowest (0-25th): 1
Low-Middle (26-50th): 9
Upper-Middle (51-75th): 13
Highest (76-100th): 6
Option with No Cost: 1

Table 11-3

Plan Assets by Cost Quartile (%)

Lowest (0-25th): 1%
Low-Middle (26-50th): 52%
Upper-Middle (51-75th): 33%
Highest (76-100th): 13%
Option with No Cost: 1%

Total Expense Ratio by Fund

Table 11-4

| Fund Name | Ticker | Asset Category | Benchmark Plans with this Asset Category | $ Assets | % of Plan | This Choice | % of Benchmark Group | Tot. Expense Ratio | 25th | 50th | 75th | Diff. from 50th |
|---|---|---|---|---|---|---|---|---|---|---|---|---|
| CORE OPTIONS | | | | | | | | | | | | |
| Johnson Stable Value D * | N/A | Stable Value | 66% | 1,400,000.00 | 14.0% | Y | 51% | 0.58% | 0.45% | 0.58% | 0.67% | 0.00% |
| RGA Total Return Bond Inv. | RTRBX | Intermediate-Term Bond | 87% | 1,100,000.00 | 11.0% | Y | 64% | 0.82% | 0.68% | 0.75% | 0.85% | 0.07% |
| Yamane Large Value Inst. ** | YLVIX | Large Value | 94% | 600,000.00 | 6.0% | Y | 70% | 1.06% | 0.84% | 0.98% | 1.12% | 0.08% |
| Low Track S&P 500 Index Inv. | LTSPX | Large Blend (Index/Passive) | 81% | 700,000.00 | 7.0% | Y | 42% | 0.29% | 0.18% | 0.31% | 0.53% | -0.02% |
| Georgia Large Cap Growth N | GLCGX | Large Growth | 96% | 500,000.00 | 5.0% | Y | 75% | 0.93% | 0.80% | 0.94% | 1.11% | -0.01% |
| Emerged Value Opportunities Adv. | EVOAX | Mid-Cap Value | 64% | 200,000.00 | 2.0% | Y | 47% | 1.17% | 0.84% | 1.14% | 1.20% | 0.03% |
| Low Track S&P 400 Index Inv. | LTSFX | Mid-Cap Blend (Index/Passive) | 42% | 200,000.00 | 2.0% | Y | 25% | 0.30% | 0.14% | 0.30% | 0.55% | 0.00% |
| Moment Captured Growth Inv. | MCGIX | Mid-Cap Growth | 74% | 100,000.00 | 1.0% | Y | 58% | 1.12% | 0.92% | 1.10% | 1.28% | 0.02% |
| Yamane Small Value Inst. ** | YSVIX | Small Value | 64% | 100,000.00 | 1.0% | Y | 55% | 1.13% | 1.08% | 1.22% | 1.36% | -0.09% |

*Continued on next page.*

^ Comparison illustrates range of expense for investments having the same asset category and revenue sharing characteristics as the plan fund in question.
* This fund may be subject to a market value adjustment upon termination. If due to its structure, this investment does not report an explicit expense ratio and or fee credit, a market based average may be applied. The market based average is established by Fiduciary Benchmarks based on the reported levels of expense and fee offsets for similar vehicles across similar benchmark groups. The resulting combined total expense ratio will be used for benchmarking. The characteristics and associated value of Guaranteed Rate investments varies based on such things as the current guaranteed rate, the minimum guaranteed rate, the terms and conditions of rate resets, the credit quality of the guarantor and other accruing benefits associated with investment. Accordingly, cost should always be considered in conjunction with an investment's overall value characteristics.
** A proprietary fund is defined as "investments that are managed by the Recordkeeper or its affiliates and excludes choices where a sub-advisor has been hired". The amount of funds that are managed by the Recordkeeper should not be the determining factor of the plan's final investment lineup. Ultimately, each option must be able to withstand the normal fiduciary due diligence of people, process, performance, cost, and other factors. This plan's allocation to proprietary choices is 14% of plan assets. The Benchmark Group average amount of assets in proprietary choices (where applicable) is 32%.

FIG. 11

Investment Managers – Investment Structure

This page provides a high level comparison of investment structure and asset allocation versus the benchmark group.

Fiduciary Benchmarks
Independent | Comprehensive | Informative

| Category | BMG | This Plan |
|---|---|---|
| Assets | $5-15 M | $10,000,000 |
| Plans in BMG | 496 Total Plans | |

Investment Offering by Asset Category

| Category | Asset Category of Options | Plan Offers? | Active or Passive |
|---|---|---|---|
| Auto-Diversified | – Target Retirement Date Funds | Y | Active |
| | – Risk Based/Balanced Funds | Y | Active |
| | – Core Model Portfolios – Target Date | N | – |
| | – Core Model Portfolios – Risk Based | N | – |
| | – Managed Account Program | N | – |
| | – Stable Value | Y | Active |
| | – Guaranteed/General Acct | N | – |
| | – Money Market | N | – |
| | – Fixed Income | Y | Active |
| | – High Yield | N | – |
| | – Large Cap Value | Y | Active |
| | – Large Cap Blend | Y | Passive |
| | – Large Cap Growth | Y | Active |
| | – Mid Cap Value | Y | Active |
| Core Options | – Mid Cap Blend | Y | Passive |
| | – Mid Cap Growth | Y | Active |
| | – Small Cap Value | Y | Active |
| | – Small Cap Blend | Y | Passive |
| | – Small Cap Growth | Y | Active |
| | – International | Y | Active |
| | – Emerging Markets | Y | Active |
| | – Global | N | – |
| | – Real Estate | Y | Active |
| | – Other Alternative Assets | Y | Active |
| Other Options | – Other Asset Categories | N | – |
| | – SDA/Funds Window | Y | – |
| | – Company Stock | N | – |

Table 13-1

Investment Offering Summary by Tier and Active or Passive Use

| Total No. Options | This Plan | Average Plan |
|---|---|---|
| | 30 | 27 |
| – Number Auto-Diversified Options | 14 | 8 |
| – Number Core Options | 15 | 21 |
| – Number Other Options | 1 | 2 |
| – Number Actively Managed Options | 26 | 24 |
| – Number Passive Options | 3 | 2 |
| – Number Not Applicable | 1 | 1 |

Table 13-2

Plan Asset Allocation (%)

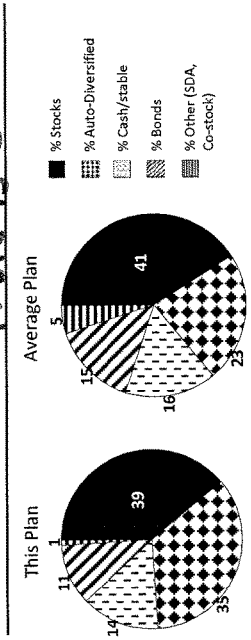

Table 13-3

- % Stocks
- % Auto-Diversified
- % Cash/stable
- % Bonds
- % Other (SDA, Co-stock)

Active or Passive Allocation (%)

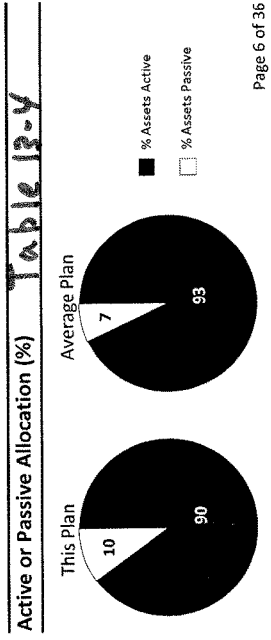

Table 13-4

- % Assets Active
- % Assets Passive

FIG. 13

Investment Managers – Stable Value Option

This page summarizes Stable Value investments. It is important to consider both the characteristics of this investment choice as the characteristics of the underlying investment portfolio when evaluating reasonableness.

Fiduciary Benchmarks
Independent | Comprehensive | Informative

| Category | BMG | This Plan |
|---|---|---|
| Assets | $5-15 M | $10,000,000 |
| Plans in BMG | 496 Total Plans | |

Stable Value Option Utilization

Table 14-1

| % of Plans Offering in the Benchmark Group: | 66% |
|---|---|

| | Name | Type | % of BMG | |
|---|---|---|---|---|
| | | | Pooled Fund | Separate Acct |
| Option Used by Plan: | Johnson Stable Value D | Stable Value Pooled | 95% | 5% |

| | Plan $ | % of Plan | Benchmark Group | | |
|---|---|---|---|---|---|
| | | | 25th | 50th | 75th |
| Plan Assets Invested: | $1,400,000 | 14% | 7% | 16% | 34% |

Characteristics of Stable Value Pooled Fund and Separate Account Options

Crediting Rates and Expense Ratio

Table 14-2

| Crediting Rates | Plan | Benchmark Group Percentiles (bps) | | |
|---|---|---|---|---|
| | | 25th | 50th | 75th |
| Current Rate | 1.40% | 1.00% | 2.00% | 3.00% |
| Minimum Rate | 1.00% | 1.00% | 1.50% | 2.00% |

| Expense Ratio* | Plan | Benchmark Group Percentiles (bps) | | |
|---|---|---|---|---|
| | | 25th | 50th | 75th |
| Expense – Total | 0.95% | 0.90% | 1.20% | 1.40% |
| Expense – Money Manager | 0.40% | 0.35% | 0.40% | 0.45% |
| Expense – Benefit Responsive Wrap | 0.20% | 0.18% | 0.21% | 0.27% |
| Expense – Provider Fee Offsets | 0.35% | 0.15% | 0.20% | 0.35% |

* Comparison illustrates range of expense for investments having the same revenue sharing characteristics as the plan fund in question.

Rate Resets, Credit Quality, Portfolio Characteristics and Withdrawal Provisions Table 14-3

| Rate Reset Periods | Plan | % of Benchmark Group | | | | |
|---|---|---|---|---|---|---|
| | | Month | Quarter | Annual | Other | |
| Current Rate | Monthly | 75% | 25% | 0% | 0% | |
| Minimum Rate | No Change | 0% | 0% | 70% | 30% | |

| Credit Quality | Plan | % of Benchmark Group | | | | |
|---|---|---|---|---|---|---|
| | | AAA | AA | A | <A | |
| Average Credit Quality – Wrap Providers | AA | 50% | 45% | 5% | - | |
| Average Credit Quality – Investment Pool | A | 10% | 25% | 40% | 25% | |

| Portfolio Characteristics | Plan | % of Benchmark Group | | | |
|---|---|---|---|---|---|
| | | <1 Year | 1-3 Years | 3-5 Years | 5 Years + |
| Duration – Investment Pool | 1.7 Years | 18% | 55% | 20% | 7% |

| Withdrawal Provision | Plan | % of Benchmark Group | | | |
|---|---|---|---|---|---|
| | | Immediate | 12 M | 12-36 M | 36 M+ |
| 100% Availability of Assets Post Change | 12 M | 0% | 75% | 20% | 5% |

FIG. 14

Investment Managers – Guaranteed Rate General Account Option

Guaranteed Rate General Account Options are backed by the General Accounts of offering Insurance Companies. It is important to consider both the characteristics of this investment choice as the characteristics of the issuing Company when evaluating reasonableness.

Fiduciary Benchmarks — Independent | Comprehensive | Informative

| Category | BMG | This Plan |
|---|---|---|
| Assets | $5-15 M | $10,000,000 |
| Plans in BMG | 496 Total Plans | |

Table 15-1

Guaranteed Rate General Account Option Utilization

% of Plans Offering in the Benchmark Group: 66%

| Option Used by Plan: | Name | Type |
|---|---|---|
| | Insurance Company General Account | General Account |

| | Plan $ | % of Plan |
|---|---|---|
| Plan Assets Invested: | $1,400,000 | 14% |

| | % of BMG | |
|---|---|---|
| | General Account | Separate Acct |
| | 100% | 0% |

| | Benchmark Group | | |
|---|---|---|---|
| | 25th | 50th | 75th |
| | 7% | 16% | 34% |

Characteristics of Guaranteed Rate General Account Option

Crediting Rates and Expense Data

Table 15-2

| Crediting Rates | Plan | Benchmark Group Percentiles (bps) | | |
|---|---|---|---|---|
| | | 25th | 50th | 75th |
| Current Rate for New Money | 2.50% | 2.00% | 2.50% | 3.00% |
| Minimum Rate for New Money | 2.00% | 1.00% | 2.00% | 3.00% |
| Blended Rate – Minimum Rate | 2.00% | 1.00% | 2.00% | 3.00% |
| Blended Rate – 1 year | 3.00% | 2.00% | 2.50% | 3.10% |
| Blended Rate – 3 year | 3.50% | 3.00% | 3.25% | 3.75% |
| Blended Rate – 5 year | 3.70% | 2.50% | 2.50% | 3.80% |

| Expense Data: | Plan | Benchmark Group Percentiles (bps) | | |
|---|---|---|---|---|
| | | 25th | 50th | 75th |
| Expense – Provider Fee Offsets^ | 0.50% | 0.25% | 0.50% | 0.75% |

^ Where present, a value was not provided. Fiduciary Benchmarks applies a market based assumption where values are not identified. The current rate is 0.65%.

Rate Resets, Credit Quality, Withdrawal Provisions and Market Value Adjustments

Table 15-3

| Rate Reset Periods | Plan | % of Benchmark Group | | | |
|---|---|---|---|---|---|
| | | Month | Quarter | Annual | Other |
| Current Rate for New Money | Annually | 10% | 35% | 55% | 0% |
| Minimum Rate for New Money | No Change | 0% | 0% | 35% | 65% |
| Blended Rate | Annually | 10% | 35% | 55% | 0% |

| Credit Quality | Plan | Rates* | % of Benchmark Group | | | |
|---|---|---|---|---|---|---|
| | | | Plus | Flat | Minus | Total |
| Credit Quality – Guarantor | AA | AAA | 2% | 2% | 8% | 10% |
| | | AA | 10% | 30% | 20% | 60% |
| | | A | 15% | 15% | 0% | 30% |
| | | BBB | 0% | 0% | 0% | 0% |
| | | Other | | | | 0% |

| Credit Agency Reported for Plan: Duff and Phelps | | | | | |

* Please visit www.fiduciarybenchmarks.com/credit rates to map each rating agency's rates into this matrix.

| Availability of Plan Assets at Termination | Plan | No "Put" | % of Benchmark Group | | |
|---|---|---|---|---|---|
| | | | 12 M | 24 M | 36 M+ |
| Does a "Put" Apply for Plan Liquidation? | No | 25% | 50% | 20% | 5% |

| Do Market Value Adjustments (MVAs) Apply? | Plan | None Apply | % of Benchmark Group | | |
|---|---|---|---|---|---|
| | | | 12 M | 24 M | 36 M+ |
| No. Months Required to Avoid MVAs | 24 M | 15% | 50% | 30% | 5% |

FIG. 15

Page 8 of 36

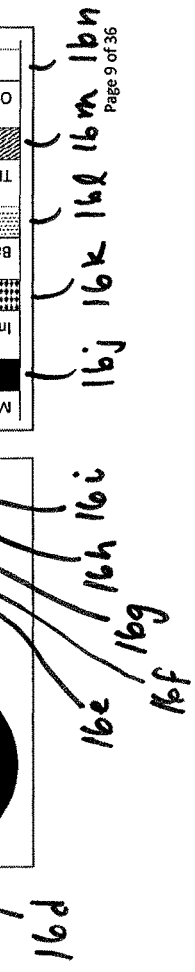
FIG. 16

Recordkeeper – Summary

Per the U.S. Dept. of Labor, the prudent fiduciary determines fee reasonableness by looking not only at the fee being paid, but by also looking at the Service/Value being delivered. Fiduciary Benchmarks supports you in assessing your plan's fee reasonableness by enabling you to:

- Examine the Fees being paid (left column)
- Consider the Services/Value being delivered *to you as the Plan Sponsor and to your Participants* (other columns)
- Consider the Background and Quality of Your Service Provider (next page)

Table 17-1 Examine Fees

The chart below shows how your fee compares to Fiduciary Benchmarks FeePoint*. This calculation takes data from each plan in the Benchmark Group and utilizes a formula to predict your fee based on average account balance to the actual fee you are paying.

Your Fee vs. FBi FeePoint ($ per Part)

- 17a: -14% $196 (Your Plan)
- 17b: $227 (FeePoint)

NOTE: The Fiduciary Benchmarks FeePoint shown is not adjusted for the cost drivers and value factors for Plan Sponsors and Participants. *Higher cost drivers and higher value factors may be worth a higher fee.*

*See Glossary for definition of FeePoint.

Table 17-2 Examine Service/Value for Plan Sponsors

The chart below shows how your plan compares to the ServicePoint** of the Benchmark Group for items that drive costs or add value for Plan Sponsors.

Factors Impacting Recordkeeper Cost

- Plan Complexity (17i): 46 (17g) / 35 (17h) +31%
- Recordkeeping Services (17j): 102 (17k) / 38 (17m) +168%
- Administration Services (17l): 50 (17n) / 37 (17o) +35%
- Compliance & Consulting Services: 142 (17p) / 99 (17q) +43%

NOTE: Fiduciary Benchmarks also suggests that the prudent fiduciary should consider the quality of plan and participant services including:
- Accuracy and timeliness of the services being provided

**See Glossary for definition of ServicePoint.

Key: ■ Your Plan  ☐ Market Segment Standard   XX% Variance from Market Segment Standard

Fiduciary Benchmarks
Independent | Comprehensive | Informative

| Category | BMG | This Plan |
|---|---|---|
| Assets | $9-11 M | $10,000,000 |
| Participants | 103-176 | 144 |
| Average Balance | $60-90 k | $76,367 |
| Plan Type | 100% 401(k) | 401(k) |
| Plans in BMG | 55 Total Plans | |

Table 17-3 Examine Service/Value for Participants

The charts below show how your plan compares to the ServicePoint** of the Benchmark Group for items that drive costs or add value for Participants.

Factors Impacting Recordkeeper Cost

- Communication and Education Services: 145 / 221 +53%

| Participant Success Measures | Your Plan | Industry Median | Percent Reporting |
|---|---|---|---|
| Participation Rate – Overall | 85% | 74% | 86% |
| Participation Rate – NHCEs | 82% | 72% | 81% |
| Participation Rate – HCEs | 94% | 80% | 81% |
| Deferral Rate – Overall | 5.3% | 4.6% | 79% |
| Deferral Rate – NHCEs | 5.0% | 4.2% | 76% |
| Deferral Rate – HCEs | 6.2% | 5.1% | 76% |
| Percent Using Auto-Escalate | 29% | 11% | 32% |
| Percent Using Catch-up | 25% | 7% | 28% |
| Percent Maximizing Company Match | 81% | 56% | 39% |
| Percent Assets in Auto-Diversified Options | 25% | 20% | 100% |
| Percent Terminateds "Preserving" | 88% | 46% | 38% |

NOTE: Recent research has proven that better retirement readiness can be achieved through the optimization of plan design features such as auto-enrollment or auto-escalation.

Page 10 of 36

FIG. 17

Recordkeeper – Quality of Service Provider

 Fiduciary Benchmarks Independent | Comprehensive | Informative

Note that the U.S. DOL has specifically noted in prior rulings that the Quality of a Service Provider can also be considered when determining Fee Reasonableness. Therefore, Fiduciary Benchmarks surveyed the largest Recordkeeper firms in the industry to determine how they describe "quality" and we have summarized the information for you in the three sections below. While Fiduciary Benchmarks does not currently benchmark the metrics on this page, we do believe the quality of your Service Provider is an important factor that should be considered when determining fee reasonableness.

| Recordkeeping Firm | Services/Process | People/Technology/Resources |
|---|---|---|
| Ultimately, Recordkeeper Services are greatly dependent on the Firm and the individuals that service your account. Therefore, listed below are a number of items you should consider with respect to the Firm and the People that are servicing your plan:<br><br>• Expertise with Retirement Plans<br>• Experience with similar plans and/or industry<br>• Insurance and Bonding coverage<br>• Non-401(k) Plan Expertise<br>• Cultural "Fit"<br><br>*Table 18-1* | The services and processes used by your Recordkeeper are also important qualitative items that should be considered when determining fee reasonableness. Therefore, listed below are a number of different services and processes that should be examined.<br><br>• Definition of "What is Winning?"<br>• Process to ensure no conflicts of interest<br>• Process for Protecting and Improving your Plan<br>   – Plan Sponsor Services<br>   – Participant Services<br>• Process for measuring Client Satisfaction<br>• Client Retention/References/Success Stories<br><br>*Table 18-2* | Finally, the resources available to your Recordkeeper will have a large impact on their ability to deliver timely and accurate service on an ongoing basis. Therefore, listed below are People, Technology and other resources that should be discussed as part of Fee Reasonableness.<br><br>• Aptitude of Team<br>• Attitude of Team<br>• Employee Retention<br>• Company Awards<br>• Technology for Delivering Plan Sponsor Services<br>• Technology for Delivering Participant Services<br>• Educational Resources<br>• Profitability/Sustainability<br>• Confidentiality/Security<br><br>*Table 18-3* |

FIG. 18

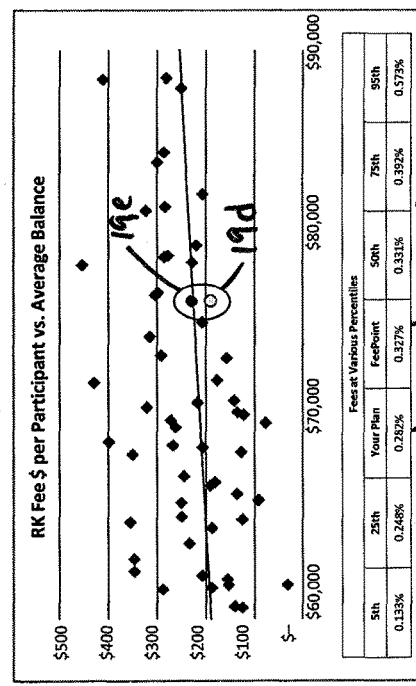
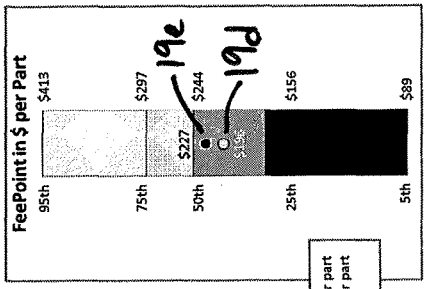
FIG. 19

Recordkeeper – Fee Details

This page contains detail regarding the Investment Fees being paid for your plan. This detail can help a Plan Fiduciary understand exactly the nature and source of their fees compared to the Benchmark Group.

Fiduciary Benchmarks
Independent | Comprehensive | Informative

| Category | BMG | This Plan |
|---|---|---|
| Assets | $9-11 M | $10,000,000 |
| Participants | 103-176 | 144 |
| Average Balance | $60-90 k | $76,367 |
| Plan Type | 100% 401(k) | 401(k) |
| Plans in BMG | 55 Total Plans | |

Investment Fees by Fund

*Continued from previous page.*

| Fund Name | Ticker | Asset Category | Assets | % of Plan | Investment Fees to Recordkeeper | $ Amt. | Benchmark Group Percentiles (bps) | | | | |
|---|---|---|---|---|---|---|---|---|---|---|---|
| | | | | | | | 25th | 50th | 75th | Diff. from 50th |
| RGA Total Return Bond Inv | RTRBX | Intermediate-Term Bond | $1,100,000 | 11.0% | 0.40% | $4,400 | 0.20% | 0.26% | 0.45% | 0.24% |
| Yamane Large Value Inst | YLVIX | Large Value | $600,000 | 6.0% | 0.65% | $3,900 | 0.25% | 0.40% | 0.45% | 0.25% |
| Johnson Stable Value D | N/A | Stable Value | $1,400,000 | 14.0% | 0.25% | $3,500 | 0.25% | 0.45% | 0.55% | -0.20% |
| Achieve Retirement Moderate 2020 E | ARMCK | Target Date 2016-2020 | $600,000 | 6.0% | 0.45% | $2,700 | 0.25% | 0.35% | 0.44% | 0.10% |
| Achieve Retirement Moderate 2025 E | ARMDX | Target Date 2021-2025 | $500,000 | 5.0% | 0.45% | $2,250 | 0.32% | 0.35% | 0.40% | 0.10% |
| Achieve Retirement Moderate 2030 E | ARMEX | Target Date 2026-2030 | $400,000 | 4.0% | 0.45% | $1,800 | 0.25% | 0.35% | 0.44% | 0.10% |
| Georgia Large Cap Growth N | GLCGX | Large Growth | $500,000 | 5.0% | 0.30% | $1,500 | 0.25% | 0.35% | 0.45% | -0.05% |
| Holistic Balanced Inv | HBFAX | Moderate Allocation | $400,000 | 4.0% | 0.35% | $1,400 | 0.35% | 0.45% | 0.50% | -0.10% |
| Achieve Retirement Moderate 2010 E | ARMAX | Target Date 2000-2010 | $300,000 | 3.0% | 0.45% | $1,350 | 0.25% | 0.35% | 0.36% | 0.10% |
| Achieve Retirement Moderate 2015 E | ARMBX | Target Date 2011-2015 | $300,000 | 3.0% | 0.45% | $1,350 | 0.30% | 0.35% | 0.42% | 0.10% |
| Achieve Retirement Moderate 2035 E | ARMFX | Target Date 2031-2035 | $300,000 | 3.0% | 0.45% | $1,350 | 0.30% | 0.35% | 0.42% | 0.10% |
| Achieve Retirement Moderate 2040 E | ARMGX | Target Date 2036-2040 | $300,000 | 3.0% | 0.45% | $1,350 | 0.30% | 0.35% | 0.44% | 0.10% |
| Low Track S&P 500 Index Inv | LTSPX | Large Blend | $700,000 | 7.0% | 0.15% | $1,050 | 0.15% | 0.31% | 0.45% | -0.16% |
| Emerged Value Opportunities Adv | EVOAX | Mid-Cap Value | $200,000 | 2.0% | 0.50% | $1,000 | 0.35% | 0.40% | 0.45% | 0.10% |
| Yamane International Inst | YIIIX | Foreign Large Blend | $700,000 | 7.0% | 0.10% | $700 | 0.28% | 0.35% | 0.45% | -0.25% |
| Momentum Captured Growth Inv | MCGIX | Mid-Cap Growth | $100,000 | 1.0% | 0.50% | $500 | 0.25% | 0.35% | 0.45% | 0.15% |
| Achieve Retirement Moderate 2045 E | ARMHX | Target Date 2041-2045 | $100,000 | 1.0% | 0.45% | $450 | 0.35% | 0.35% | 0.44% | 0.10% |
| Achieve Retirement Moderate 2050 E | ARMIX | Target Date 2046-2050 | $100,000 | 1.0% | 0.45% | $450 | 0.25% | 0.35% | 0.44% | 0.10% |
| Achieve Retirement Moderate 2055 E | ARMJX | Target Date 2051+ | $100,000 | 1.0% | 0.45% | $450 | 0.25% | 0.35% | 0.45% | 0.10% |
| Low Track S&P 400 Index Inv | LTSFX | Mid-Cap Blend | $200,000 | 2.0% | 0.15% | $300 | 0.25% | 0.37% | 0.45% | -0.22% |
| Yamane Small Value Inst | YSVIX | Small Value | $100,000 | 1.0% | 0.30% | $300 | 0.25% | 0.40% | 0.45% | -0.10% |
| Low Track S&P 600 Index Inv | LTSSX | Small Blend | $100,000 | 1.0% | 0.10% | $100 | 0.10% | 0.25% | 0.45% | -0.15% |
| Far Lands Emerging Growth A | FLEGX | Diversified Emerging Mkts | $70,000 | 0.7% | 0.10% | $70 | 0.25% | 0.45% | 0.45% | -0.35% |
| Georgia Small Cap Growth N | GSCGX | Small Growth | 100,000.00 | 1.0% | 0.00% | $0 | 0.25% | 0.39% | 0.44% | - |

Table 20-1 ⟵ 20a

*Continued on next page.*

FIG. 20

Recordkeeper – Fee Details

This page contains detail regarding the Investment Fees being paid for your plan. This detail can help a Plan Fiduciary understand exactly the nature and source of their fees compared to the Benchmark Group.

Fiduciary Benchmarks
Independent | Comprehensive | Informative

| Category | BMG | This Plan |
|---|---|---|
| Assets | $9-11 M | $10,000,000 |
| Participants | 103-176 | 144 |
| Average Balance | $60-90 k | $76,367 |
| Plan Type | 100% 401(k) | 401(k) |
| Plans in BMG | 55 Total Plans | |

Investment Fees by Fund

*Continued from previous page.*

| Fund Name | Ticker | Asset Category | Assets | % of Plan | Investment Fees to Recordkeeper | $ Amt. |
|---|---|---|---|---|---|---|
| Holistic Aggressive Fund A | HAFAX | Aggressive Allocation | 100,000.00 | 1.0% | 0.00% | $0 |
| Holistic Conservative Fund A | HCFAX | Conservative Allocation | 200,000.00 | 2.0% | 0.00% | $0 |
| Holistic Moderate Fund A | HMFAX | Moderate Allocation | 200,000.00 | 2.0% | 0.00% | $0 |
| QRT Low Volatility Alpha D | QRTLX | Market Neutral | 50,000.00 | 0.5% | 0.00% | $0 |
| Smithland Real Estate Securities D | SRESX | Real Estate | 80,000.00 | 0.8% | 0.00% | $0 |
| Self-Directed Brokerage | - | - | 100,000.00 | 1.0% | 0.00% | $0 |
| Total | | | $10,000,000 | 100% | 0.32% | $32,220 |

| | Benchmark Group Percentiles (bps) | | | |
|---|---|---|---|---|
| | 25th | 50th | 75th | Diff. from 50th |
| | 0.36% | 0.43% | 0.45% | - |
| | 0.35% | 0.45% | 0.50% | - |
| | 0.25% | 0.35% | 0.45% | - |
| | 0.35% | 0.38% | 0.40% | - |
| | 0.27% | 0.37% | 0.45% | - |
| | - | - | - | - |
| | 0.23% | 0.29% | 0.37% | - |

Table 21-1  21a

FIG. 21

Recordkeeper – Participant Elected Service Fees

Fiduciary Benchmarks
Independent | Comprehensive | Informative

This page summarizes the fees associated with Participant Elected Services. These fees are compared at a unit cost level. This allows the Responsible Plan Fiduciary to compare the cost of these services while removing the impact that participant behavior can have on the total amount of these fees being paid to the Recordkeeper due to greater (or less) than median participant activity.

| Category | BMG | This Plan |
|---|---|---|
| Assets | $9-11 M | $10,000,000 |
| Participants | 103-176 | 144 |
| Average Balance | $60-90 k | $76,367 |
| Plan Type | 100% 401(k) | 401(k) |
| Plans in BMG | 55 Total Plans | |

Participant Activity Fees — Table 22-1

| Participant Activity Based Fees | % of Plans Paying This Fee | This Plan's Unit Cost | Benchmark Group Percentiles ($) | | |
|---|---|---|---|---|---|
| | | | 25th | 50th | 75th |
| Annual per participant advice charge | 2% | $0 | $25 | $25 | $25 |
| Loan origination fee (per occurrence) | 55% | $125 | $45 | $75 | $125 |
| Loan maintenance fee (annual) | 26% | $0 | $30 | $36 | $75 |
| Hardship approval fee (per occurrence) | 17% | $100 | $38 | $75 | $100 |

| Participant Activity Based Fees | % of Plans Paying This Fee | This Plan's Unit Cost | Benchmark Group Percentiles ($) | | |
|---|---|---|---|---|---|
| | | | 25th | 50th | 75th |
| QDRO approval fee (per occurrence) | 11% | $500 | $125 | $350 | $1,000 |
| QDRO processing fee (per occurrence) | 13% | $0 | $50 | $75 | $250 |
| Periodic payment fee (per occurrence) | 23% | $25 | $2 | $12 | $75 |
| Non-Periodic payment fee (per occurrence) | 40% | $50 | $38 | $50 | $98 |

Managed Accounts Fees and Use — Table 22-2

| % of Plans Offering in the Benchmark Group: | 2% |
|---|---|
| Managed Account Provider: | Managed Participant Assets, LLC |

| | Plan | % of Plan | Benchmark Group Percentiles | | |
|---|---|---|---|---|---|
| | | | 25th | 50th | 75th |
| Managed Account Utilization: | | | 1% | 2% | 4% |
| No. of Plan Participants Using | 11 | 7% | | | |
| Plan Assets in Managed Accounts | $500,000 | 5% | 0% | 3% | 8% |

| Managed Account Utilization: | Plan | Benchmark Group Percentiles | | |
|---|---|---|---|---|
| | | 25th | 50th | 75th |
| Employer Annual Fee | $0 | $0 | $0 | $0 |
| Participant Minimum Fee | $0 | $0 | $0 | $0 |
| Fee for $10,000 Participant Account | 0.60% | 0.55% | 0.58% | 0.75% |
| Fee for $25,000 Participant Account | 0.60% | 0.55% | 0.65% | 0.75% |
| Fee for $50,000 Participant Account | 0.60% | 0.55% | 0.65% | 0.73% |
| Fee for $100,000 Participant Account | 0.60% | 0.50% | 0.65% | 0.73% |
| Fee for $250,000 Participant Account | 0.49% | 0.45% | 0.50% | 0.67% |
| Fee for $500,000 Participant Account | 0.37% | 0.40% | 0.45% | 0.60% |

SDA Accounts Fees and Use — Table 22-3

| % of Plans Offering in the Benchmark Group: | 9% |
|---|---|
| SDA Provider: | Brokerage Provider, LLC |

| | Plan | % of Plan | Benchmark Group Percentiles | | |
|---|---|---|---|---|---|
| | | | 25th | 50th | 75th |
| SDA Account Utilization: | | | 0% | 1% | 2% |
| No. of Plan Participants Using | 5 | 1% | | | |
| Plan Assets in SDA | $100,000 | 1% | 0% | 2% | 5% |

| SDA Account Fee Schedule | Plan | Benchmark Group Percentiles ($) | | |
|---|---|---|---|---|
| | | 25th | 50th | 75th |
| Employer Annual Fee | $0 | $750 | $1,200 | $1,250 |
| Participant Minimum Fee | $100 | $100 | $125 | $150 |
| Internet Stock Trades | $24.95 | $15.00 | $20.00 | $24.95 |
| Phone Assisted Stock Trades | $39.95 | $20.00 | $39.95 | $40.00 |

FIG. 22

Recordkeeper – Recordkeeping Services

Fiduciary Benchmarks
Independent | Comprehensive | Informative

| Category | BMG | This Plan |
|---|---|---|
| Assets | $9-11 M | $10,000,000 |
| Participants | 103-176 | 144 |
| Average Balance | $60-90 k | $76,367 |
| Plan Type | 100% 401(k) | 401(k) |
| Plans in BMG | 55 Total Plans | |

*To calculate the total amount of Service delivered this past year, we multiplied the number of times a service is delivered by the degree of difficulty to complete that work – the end result which is called "Service Points". For example, assume a plan processes 12 Payrolls for the year. If each Payroll has a Degree of Difficulty of 25, the plan would have 300 Service Points with respect to Processing Payrolls. Adding the scores for all services allows us to compare the amount of work being done for this plan versus the Benchmark Group.*

Quantity of Service

| Type of Service | Units | No. Units | Degree of Difficulty* | Service Points | What Causes Degree of Difficulty to Vary – This Plan's Degree of Difficulty |
|---|---|---|---|---|---|
| Participant Added – Plan Startup or Newly Eligibles | Added Parts – Startup | 14 | 8.0 | 147 | Varies with Plan Complexity and plan is 31% above Benchmark Group (A) |
| Participants Added – Conversion/Acquisition | Added Parts – Conversion | 0 | 4.0 | 0 | Varies with Plan Complexity and plan is 31% above Benchmark Group (A) |
| Participants Added – Divestiture | Added Parts – Divestiture | 0 | 4.0 | 0 | Varies with Plan Complexity and plan is 31% above Benchmark Group (A) |
| Recordkeeping of Ineligible Participants | RK of Employees | 0 | 1.0 | 0 | Varies with Plan Complexity and plan is 31% above Benchmark Group (A) |
| Recordkeeping of Eligible Participants NO Balance | RK of Eligibles | 0 | 2.0 | 0 | Varies with Plan Complexity and plan is 31% above Benchmark Group (A) |
| Recordkeeping of Eligible Participants WITH Balance | RK of Actives | 39 | 8.0 | 409 | Varies with Plan Complexity and plan is 31% above Benchmark Group (A) |
| Recordkeeping of Terminated Participants WITH Balance | RK of Terms | 105 | 4.0 | 550 | Varies with Plan Complexity and plan is 31% above Benchmark Group (A) |
| Process Payrolls | Payrolls Processed | 104 | 30.0 | 3120 | No. of Payrolls Above Average and Recordkeeper edits payroll data (A) |
| Processing Deferral Rate Changes | Deferral Rate Changes | 0 | 2.0 | 0 | Changes accepted by Recordkeeper and transmitted to Plan Sponsor (A) |
| Processing of Forfeiture Allocations | Forfeiture Allocations | 0 | 30.0 | 0 | Recordkeeper allocates |
| Processing of Corrected Contributions | Contribution Corrections | 0 | 30.0 | 0 | Depends on Investment Options and this plan has only Mutual Funds |
| Processing ADP/ACP Corrections | ADP/ACP Corrections | 6 | 15.0 | 90 | Depends on Correction method and this plan returns Excess Contributions plus interest |
| Processing of Rollovers INTO the plan | Rollovers In | 4 | 15.0 | 60 | Depends on Plan Investments and this plan has only Mutual Funds |
| Processing of Investment Transfers | Transfers | 16 | 1.0 | 16 | Depends on Plan Investments and this plan has only Mutual Funds |
| Processing of New Loans | New Loans | 7 | 15.0 | 105 | Depends on Plan Investments and this plan has only Mutual Funds |
| Processing of Existing Loans | Existing Loans | 28 | 1.0 | 28 | Depends on Plan Investments and this plan has only Mutual Funds |
| Processing of Hardship Withdrawals | Hardship W/D | 2 | 30.0 | 60 | Depends on Plan Investments and this plan has only Mutual Funds |
| Processing of In-Service Withdrawals | In-Service W/D | 1 | 15.0 | 15 | Depends on Plan Investments and this plan has only Mutual Funds |
| Processing of MRDs | MRDs | 1 | 30.0 | 30 | Depends on Plan Investments and this plan has only Mutual Funds |
| Processing of QDROs | QDROs | 3 | 30.0 | 90 | Depends on Plan Investments and this plan has only Mutual Funds |
| Processing of Terminated Employees | Terms | 14 | 15.0 | 210 | Depends on Plan Investments and this plan has only Mutual Funds |
| Processing of $5000/$1000 Mandatory Cash-Outs | Cash-Outs | 0 | 15.0 | 0 | |
| Add Funds | Fund Adds | 1 | 1000.0 | 1000 | 1 fund Added (A) |
| Delete Funds | Fund Deletes | 1 | 2000.0 | 2000 | 1 fund Deleted (A) |
| Maintain Company Stock | Company Stock Funds | 0 | 5000.0 | 0 | |
| Allocate Company Stock Dividends | Dividend Allocations | 0 | 500.0 | 0 | |
| Maintain Investment Portfolios/Models | Models | 0 | 500.0 | 0 | |
| Maintain Frozen Funds | Frozen Funds | 0 | 1000.0 | 0 | |
| Support Annual Audit | Annual Audit | 1 | 250.0 | 250 | Standard Audit Package Provided |
| Provide Plan Sponsor Internet | Sponsor Website | 1 | 5000.0 | 6550 | Functionality at or near Industry Standard |
| Implement Plan Design Changes | Plan Design Changes | 0 | 5000.0 | 0 | |
| | Total Points | | | 14730 | |
| | Parts | | | 144 | |
| | Per Part | | | 102 | |

*See Glossary for definition of Degree of Difficulty.*

(A) Adds to Plan Cost and (R) Reduces Plan Cost

FIG. 24

Recordkeeper – Compliance and Consulting Services

Fiduciary Benchmarks
Independent | Comprehensive | Informative

| Category | BMG | This Plan |
|---|---|---|
| Assets | $9-11 M | $10,000,000 |
| Participants | 103-176 | 144 |
| Average Balance | $60-90 k | $76,367 |
| Plan Type | 100% 401(k) | 401(k) |
| Plans in BMG | 55 Total Plans | |

*To calculate the total amount of Service delivered this past year, we multiplied the number of times a service is delivered by the degree of difficulty to complete that work – the end result which is called "Service Points". For example, assume a plan processes 2 Discrimination Tests per year. If each Discrimination Test has a Degree of Difficulty of 250, the plan would have 500 Service Points with respect to Discrimination Tests. Adding the scores for all services allows us to compare the amount of work being done for this plan versus the Benchmark Group.*

Quantity of Service

| Type of Service | Units | Your Plan No. Units | Your Plan Degree of Difficulty* | Your Plan Service Points | What Causes Degree of Difficulty to Vary – This Plan's Degree of Difficulty |
|---|---|---|---|---|---|
| Conducts ADP/ACP Testing | Tests | 2 | 250.0 | 500 | Standard ADP test |
| Calculate ADP/ACP Corrections | Employees Corrected | 6 | 15.0 | 90 | Return of contributions plus interest |
| Conducts 415 Testing | Tests | 144 | 3.0 | 432 | 3 sources of money to consider for test calculations (A) |
| Conducts Top-Heavy Testing | Tests | 14 | 250.0 | 3500 | Top Heavy Test considers terminated employees |
| Calculate Top-Heavy Minimum | Employees Corrected | 14 | 100.0 | 1400 | Top Heavy contribution considers terminated employees |
| Conducts Compensation Ratio Testing | Tests | 1 | 250.0 | 250 | Test required due to Plan Design (A) |
| Calculates Eligible Compensation of Self-Employed | Employees Corrected | 1 | 250.0 | 250 | Test required due to Self-Employed Employees (A) |
| Meet with Plan Committee | Meetings | 4 | 1000.0 | 4000 | Quarterly Meetings using Standard reporting (A) |
| Conducts 401(a)(4) Testing | Consulting Hours | 0 | 1500.0 | 0 | |
| Conducts 410(b) Testing | Consulting Hours | 0 | 750.0 | 0 | |
| Monitor Section 16 Insider Trading Rules | Insiders | 0 | 50.0 | 0 | |
| Consult on Plan Design Changes | Consulting Hours | 40 | 250.0 | 10000 | Approximately 40 Consulting Hours (A) |
| Merger and Acquisition Work | Consulting Hours | 0 | 5.0 | 0 | |
| Assist with IRS and DOL Audits | Consulting Hours | 0 | 2500.0 | 0 | |
| Consult on Plan Defect Correction | Consulting Hours | 0 | 250.0 | 0 | |
| Manage Plan Transition to New Vendor | Consulting Hours | 0 | 250.0 | 0 | |
| | Total Points | | | 20422 | |
| | Parts | | | 144 | |
| | Per Part | | | 142 | (A) Adds to Plan Cost and (R) Reduces Plan Cost |

*See Glossary for definition of Degree of Difficulty.*

FIG. 26

Recordkeeper – Communication and Education Services

Fiduciary Benchmarks
Independent | Comprehensive | Informative

*To calculate the total amount of Service delivered this past year, we multiplied the number of times a service is delivered by the degree of difficulty to complete that work – the end result which is called "Service Points". For example, assume a plan requests 4 Group Meetings and each meeting has a Degree of Difficulty of 1500 Service Points. Thus, the plan incurred 6000 service points with respect to Group Meetings. Adding the scores for all services allows us to compare the amount of work being done for this plan versus the Benchmark Group.*

| Category | BMG | This Plan |
|---|---|---|
| Assets | $9-11 M | $10,000,000 |
| Participants | 103-176 | 144 |
| Average Balance | $60-90 k | $76,367 |
| Plan Type | 100% 401(k) | 401(k) |
| Plans in BMG | 55 Total Plans | |

Quantity of Service

| Type of Service | Units | No. Units | Degree of Difficulty* | Service Points | What Causes Degree of Difficulty to Vary – This Plan's Degree of Difficulty |
|---|---|---|---|---|---|
| Production and Mailing of Enrollment Kits | Comm Pieces | 15 | 10.0 | 150 | Hardcopy professionally produced materials |
| Answer Calls to 800# | 800# Calls | 287 | 4.8 | 1373 | Single 800 # and shared personnel answering calls |
| Provide Participant Internet Capability | Website | 1 | 5000.0 | 5000 | Single URL and comprehensive website |
| Provide Hardcopy Periodic Statements | Statements | 352 | 1.0 | 352 | Hardcopy professionally produced materials |
| Provide Digital Periodic Statements | Statements | 141 | 0.1 | 14 | Digitally professionally produced materials (R) |
| Provide Hardcopy Retirement Projections | Projections | 144 | 2.0 | 288 | Hardcopy professionally produced materials (A) |
| Provide Digital Retirement Projections | Projections | 0 | 0.1 | 0 | |
| Provide Hardcopy Plan-Driven Events (e.g. fund change) | Comm Pieces | 288 | 2.0 | 576 | Hardcopy professionally produced materials (A) |
| Provide Digital Plan-Driven Events (e.g. fund change) | Comm Pieces | 0 | 0.5 | 0 | |
| Provide Hardcopy Comm Campaigns (e.g. how to save) | Comm Pieces | 144 | 2.0 | 288 | Hardcopy professionally produced materials (A) |
| Provide Digital Comm Campaigns (e.g. how to save) | Comm Pieces | 0 | 0.5 | 0 | |
| Provide Group Meetings | Meetings | 14 | 1500.0 | 21000 | Robust Education Meeting Materials (A) |
| Provide Individual Meetings | Meetings | 19 | 150.0 | 2850 | Robust Individual Employee Meeting Materials (A) |
| | | | Total Points | 31891 | |
| | | | Parts | 144 | (A) Adds to Plan Cost and (R) Reduces Plan Cost |
| | | | Per Part | 221 | |

*See Glossary for definition of Degree of Difficulty.*

Advisor/Consultant – Quality of Service Provider

Fiduciary Benchmarks — Independent | Comprehensive | Informative

Note that the U.S. DOL has specifically noted in prior rulings that the Quality of a Service Provider can also be considered when determining Fee Reasonableness. Therefore, Fiduciary Benchmarks surveyed hundreds of Advisor/Consultant firms in the industry to determine how they describe "quality" and we have summarized the information for you in the three sections below. While Fiduciary Benchmarks does not currently benchmark the metrics on this page, we do believe the quality of your Service Provider is an important factor that should be considered when determining fee reasonableness.

| Advisor/Consultant | Services/Process | People/Technology/Resources |
|---|---|---|
| Ultimately, Advisor/Consultant Services are greatly dependent on the Firm and the individuals that service your account. Therefore, listed below are a number of items you should consider with respect to the Firm and the People that are servicing your plan:<br><br>• Clean and transparent regulatory record<br>• Expertise with Retirement Plans<br>• Experience with similar plans and/or industry<br>• Credentials and Designations<br>• Awards and Recognitions<br>• Memberships and Associations<br>• Fiduciary Status Capability<br>• Insurance and Bonding coverage<br>• Non-401(k) Plan Expertise<br>• Cultural "Fit" | The services and processes used by your Advisor/Consultant are also important qualitative items that should be considered when determining fee reasonableness. Therefore, listed below are a number of different services and processes that should be examined.<br><br>• Definition of "What is Winning?"<br>• Process to ensure no conflicts of interest<br>• Process for Protecting and Improving your Plan<br>   • Investment Services<br>   • Vendor Management Services<br>   • Plan Management Services<br>   • Participant Services<br>• Rollover Process<br>• Process for measuring Client Satisfaction<br>• Client Retention/References/Success Stories | Finally, the resources available to your Advisor/Consultant will have a large impact on their ability to deliver timely and accurate service on an ongoing basis. Therefore, listed below are People, Technology and other resources that should be discussed as part of Fee Reasonableness.<br><br>• Aptitude of Team<br>• Attitude of Team<br>• Shared Staff versus Dedicated Staff<br>• Employee Retention<br>• Technology for Delivering Plan Sponsor Services<br>• Technology for Delivering Participant Services<br>• Educational Resources<br>• Profitability/Sustainability<br>• Confidentiality/Security |
| Table 30-1 | Table 30-2 | Table 30-3 |

FIG. 30

Advisor/Consultant – Investment Services

Fiduciary Benchmarks
Independent | Comprehensive | Informative

| Category | BMG | This Plan |
|---|---|---|
| Assets | $9-11 M | $10,000,000 |
| Plan Type | 95% 401(k) | 401(k) |
| Plans in BMG | 146 Total Plans | |

*To calculate the total amount of Service delivered, we multiplied the number of times a service is delivered for this year by the degree of difficulty to complete that work (called "Service Points"). For example, each Performance Report on the investment options for your plan is worth 2 points. Thus, 2 reviews are worth 4 Service points. Adding the scores for all services allowed us to compare the amount of work being done for this plan versus the Benchmark Group.*

Quantity of Service

| Type of Service | Units | No. Units | Your Plan Degree of Difficulty | Service Points | What Causes Degree of Difficulty to Vary – This Plan's Degree of Difficulty |
|---|---|---|---|---|---|
| Assess Plan's Investment Objectives | Assessments | 1 | 12.2 | 12.2 | 3(21) Fiduciary (A) |
| Design Overall Investment Structure | Implementations | 1 | 15.8 | 15.8 | 3(21) Fiduciary (A) |
| Review QDIA Option | QDIA | 1 | 6.0 | 6.0 | Reviewed using independent third-party tool and designated as QDIA |
| Develop, Maintain and Monitor IPS | IPS | 1 | 16.8 | 16.8 | Custom template reviewed by ERISA counsel (A) |
| Implement Overall Investment Structure | Designs | 1 | 14.9 | 14.9 | 3(21) Fiduciary (A) |
| Build/Manage Model Portfolios | Portfolios | 16 | 2.5 | 39.7 | Utilize providers pre-packaged model portfolios (A) |
| Provide and Review Performance Reporting | Reports | 4 | 10.4 | 41.6 | Reviewed using independent third-party tool |
| Search for Investment Managers | Managers | 4 | 5.3 | 21.1 | Reported using independent third-party tool |
| | | | Total Points | 168.1 | |

*\*See Glossary for definition of Degree of Difficulty.*

(A) Adds to Plan Cost and (R) Reduces Plan Cost

Advisor/Consultant – Vendor Management Services

Fiduciary Benchmarks
Independent | Comprehensive | Informative

*To calculate the total amount of service delivered, we multiplied the number of times a service is delivered for this year by the degree of difficulty to complete that work (called "Service Points"). For example, each RFP that is generated/evaluated is worth 40 Service Points. Thus, 2 RFP's in a year is worth 80 service points. Adding the scores for all services allowed us to compare the amount of work being done for this plan versus the Benchmark Group.*

| Category | BMG | This Plan |
|---|---|---|
| Assets | $9-11 M | $10,000,000 |
| Plan Type | 95% 401(k) | 401(k) |
| Plans in BMG | 146 Total Plans | |

Quantity of Service

| Type of Service | Units | No. Units | Your Plan Degree of Difficulty | Your Plan Service Points | What Causes Degree of Difficulty to Vary – This Plan's Degree of Difficulty |
|---|---|---|---|---|---|
| Monitor Service Provider | Evaluations | 1 | 13.8 | 13.8 | |
| Ensure All Fees are Disclosed | Disclosures | 1 | 6.1 | 6.1 | Comprehensive Checklist used to review 408(B)(2) and/or 404(a)(5) |
| Benchmark Fees and Value for Reasonableness | Provider Reviews | 1 | 16.6 | 16.6 | Benchmarking from real plan data using independent third-party service provider (A) |
| Generate and Evaluate Service Provider RFI | RFIs | 1 | 7.3 | 7.3 | Utilize RFI service to distribute RFI, aggregate results and provide analytics (A) |
| Generate and Evaluate Service Provider RFP | RFPs | 1 | 10.4 | 10.4 | Utilize RFP service to distribute RFI, aggregate results and provide analytics (A) |
| Support Contract Negotiations | Negotiations | 1 | 5.7 | 5.7 | Advise committee on service provider negotiations (A) |
| Support Service Provider Transition | Transitions | 0 | 0.0 | 0.0 | |
| | | | Total Points | 59.9 | |

*See Glossary for definition of Degree of Difficulty.*

(A) Adds to Plan Cost and (R) Reduces Plan Cost

FIG. 33

Advisor/Consultant – Plan Management Services

*To calculate the total amount of Service delivered, we multiplied the number of times a service is delivered for this year by the degree of difficulty to complete that work (called "Service Points"). For example, each committee meeting is worth 5 Service points. Thus, 2 committee meetings in a year is worth 10 service points. Adding the scores for all services allowed us to compare the amount of work being done for this plan versus the Benchmark Group.*

Fiduciary Benchmarks
Independent | Comprehensive | Informative

| Category | BMG | This Plan |
|---|---|---|
| Assets | $9-11 M | $10,000,000 |
| Plan Type | 95% 401(k) | 401(k) |
| Plans in BMG | 146 Total Plans | |

Quantity of Service

| Type of Service | Units | Your Plan No. Units | Your Plan Degree of Difficulty | Your Plan Service Points | What Causes Degree of Difficulty to Vary -- This Plan's Degree of Difficulty |
|---|---|---|---|---|---|
| Review Plan Governance Structure | Reviews | 1 | 15.0 | 15.0 | Use independent third-party service to document and review semi-annually (A) |
| Review 404(c) Protection | Reviews | 1 | 8.5 | 8.5 | Use third-party checklist for reviewing 404(c) compliance (A) |
| Review E&O and D&O and Bonding Insurance | Reviews | 1 | 2.9 | 2.9 | Advisor/Consultant is insured through broker dealer. Amount less than $2 M. |
| Create and Review Fiduciary File | Mtg. Minutes | 1 | 8.9 | 8.9 | Professionally structured with onsite hard copy archival (A) |
| Analyze Plan Design Options | Reports | 1 | 15.0 | 15.0 | Ongoing review as part of annual service model including guidance-review of best practices |
| Review of Education Strategy | Reviews | 1 | 6.9 | 6.9 | Recordkeeper provides their education plan and advisor is reviewing (A) |
| Review Progress Against Goals | Reviews | 1 | 5.0 | 5.0 | |
| Review Use of ERISA Spending Accounts | Reviews | 1 | 0.0 | 0.0 | |
| Meet with Plan Committee | Meetings | 4 | 15.0 | 60.0 | Build and deliver custom committee reporting including items such as overall plan health (A) |
| Daily Plan Management Support | Hours | 4 | 8.6 | 34.3 | Interface with RK and Sponsor |
| | | | Total Points | 156.5 | |

*See Glossary for definition of Degree of Difficulty.*

(A) Adds to Plan Cost and (R) Reduces Plan Cost

FIG. 34

Advisor/Consultant – Participant Services

Fiduciary Benchmarks
Independent | Comprehensive | Informative

| Category | BMG | This Plan |
|---|---|---|
| Assets | $9-11 M | $10,000,000 |
| Plan Type | 95% 401(k) | 401(k) |
| Plans in BMG | 146 Total Plans | |

*To calculate the total amount of Service delivered, we multiplied the number of times a service is delivered for this year by the degree of difficulty to complete that work (called "Service Points"). For example, each group meeting is worth 20 Service points. Thus, 2 group meetings in a year is worth 40 service points. Adding the scores for all services allowed us to compare the amount of work being done for this plan versus the Benchmark Group.*

Quantity of Service

|  |  | Your Plan | | | |
|---|---|---|---|---|---|
| Type of Service | Units | No. Units | Degree of Difficulty | Service Points | What Causes Degree of Difficulty to Vary – This Plan's Degree of Difficulty |
| Provide Participant Phone/Email Support | Hours | 4 | 5.5 | 22.1 | Oversees Recordkeeper providing phone and email support to participants |
| Provide Participant Newsletter | Newsletters | 4 | 1.9 | 7.5 | Distribute Recordkeeper provided participant newsletter and content (A) |
| Provide Group Meetings | Meetings | 4 | 17.2 | 68.6 | Recordkeeper provides their education resources and advisor supplements |
| Provide One-on-One Meetings | Meetings | 4 | 11.3 | 45.2 | Supplement phone and email support provided to participants by the Recordkeeper (A) |
| Provide Participant Education Programs | Reports | 1 | 14.3 | 14.3 | Advisor implements own education program (A) |
| Provide Participant Advice | Advice | 0 | 0.0 | 0.0 | |
| Locations Supported | Locations | 2 | 9.0 | 18.0 | Locations require air travel with total travel time of less than 4 hours (A) |
| | | | Total Points | 176 | (A) Adds to Plan Cost and (R) Reduces Plan Cost |

*See Glossary for definition of Degree of Difficulty.*

FIG. 35

Retirement Readiness – Key Concepts

Industry: Manufacturing

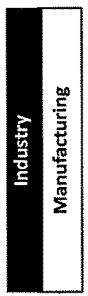 Fiduciary Benchmarks
Independent | Comprehensive | Informative

| Category | BMG | This Plan |
|---|---|---|
| Assets | $9-11 M | $10,000,000 |
| Plan Type | 95% 401(k) | 401(k) |
| Plans in BMG | 146 Total Plans | |

Over the next 20 years, more than 70 million Americans will retire. And for most of these Americans, their primary retirement vehicle with be their defined contribution 401(k) plan. The impact of this certain demographic change will have a profound impact on our entitlement programs if these Americans are NOT able to retire well. Therefore, we begin this section on Retirement Readiness with several key concepts.

Key Concept #1

Improved Retirement Readiness benefits employers in multiple ways

Many Employers think the only benefit associated with offering a Retirement Plan is to provide a competitive benefit that will help employees retire.

However, an increasing number of Employers (as well as studies) are beginning to realize there are NUMEROUS business benefits associated with helping employees achieve a retirement. Those benefits are shown below:

1. Reduced Fiduciary Liability – By addressing the retirement needs of your participants, you have clearly demonstrated that you are operating the plan for the exclusive purpose of providing benefits to the participants and their beneficiaries.[1]

2. Improved Productivity – Stress over financial issues can lead to lower productivity. In fact one study found that managers with salaries of about $65,000 cost their organizations roughly $75 a week per person in lost productivity if they were "psychologically distressed."[2]

3. Improved Career Path – 33 per cent of lawyers within private practice think their career progression is being stifled by a lack of opportunity within their firms 4. Lower Benefits Costs – According to survey, the biggest barrier to employee and company financial growth is the cost of employee benefits. In fact, the medical premium for a single individual age 64 is 39% higher than an individual age 54.[4]

[1] 29 U.S.C. §1104 (a)(1)(a)
[2] American Psychological Association 2010
[3] Laurence Simons 2013
[4] Grant Thornton 2012

Key Concept #2

Employees want and need assistance with their retirement money management

In the book Outliers, Malcolm Gladwell notes that it takes 10,000 hours of practice to become an "expert" in almost any endeavor. If the average employee spends 8 hours per year planning their retirement, that participant would need to live to be 1,250 years old to become an "Expert".

Employees understand and they do not have the time, training or interest to handle these tasks and studies show they welcome their employer's proactive attempts to "put them on the path" to a proper retirement. Thus, employers should not shy away from using Plan Design Features that take the responsibility for saving and investing from employees.

*Nine out of ten participants in defined contribution retirement plans seek guaranteed income that they cannot outlive.*

*401(k) plan participants prefer more proactive steps to increase their retirement readiness rather than historical transactions....Four in five trust the recommendations of their plan provider.*[1]

[1] Greenwald Associates 2012

Key Concept #3

Employees will accept trade-offs to insure their future

Employees understand the difficulties inherent in saving for a retirement goal that is 30 or more years in the future. And, they understand the fact that employers are facing profitability pressures. Therefore, multiple studies have shown that employees are willing to trade-off current compensation for future retirement benefits. While this may seem counterintuitive, this is a clear sign that employees clearly value a secure retirement.

*One study found that "82% of employees surveyed are willing to give up a portion of their salary to secure guaranteed retirement income. But procrastination, inertia, and lack of knowledge about how to take advantage of the benefits offered (and, in some cases, about plan offerings) prevent many employees from maximizing contributions and investing wisely in their 401(k) plans."*

[1] BAML 2012

FIG. 36

Retirement Readiness –
Employer Contribution Comparison

Industry: Manufacturing

 Fiduciary Benchmarks Independent | Comprehensive | Informative

| Category | BMG | This Plan |
|---|---|---|
| Assets | $5M – $15M | $10,000,000 |
| Plan Type | 100% 401(k) | 401(k) |
| Plans in BMG | 114 Total Plans | |

The field of Behavioral Finance continues to provide interesting research regarding how changes in Plan Design can lead to significant improvements in Retirement Readiness. The purpose of this section is to help you understand two things for your plan *when compared to plans in your industry of similar size*: how competitive is your level of employer contributions and how does the Design of your Employer Contribution Compare to those same companies. Note that research shows that small changes in the Design of Employer Contributions can make a big difference to your participants.

Small Changes Can Make Big Differences

The example below shows how small changes in the structuring of an Employer Match can have a dramatic impact on Account Balances at Retirement.

Example 2 has a larger account balance for 2 reasons:

1. The Employer Match is restructured from:
   - 100% on 4% to 50% on 8%
2. The Employee is forced to "stretch" to achieve the higher match

| MATCH CONTRIBUTION | Benchmark Group | Your Plan | | OTHER CONTRIBUTION | Benchmark Group | Your Plan |
|---|---|---|---|---|---|---|
| NO Employer Match | 13% | No | | NO Basic or Profit Sharing | 63% | No |
| Single-Tier Match | 78% | No | | Basic or Profit Sharing | 37% | No |
| Multi-Tier Match – Safe Harbor | 8% | Yes | | QNEC Safe Harbor | 84% | Yes |
| Multi-Tier Match – Other | 1% | No | | Other Basic Contribution | 16% | No |
| Match has NO Dollar Limitation | 89% | Yes | | | | |
| Match has Dollar Limitation | 11% | No | | | | |

| | Example 1 | Example 2 |
|---|---|---|
| Age | 35 | 35 |
| Salary | $40,000 | $40,000 |
| Salary Increase | 3% | 3% |
| Account Balance | $25,000 | $30,000 |
| Deferral Rate | 4% | 8% |
| Employer Match | 100% | 50% |
| Rate of Return | 7.00% | 7.00% |
| Ending Balance | $709,097 | $954,704 |

*This is a hypothetical example and is not representative of any specific situation. Your results will vary.*

| SINGLE-TIER MATCH | Benchmark Group | Your Plan | Match Ceiling (%) | | | | | | | | | |
|---|---|---|---|---|---|---|---|---|---|---|---|---|
| | | | 1% | 2% | 3% | 4% | 5% | 6% | 7% | 8% | 9% | 10%+ |
| Effective Matching Rate is 1% to 25% | 13% | No | 0% | 8% | 10% | 15% | 8% | 51% | 0% | 8% | 0% | 0% |
| Effective Matching Rate is 26% to 50% | 48% | Yes | 1% | 4% | 9% | 12% | 6% | 56% | 3% | 6% | 2% | 1% |
| Effective Matching Rate is 51% to 75% | 10% | No | 0% | 6% | 7% | 18% | 8% | 51% | 0% | 10% | 0% | 0% |
| Effective Matching Rate is 76% to 100% | 6% | No | 1% | 4% | 9% | 12% | 6% | 56% | 3% | 6% | 2% | 1% |
| Effective Matching Rate is >100% | 1% | No | 0% | 6% | 7% | 18% | 8% | 51% | 0% | 10% | 0% | 0% |

According to a new report, a higher match rate (for instance, offering an employer match of 80 percent, rather than 50 percent, of an employee's contribution up to 6 percent salary) has only a small effect on savings plan contributions. In contrast, raising the match threshold (for instance, matching 50 percent of an employee's contribution up to 10 percent of salary, rather than up to 6 percent) has a substantial impact. SHRM, 2012.

| CONTRIBUTION LEVELS | Benchmark Group | Your Plan | Industry Benchmark Group Percentiles | | | | |
|---|---|---|---|---|---|---|---|
| | | | 25th | 50th | 75th | Diff. from 50th |
| Match Employer Match Available | 87% | 4.0% | 2.3% | 2.9% | 4.8% | 1.1% |
| Dollar Limitation | 11% | None | $1,000 | $3,000 | $6,000 | N/A |
| Effective Basic/Profit Sharing Contribution | 37% | 6% | 5% | 6% | 7% | 0% |
| Total Maximum Employer Contribution | 87% | 4.0% | 2.6% | 3.8% | 4.9% | 0.2% |

FIG. 38

Total Plan Fee Detail

Fiduciary Benchmarks
Independent | Comprehensive | Informative

This page summarizes total plan fees, payments and credits by source and recipient.

Total Plan Fee Summary

| | Description | Amount | (%) |
|---|---|---|---|
| | Total Fund Expense Ratio | $83,383 | 0.834% |
| Source of Fees | Other Fees Received | $40,000 | 0.400% |
| | Total Credits to Plan | ($24,000) | -0.240% |
| | Total Credits to Participants | - | - |
| | Total Plan Fee | $99,383 | 0.994% |
| | Total Recordkeeper Fee | $28,220 | 0.282% |
| Allocation of Fees | Total Advisor Fee | $20,000 | 0.200% |
| | Total Money Manager Fee | $51,163 | 0.512% |
| | Total Fee to Others | $0 | 0.00% |
| | Total Plan Fee | $99,383 | 0.994% |

Other Fees, Payments and Credits

| Service Provider | Description | $ Amount | How is Fee Paid? |
|---|---|---|---|
| Recordkeeper | Recordkeeping Fee | $20,000 | By Participants |
| Recordkeeper | Plan ERISA Credit | ($24,000) | By Recordkeeper |
| Advisor/Consultant | Advisory Fee | $20,000 | Plan Credit Account |

Investment Fees to Service Providers

| Fund Name | Ticker | Asset Category | Assets | % of Plan | Recordkeeper | TPA | Advisor/Consultant | Investment Manager | Credits to Participants | Credits to Plan | Total Expense |
|---|---|---|---|---|---|---|---|---|---|---|---|
| CORE OPTIONS | | | | | | | | | | | |
| Johnson Stable Value D | N/A | Stable Value | 1,400,000.00 | 14.0% | $3,500 | $0 | $0 | $4,620 | $0 | $0 | $8,120 |
| RGA Total Return Bond Inv. | RTRBX | Intermediate-Term Bond | 1,100,000.00 | 11.0% | $4,400 | $0 | $0 | $4,620 | $0 | $0 | $9,020 |
| Yamane Large Value Inst. | YLVIX | Large Value | 600,000.00 | 6.0% | $3,900 | $0 | $0 | $2,460 | $0 | $0 | $6,360 |
| Low Track S&P 500 Index Inv. | LTSPX | Large Blend (Index/Passive) | 700,000.00 | 7.0% | $1,050 | $0 | $0 | $980 | $0 | $0 | $2,030 |
| Georgia Large Cap Growth N | GLCGX | Large Growth | 500,000.00 | 5.0% | $1,500 | $0 | $0 | $3,150 | $0 | $0 | $4,650 |
| Emerged Value Opportunities Adv. | EVOAX | Mid-Cap Value | 200,000.00 | 2.0% | $1,000 | $0 | $0 | $1,340 | $0 | $0 | $2,340 |
| Low Track S&P 400 Index Inv. | LTSFX | Mid-Cap Blend (Index/Passive) | 200,000.00 | 2.0% | $300 | $0 | $0 | $300 | $0 | $0 | $600 |
| Moment Captured Growth Inv. | MCGIX | Mid-Cap Growth | 100,000.00 | 1.0% | $500 | $0 | $0 | $620 | $0 | $0 | $1,120 |
| Yamane Small Value Inst. | YSVIX | Small Value | 100,000.00 | 1.0% | $300 | $0 | $0 | $830 | $0 | $0 | $1,130 |
| Low Track S&P 600 Index Inv. | LTSSX | Small Blend (Index/Passive) | 100,000.00 | 1.0% | $100 | $0 | $0 | $490 | $0 | $0 | $590 |
| Georgia Small Cap Growth N | GSCGX | Small Growth | 100,000.00 | 1.0% | $0 | $0 | $0 | $690 | $0 | $0 | $690 |
| Yamane International Inst. | YIIXX | Foreign Large Blend | 700,000.00 | 7.0% | $700 | $0 | $0 | $5,250 | $0 | $0 | $5,950 |
| Far Lands Emerging Growth A | FLEGX | Diversified Emerging Mkts | 70,000.00 | 0.7% | $70 | $0 | $0 | $938 | $0 | $0 | $1,008 |
| Smithland Real Estate Securities D | SRESX | Real Estate | 80,000.00 | 0.8% | $0 | $0 | $0 | $720 | $0 | $0 | $720 |
| QRT Low Volatility Alpha D | QRTLX | Market Neutral | 50,000.00 | 0.5% | $0 | $0 | $0 | $875 | $0 | $0 | $875 |

*Continued on next page.*

FIG. 39

Total Plan Fee Detail

Fiduciary Benchmarks
Independent | Comprehensive | Informative

This page summarizes total plan fees by source and recipient. Also consolidated are Other Fees, Payments and Credits as well as Investment fees received.

Investment Frees to Service Provider

*Continued from previous page.*

| Fund Name | Ticker | Asset Category | Assets | % of Plan | Recordkeeper | TPA | Advisor/Consultant | Investment Manager | Credits to Participants | Credits to Plan | Total Expense |
|---|---|---|---|---|---|---|---|---|---|---|---|
| AUTOMATICALLY DIVERSIFIED OPTIONS | | | | | | | | | | | |
| Holistic Conservative Fund A | HCFAX | Conservative Allocation | 200,000.00 | 2.0% | $0 | $0 | $0 | $1,300 | $0 | $0 | $1,300 |
| Holistic Balanced Inv. | HBFAX | Moderate Allocation | 400,000.00 | 4.0% | $1,400 | $0 | $0 | $2,280 | $0 | $0 | $3,680 |
| Holistic Moderate Fund A | HMFAX | Moderate Allocation | 200,000.00 | 2.0% | $0 | $0 | $0 | $1,740 | $0 | $0 | $1,740 |
| Holistic Aggressive Fund A | HAFAX | Aggressive Allocation | 100,000.00 | 1.0% | $0 | $0 | $0 | $990 | $0 | $0 | $990 |
| Achieve Retirement Moderate 2010 E | ARMAX | Target Date 2000-2010 | 300,000.00 | 3.0% | $1,350 | $0 | $0 | $1,290 | $0 | $0 | $2,640 |
| Achieve Retirement Moderate 2015 E | ARMBX | Target Date 2011-2015 | 300,000.00 | 3.0% | $1,350 | $0 | $0 | $1,440 | $0 | $0 | $2,790 |
| Achieve Retirement Moderate 2020 E | ARMCX | Target Date 2016-2020 | 600,000.00 | 6.0% | $2,700 | $0 | $0 | $3,240 | $0 | $0 | $5,940 |
| Achieve Retirement Moderate 2025 E | ARMDX | Target Date 2021-2025 | 500,000.00 | 5.0% | $2,250 | $0 | $0 | $2,850 | $0 | $0 | $5,100 |
| Achieve Retirement Moderate 2030 E | ARMEX | Target Date 2026-2030 | 400,000.00 | 4.0% | $1,800 | $0 | $0 | $2,480 | $0 | $0 | $4,280 |
| Achieve Retirement Moderate 2035 E | ARMFX | Target Date 2031-2035 | 300,000.00 | 3.0% | $1,350 | $0 | $0 | $1,860 | $0 | $0 | $3,210 |
| Achieve Retirement Moderate 2040 E | ARMGX | Target Date 2036-2040 | 300,000.00 | 3.0% | $1,350 | $0 | $0 | $1,890 | $0 | $0 | $3,240 |
| Achieve Retirement Moderate 2045 E | ARMHX | Target Date 2041-2045 | 100,000.00 | 1.0% | $450 | $0 | $0 | $630 | $0 | $0 | $1,080 |
| Achieve Retirement Moderate 2050 E | ARMIX | Target Date 2046-2050 | 100,000.00 | 1.0% | $450 | $0 | $0 | $640 | $0 | $0 | $1,090 |
| Achieve Retirement Moderate 2055 E | ARMJX | Target Date 2051+ | 100,000.00 | 1.0% | $450 | $0 | $0 | $650 | $0 | $0 | $1,100 |
| Self-Directed Brokerage | - | - | 100,000.00 | 1.0% | | | | | | | |
| Total | | | 10,000,000.00 | 100% | $32,220 | $0 | $0 | $51,163 | $0 | $0 | $83,383 |

FIG. 40

Investment Managers – Total Expense Ratio Breakdown

Table 41-1

This page summarizes the breakdown of Investment Expense Ratios, which are paid from the net asset values of underlying investments. These fees are used to pay money managers, pay compensation to plan service providers and/or are available to offset plan related expenses. The table below allocates Total Investment Expense Ratios by recipient.

Fiduciary Benchmarks
Independent | Comprehensive | Informative

| Category | BMG | This Plan |
|---|---|---|
| Assets | $5-15 M | $10,000,000 |
| Plans in BMG | 496 Total Plans | |

Investment Fees by Fund

| Fund Name | Ticker | Asset Category | Assets | % of Plan | Recordkeeper | TPA | Advisor/Consultant | Investment Manager | Credits to Participants | Credits to Plan | Total Expense |
|---|---|---|---|---|---|---|---|---|---|---|---|
| CORE OPTIONS | | | | | | | | | | | |
| Johnson Stable Value D | N/A | Stable Value | 1,400,000.00 | 14.0% | 0.25% | 0.00% | 0.00% | 0.33% | 0.00% | 0.00% | 0.58% |
| RGA Total Return Bond Inv. | RTRBX | Intermediate-Term Bond | 1,100,000.00 | 11.0% | 0.40% | 0.00% | 0.00% | 0.42% | 0.00% | 0.00% | 0.82% |
| Yamane Large Value Inst. | YLVIX | Large Value | 600,000.00 | 6.0% | 0.65% | 0.00% | 0.00% | 0.41% | 0.00% | 0.00% | 1.06% |
| Low Track S&P 500 Index Inv. | LTSPX | Large Blend (Index/Passive) | 700,000.00 | 7.0% | 0.15% | 0.00% | 0.00% | 0.14% | 0.00% | 0.00% | 0.29% |
| Georgia Large Cap Growth N | GLCGX | Large Growth | 500,000.00 | 5.0% | 0.30% | 0.00% | 0.00% | 0.63% | 0.00% | 0.00% | 0.93% |
| Emerged Value Opportunities Adv. | EVOAX | Mid-Cap Value | 200,000.00 | 2.0% | 0.50% | 0.00% | 0.00% | 0.67% | 0.00% | 0.00% | 1.17% |
| Low Track S&P 400 Index Inv. | LTSFX | Mid-Cap Blend (Index/Passive) | 200,000.00 | 2.0% | 0.15% | 0.00% | 0.00% | 0.15% | 0.00% | 0.00% | 0.30% |
| Moment Captured Growth Inv. | MCGIX | Mid-Cap Growth | 100,000.00 | 1.0% | 0.50% | 0.00% | 0.00% | 0.62% | 0.00% | 0.00% | 1.12% |
| Yamane Small Value Inst. | YSVIX | Small Value | 100,000.00 | 1.0% | 0.30% | 0.00% | 0.00% | 0.83% | 0.00% | 0.00% | 1.13% |
| Low Track S&P 600 Index Inv. | LTSSX | Small Blend (Index/Passive) | 100,000.00 | 1.0% | 0.10% | 0.00% | 0.00% | 0.49% | 0.00% | 0.00% | 0.59% |
| Georgia Small Cap Growth N | GSCGX | Small Growth | 100,000.00 | 1.0% | 0.00% | 0.00% | 0.00% | 0.69% | 0.00% | 0.00% | 0.69% |
| Yamane International Inst. | YIHX | Foreign Large Blend | 700,000.00 | 7.0% | 0.10% | 0.00% | 0.00% | 0.75% | 0.00% | 0.00% | 0.85% |
| Far Lands Emerging Growth A | FLEGX | Diversified Emerging Mkts | 70,000.00 | 0.7% | 0.10% | 0.00% | 0.00% | 1.34% | 0.00% | 0.00% | 1.44% |
| Smithland Real Estate Securities D | SRESX | Real Estate | 80,000.00 | 0.8% | 0.00% | 0.00% | 0.00% | 0.90% | 0.00% | 0.00% | 0.90% |
| QRT Low Volatility Alpha D | QRTLX | Market Neutral | 50,000.00 | 0.5% | 0.00% | 0.00% | 0.00% | 1.75% | 0.00% | 0.00% | 1.75% |
| AUTOMATICALLY DIVERSIFIED OPTIONS | | | | | | | | | | | |
| Holistic Conservative Fund A | HCFAX | Conservative Allocation | 200,000.00 | 2.0% | 0.00% | 0.00% | 0.00% | 0.65% | 0.00% | 0.00% | 0.65% |
| Holistic Balanced Inv. | HBFAX | Moderate Allocation | 400,000.00 | 4.0% | 0.35% | 0.00% | 0.00% | 0.57% | 0.00% | 0.00% | 0.92% |
| Holistic Moderate Fund A | HMFAX | Moderate Allocation | 200,000.00 | 2.0% | 0.00% | 0.00% | 0.00% | 0.87% | 0.00% | 0.00% | 0.87% |
| Holistic Aggressive Fund A | HAFAX | Aggressive Allocation | 100,000.00 | 1.0% | 0.00% | 0.00% | 0.00% | 0.99% | 0.00% | 0.00% | 0.99% |
| Achieve Retirement Moderate 2010 E | ARMAX | Target Date 2000-2010 | 300,000.00 | 3.0% | 0.45% | 0.00% | 0.00% | 0.43% | 0.00% | 0.00% | 0.88% |
| Achieve Retirement Moderate 2015 E | ARMBX | Target Date 2011-2015 | 300,000.00 | 3.0% | 0.45% | 0.00% | 0.00% | 0.48% | 0.00% | 0.00% | 0.93% |
| Achieve Retirement Moderate 2020 E | ARMCX | Target Date 2016-2020 | 600,000.00 | 6.0% | 0.45% | 0.00% | 0.00% | 0.54% | 0.00% | 0.00% | 0.99% |
| Achieve Retirement Moderate 2025 E | ARMDX | Target Date 2021-2025 | 500,000.00 | 5.0% | 0.45% | 0.00% | 0.00% | 0.57% | 0.00% | 0.00% | 1.02% |
| Achieve Retirement Moderate 2030 E | ARMEX | Target Date 2026-2030 | 400,000.00 | 4.0% | 0.45% | 0.00% | 0.00% | 0.62% | 0.00% | 0.00% | 1.07% |
| Achieve Retirement Moderate 2035 E | ARMFX | Target Date 2031-2035 | 300,000.00 | 3.0% | 0.45% | 0.00% | 0.00% | 0.62% | 0.00% | 0.00% | 1.07% |
| Achieve Retirement Moderate 2040 E | ARMGX | Target Date 2036-2040 | 300,000.00 | 3.0% | 0.45% | 0.00% | 0.00% | 0.63% | 0.00% | 0.00% | 1.08% |
| Achieve Retirement Moderate 2045 E | ARMHX | Target Date 2041-2045 | 100,000.00 | 1.0% | 0.45% | 0.00% | 0.00% | 0.63% | 0.00% | 0.00% | 1.08% |
| Achieve Retirement Moderate 2050 E | ARMIX | Target Date 2046-2050 | 100,000.00 | 1.0% | 0.45% | 0.00% | 0.00% | 0.64% | 0.00% | 0.00% | 1.09% |
| Achieve Retirement Moderate 2055 E | ARMJX | Target Date 2051+ | 100,000.00 | 1.0% | 0.45% | 0.00% | 0.00% | 0.65% | 0.00% | 0.00% | 1.10% |
| Self-Directed Brokerage | – | – | 100,000.00 | 1.0% | – | – | – | – | – | – | – |
| Total | | | 10,000,000.00 | 100% | 0.322% | 0.00% | 0.00% | 0.512% | 0.00% | 0.00% | 0.834% |

FIG. 41

Glossary

 Fiduciary Benchmarks
Independent | Comprehensive | Informative

| | Definition |
|---|---|
| FeePoint | FeePoint is the expected fee for a plan that is calculated utilizing mathematical formulas focused on the individual service providers cost drivers.<br>• For Investment Management Expenses, FeePoint is based on the asset allocation of the plan.<br>• For an Advisor, FeePoint is based on the median observation of the benchmark group.<br>• For a Recordkeeper and Third-Party Administrator, FeePoint is based on the expected value of the regression line for the average account balance of the benchmark group.<br><br>See www.fiduciarybenchmarks.com/feepoint for more information. |
| Fiduciary Status Adjustment | The Fiduciary Status Adjustment is an additional fee that is added to FeePoint that reflects the added market value of Fiduciary Status for potentially 3 items:<br>• Plan Fiduciary Status for Plan Investments<br>• Plan Fiduciary Status for Model Portfolios<br>• Participant Fiduciary Status for providing advice to Participants<br><br>For example:<br>• A plan has 30% of it's assets in Model Portfolios<br>• FBi data shows that the median advisor/consultant fee for managing a Model Portfolio is 10 basis points<br>• The Fiduciary Status Adjustment would be 3 basis points placed on top of FeePoint (30% times 10 basis points)<br><br>See www.fiduciarybenchmarks.com/fiduciaryadjustment for more information. |
| ServicePoint | ServicePoint is the expected service level provided by an Advisor, Recordkeeper or Third-Party Administrator for five different market segments: Micro, Small, Medium, Large and Mega. Each service level contains three different data points of "degrees of value":<br>• Whether or not the service is typically provided (e.g. Form 5500)<br>• The Degree of Difficulty of the service (e.g. Includes non-mutual funds)<br>• The Frequency of the service (e.g. one time per year)<br><br>Fiduciary Benchmarks uses a statistical model to establish "value points" or "cost-factor points" for each service. Those services are then combined to produce a total score for each category. For example, the ServicePoint categories that an advisor provides to a Plan Sponsor is divided into three categories:<br>• Investment Services<br>• Vendor Management Services<br>• Plan Management Services<br><br>See www.fiduciarybenchmarks.com/servicepoint for more information. |
| Degree of Difficulty | The Degree of Difficulty for a service is a point score associated with the various ways a service can be performed. The point score was obtained by surveying a statistically meaningful number of expert service providers. A mathematical technique called Order of Magnitude was then used to assign point scores to the various degrees of difficulty. A higher degree of difficulty will be assigned a higher point score.<br><br>See www.fiduciarybenchmarks.com/dod for more information. |

FIG. 42

Disclosures

 Fiduciary Benchmarks
Independent | Comprehensive | Informative

- The information set forth in this report is based upon data we have received from your service provider for your retirement plan as well as information that we have received from other retirement plan sponsors and their service providers (the "Benchmark Group"). Fiduciary Benchmarks Insights, LLC (FBi) has not verified the accuracy or completeness of either the Subject Plan Data or the Benchmark Group Data. FBi cannot be responsible for any inaccuracies in the Data.

- FBi made a number of assumptions, which are described in the report, in compiling the plans in the Benchmark Group. For more info see www.fiduciarybenchmarks.com/comparisons.html. You should review this report and the information on the website and independently analyze whether the Benchmark Group includes plans that are sufficiently similar to your plan to make the information set forth in this report useful to you in carrying out your fiduciary functions.

- This report is based on the methodology utilized by FBi to gather, compile and present information and is described at www.fiduciarybenchmarks.com/overview.html. You should review the description in order to understand the approaches taken by FBi in preparing this report and in order to properly evaluate the information in the report.

- This report is for information purposes only. You must independently determine how to use and interpret the information set forth in this report, including whether you need the assistance of any retirement plan professionals to assist you in your interpretation of that information. Please note: some, and perhaps all, of the information may be time-sensitive. You should consider that in using this report.

FIG. 43

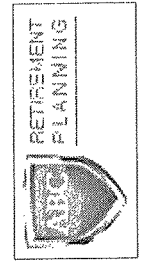
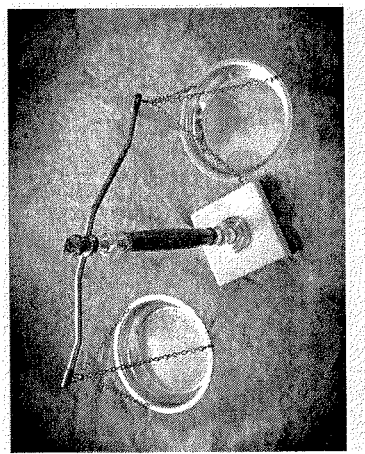
FIG. 47

Table of Contents

Fiduciary Benchmarks
Independent | Comprehensive | Informative

| INTRODUCTION | |
|---|---|
| Table of Contents | 1 |
| Fiduciary Benchmarks' Evaluation Process | 2 |

| TOTAL PLAN FEE DETAIL | |
|---|---|
| Summary | 3 |
| Total Plan Fee Detail | 4-5 |

| INVESTMENT MANAGER | |
|---|---|
| Customize Benchmark Group | 6 |
| Review Provider Quality | 7 |
| Assess Scope of Services | 8 |
| Examine Value Delivered | 9 |
| Investment Manager: Evaluate Fees | 10-11 |
| Evaluate Other Fees | 12 |
| Summary and Documentation | 13 |

| RECORDKEEPER | |
|---|---|
| Customize Benchmark Group | 14 |
| Review Provider Quality | 15 |
| Assess Scope of Services | 16 |
| Services Details | 17 |
| Examine Value Delivered | 18 |
| Evaluate Fees | 19-21 |
| Summary and Documentation | 22 |

| THIRD PARTY ADMINISTRATOR (TPA) | |
|---|---|
| Customize Benchmark Group | 23 |
| Review Provider Quality | 24 |
| Assess Scope of Services | 25 |
| Services Details | 26 |
| Examine Value Delivered | 27 |
| Evaluate Fees | 28 |
| Summary and Documentation | 29 |

| ADVISOR/CONSULTANT | |
|---|---|
| Customize Benchmark Group | 30 |
| Review Provider Quality | 31 |
| Assess Scope of Services | 32 |
| Services Details | 33 |
| Examine Value Delivered | 34 |
| Evaluate Fees | 35-37 |
| Summary and Documentation | 38 |

| APPENDIX | |
|---|---|
| Important Information and Disclaimers | 39 |

Report Key

The following designations are referred to throughout the report:

Chart Designations
◪ = This Plan
▥ = Benchmark Group (BMG)
▨ = Less than Median
▩ = Greater than Median Page 1 of 43

FIG. 48

Total Plan Fee Detail

Summarize Fees

Fiduciary Benchmarks thinks the first critical step in assessing Fee Reasonableness is to make sure we are gathering ALL fees being paid to the major service providers for the plan. In that regard, this section summarizes all Fees, Payments and Credits being made to all of your service providers. The amounts received by each service provider can then be easily tracked to their individual chapter thus making sure that fees are reasonable AT THE SERVICE PROVIDER LEVEL – which is required by ERISA section 404(a)(1)(a) and DOL regulation 408(b)(2).

Fiduciary Benchmarks
Independent | Comprehensive | Informative

Total Plan Fee Summary

50a —

| | Description | $ Amount | (%) |
|---|---|---|---|
| Source of Fees | Total Fund Expense Ratio | $ 98,069 | 0.787% |
| | Other Fees Received | $ 59,337 | 0.476% |
| | Total Credits to Plan | $ (20,000) | (0.161%) |
| | Total Credits to Participants | | – |
| | Total Plan Fee | $ 137,406 | 1.103% |
| Allocation of Fees | Total Money Manager Fee | $ 63,705 | 0.511% |
| | Total Recordkeeper Fee | $ 29,202 | 0.234% |
| | Total TPA Fee | $ 6,925 | 0.056% |
| | Total Advisor Fee | $ 37,575 | 0.302% |
| | Total Fee to Others | | – |
| | Total Plan Fee | $ 137,406 | 1.103% |

50b —

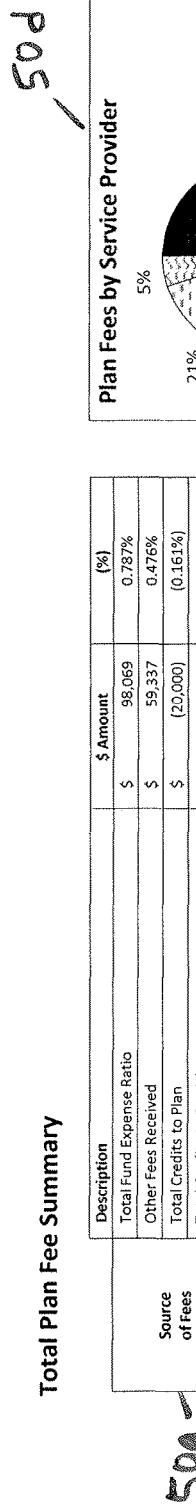

Plan Fees by Service Provider

- Investment Mgrs — 46%
- Advisor/Consultant — 21%
- Recordkeeper — 27%
- TPA — 5%

50d

Other Fees, Payments and Credits

50c

| Service Provider | Category | Description | Type | $ Amount | How is Fee Paid? |
|---|---|---|---|---|---|
| Recordkeeper | Primary Fee | Recordkeeping Fee | $ amount | $ 22,500 | Plan Credit Account |
| Recordkeeper | Credit – Plan | Plan ERISA Credit | $ amount | $ (20,000) | Recordkeeper |
| TPA | Primary Fee | Base Fee | $ amount | $ 2,500 | Plan Credit Account |
| TPA | Primary Fee | Per Participant Fee (177 Participants @ $25/pp) | $ amount | $ 4,425 | Plan Credit Account |
| Advisor/Consultant | Primary Fee | Advisory Fee | 0.220% on plan | $ 27,412 | Plan Credit Account |
| Advisor/Consultant | Primary Fee | RFI and RFP work | $ amount | $ 2,500 | Plan Assets |

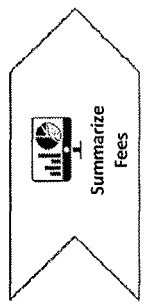

FIG. 50

Total Plan Fee Detail

Summarize Fees

This is the summary of the Total Expense Ratio from the Total Plan Fees Detail Page

Fiduciary Benchmarks
Independent | Comprehensive | Informative

Investment Fees to Service Providers

| Fund Name | Ticker | Assets | % of Plan | Credits to Plan | Credits to Participants | Investment Manager | Recordkeeper | TPA | Advisor/Consultant | Total Expense |
|---|---|---|---|---|---|---|---|---|---|---|
| CORE OPTIONS | | | | | | | | | | |
| Johnson Stable Value D | - | $ 1,744,383 | 14.0% | $ - | $ - | $ 3,140 | $ 4,361 | $ - | $ 2,617 | $ 10,117 |
| RGA Total Return Bond A | - | $ 1,370,587 | 11.0% | $ - | $ - | $ 7,812 | $ 3,426 | $ - | $ - | $ 11,239 |
| Yamane Large Value Inst. | - | $ 747,593 | 6.0% | $ - | $ - | $ 6,056 | $ 1,869 | $ - | $ - | $ 7,924 |
| Low Track S&P 500 Index Inv. | - | $ 872,192 | 7.0% | $ - | $ - | $ 785 | $ 1,744 | $ - | $ - | $ 2,529 |
| Georgia Large Cap Growth N | - | $ 622,994 | 5.0% | $ - | $ - | $ 2,990 | $ 2,180 | $ - | $ 623 | $ 5,794 |
| Emerging Value Opportunities Adv. | - | $ 249,198 | 2.0% | $ - | $ - | $ 1,670 | $ 623 | $ - | $ 623 | $ 2,916 |
| Low Track S&P 400 | - | $ 249,198 | 2.0% | $ - | $ - | $ 249 | $ 498 | $ - | $ - | $ 748 |
| Moment Captured Growth | - | $ 186,898 | 1.5% | $ - | $ - | $ 1,159 | $ 467 | $ - | $ 467 | $ 2,093 |
| Yamane Small Value Inst. | - | $ 124,599 | 1.0% | $ - | $ - | $ 598 | $ 498 | $ - | $ 311 | $ 1,408 |
| Low Track S&P 600 | - | $ 124,599 | 1.0% | $ - | $ - | $ 125 | $ 249 | $ - | $ - | $ 374 |
| Georgia Small Cap Growth N | - | $ 124,599 | 1.0% | $ - | $ - | $ 860 | $ - | $ - | $ - | $ 860 |
| Yamane International Inst. | - | $ 872,192 | 7.0% | $ - | $ - | $ 7,501 | $ - | $ - | $ - | $ 7,501 |
| Far Lands Emerging Growth A | - | $ 87,719 | 0.7% | $ - | $ - | $ 820 | $ 218 | $ - | $ 218 | $ 1,256 |
| SmithLand Real Estate Securities D | - | $ 99,679 | 0.8% | $ - | $ - | $ 797 | $ 100 | $ - | $ - | $ 897 |
| AUTO DIVERSIFIED OPTIONS | | | | | | | | | | |
| Holistic Conservative Fund A | - | $ 249,198 | 2.0% | $ - | $ - | $ 748 | $ 249 | $ - | $ 623 | $ 1,620 |
| Holistic Aggressive Fund A | - | $ 124,599 | 1.0% | $ - | $ - | $ 797 | $ 125 | $ - | $ 311 | $ 1,234 |
| Holistic Balanced Fund A | - | $ 498,395 | 4.0% | $ - | $ - | $ 2,841 | $ 498 | $ - | $ 1,246 | $ 4,585 |
| Holistic Moderate Fund A | - | $ 249,198 | 2.0% | $ - | $ - | $ 1,296 | $ 249 | $ - | $ 623 | $ 2,168 |
| Achieve Retirement Moderate 2010 E | - | $ 373,797 | 3.0% | $ - | $ - | $ 2,019 | $ 934 | $ - | $ - | $ 2,953 |
| Achieve Retirement Moderate 2015 E | - | $ 373,797 | 3.0% | $ - | $ - | $ 2,205 | $ 934 | $ - | $ - | $ 3,140 |
| Achieve Retirement Moderate 2025 E | - | $ 622,994 | 5.0% | $ - | $ - | $ 3,863 | $ 1,557 | $ - | $ - | $ 5,420 |
| Achieve Retirement Moderate 2020 E | - | $ 747,593 | 6.0% | $ - | $ - | $ 4,411 | $ 1,869 | $ - | $ - | $ 6,280 |
| Achieve Retirement Moderate 2030 E | - | $ 498,395 | 4.0% | $ - | $ - | $ 3,339 | $ 1,246 | $ - | $ - | $ 4,585 |
| Achieve Retirement Moderate 2035 E | - | $ 373,797 | 3.0% | $ - | $ - | $ 2,504 | $ 934 | $ - | $ - | $ 3,439 |
| Achieve Retirement Moderate 2040 E | - | $ 373,797 | 3.0% | $ - | $ - | $ 2,542 | $ 934 | $ - | $ - | $ 3,476 |
| Achieve Retirement Moderate 2045 E | - | $ 124,599 | 1.0% | $ - | $ - | $ 847 | $ 311 | $ - | $ - | $ 1,159 |
| Achieve Retirement Moderate 2050 E | - | $ 124,599 | 1.0% | $ - | $ - | $ 860 | $ 311 | $ - | $ - | $ 1,171 |

51a  51b  51c  51d  51e

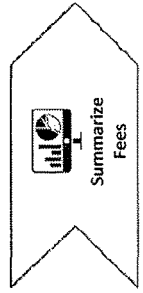

FIG. 51

Total Plan Fee Detail

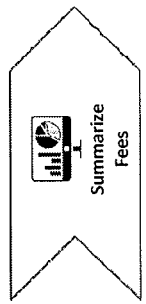

Summarize Fees

This is the summary of the Total Expense Ratio from the Total Plan Fees Detail Page

Fiduciary Benchmarks
Independent | Comprehensive | Informative

Investment Fees to Service Providers

| Fund Name | Ticker | Assets | % of Plan | Credits to Plan | Credits to Participants | Investment Manager | Recordkeeper | TPA | Advisor/ Consultant | Total Expense |
|---|---|---|---|---|---|---|---|---|---|---|
| AUTO DIVERSIFIED OPTIONS | | | | | | 52a | 52b | 52c | 52d | 52e |
| Achieve Retirement Moderate 2055 E | - | $ 124,599 | 1.0% | $ - | $ - | $ 872 | $ 311 | $ - | $ - | $ 1,184 |
| OTHER OPTIONS | | | | | | | | | | |
| Self-Directed Brokerage | - | $ 124,599 | 1.0% | $ - | $ - | $ - | $ - | $ - | $ - | $ - |
| TOTAL | | $ 12,459,886 | 100% | $ - | $ - | $ 63,705 | $ 26,702 | $ - | $ 7,663 | $ 98,069 |

FIG. 52

Page 5 of 43

Investment Manager Appendix

Investment Manager: Customize Benchmark Group

Fiduciary Benchmarks
Independent | Comprehensive | Informative

THE FIRST STEP of Fiduciary Benchmarks' process is to build a customized benchmark group from our proprietary database of tens of thousands of plans. Note that all data is sourced directly from service providers, is typically updated on a quarterly basis, and normalized to allow for valid comparisons. A proprietary and sophisticated mathematical model is then applied to build a custom benchmark group that maximizes the degree of predictability. The end result is illustrated by the four tables shown below.

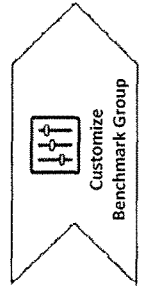

Customize Benchmark Group

Economically Logical
Total Plan Assets is a significant driver of Investment Manager Fees.

Statistically Valid
Our mathematical model discards outliers and uses those plans that are most predictive of the fees for your Investment Managers.

Diversified by Investment Manager
Sampled plans provide a meaningful cross section of Investment Manager firms and options.

Diversified by Recordkeeper
We do not let any one type of Recordkeeper dominate the benchmark group.

54a | 54b | 54e

| Characteristics | This Plan | Low | Median | High |
|---|---|---|---|---|
| Assets | $12,459,886 | $10,000,000 | $12,500,000 | $15,000,000 |

54d | 54e

| Characteristics | This Plan | 401(k) | 403(b) | Other |
|---|---|---|---|---|
| Plan Type | 401(k) | 1318 | 42 | 11 |

54f | 54g

| | # of Firms | # of Options |
|---|---|---|
| Total Assets $14.8B | 216 | 3930 |

1371 Plans — 54i
Plans by Business Model
- TPA 45%
- Insurance Co. 2%
- Bank 14%
- Mutual Funds 17%
- Other 22%

105 Recordkeepers — 54h
Recordkeepers by Business Model
- TPA 62
- Insurance Co. 18
- Bank 15
- Mutual Funds 7
- Other 3

FIG. 54

Investment Manager: Review Provider Quality

Review Provider Quality

Fiduciary Benchmarks
Independent | Comprehensive | Informative

THE SECOND STEP is to examine "What You Are Getting." In that regard, the Department of Labor has specifically noted in prior rulings that the quality of a Service Provider can be considered when determining fee reasonableness. Fiduciary Benchmarks examined leading due diligence approaches used to select investment managers and categorized key components into the three areas shown below. While Fiduciary Benchmarks does not currently benchmark the factors listed on this page, we do believe the following items are important to consider in relation to the assessment of investment manager fee reasonableness.

Organizational Characteristics

How an Investment Manager is structured, organized and provisioned can impact the culture and ultimately, their people and processes. Listed below are key organizational factors that should be considered when determining fee reasonableness.

- History of the Firm
- Ownership Structure
- Assets Under Advisement
- Organizational Stability
- Code of Ethics
- No Conflicts of Interest

Investment Decision Makers

Ultimately, how an investment performs is greatly dependent on the people that manage the money. Therefore, listed below are a number of items you should consider with respect to the people making investment decisions when determining fee reasonableness.

- Education, Background and Experience
- Professional Designations
- Track Record of Success
- Limited Turnover
- Clear Succession Plans (where applicable)
- Aligned Incentive and Compensation Programs

Investment Process

The processes used by a money manager to make investment decisions is a major factor in how an investment performed in the past and is expected to perform in the future. Listed below are key process characteristics that should be considered when determining fee reasonableness.

- Clearly Defined and Repeatable Process
- Any Changes in Historical Process are Documented and Understood
- Procedures are in Place to Manage Risk, Composition and Style vs. Mandate Page 8 of 43

FIG. 55

Investment Manager: Assess Scope of Services

Assess Scope of Services

Fiduciary Benchmarks
Independent | Comprehensive | Informative

THE THIRD STEP is to assess the scope of services provided by your Investment Managers. Fiduciary Benchmarks reviewed the major building blocks of investment programs and the key drivers of investment program costs and has summarized them below. Each plan's unique investment offerings, asset allocation and utilization of active and passive management creates differences in total investment costs from one plan to another. As such, investment level cost comparisons should be the focus when assessing fees reasonableness.

Investment Offering by Asset Category — 56a

| Category | Asset Category of Options | Plan Offers? — 56b | Active or Passive |
|---|---|---|---|
| Auto-Diversified | Target Retirement Date Funds | Yes | Active |
| | Risk Based/Balanced Funds | Yes | Active |
| | Core Model Portfolios – Target Date | No | — |
| | Core Model Portfolios – Risk Based | Yes | — |
| | Managed Account Program | Yes | — |
| | Stable Value | Yes | Active |
| | Guaranteed/General Acct | No | — |
| | Money Market | No | — |
| | Fixed Income | Yes | Active |
| | High Yield | No | — |
| Core Options | Large Cap Value | Yes | Active |
| | Large Cap Blend | Yes | Passive |
| | Large Cap Growth | Yes | Active |
| | Mid Cap Value | Yes | Active |
| | Mid Cap Blend | Yes | Passive |
| | Mid Cap Growth | Yes | Active |
| | Small Cap Value | Yes | Active |
| | Small Cap Blend | Yes | Passive |
| | Small Cap Growth | Yes | Active |
| | International | Yes | Active |
| | Emerging Markets | Yes | Active |
| | Global | No | — |
| | Real Estate | Yes | Active |
| | Other Alternative Assets | No | — |
| | Other Asset Categories | — | — |
| Other Options | SDA/Funds Window | Yes | — |
| | Company Stock | No | — |

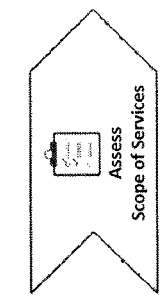

Active or Passive Utilization — 56c
Benchmark Group
ACTIVE 25% 50% PASSIVE 75%

Investment Offering Summary by Tier and Active or Passive Use — 56d

| | This Plan | Average Plan |
|---|---|---|
| Total No. Options | 35 | 29 |
| Number Auto-Diversified Options | 20 | 9 |
| Number Core Options | 14 | 20 |
| Number Other Options | 1 | 0 |
| Number Actively Managed Options | 26 | 27 |
| Number Passive Options | 3 | 3 |
| Number Not Applicable Options | 6 | 0 |

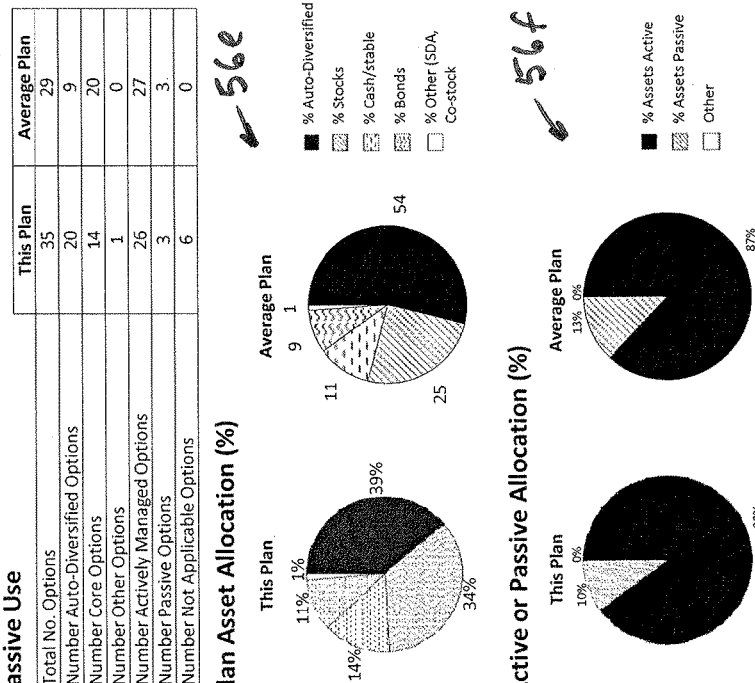

Plan Asset Allocation (%) — 56e

- % Auto-Diversified
- % Stocks
- % Cash/stable
- % Bonds
- % Other (SDA, Co-stock)

Active or Passive Allocation (%) — 56f

- % Assets Active
- % Assets Passive
- Other

FIG. 56

Investment Manager: Examine Value Delivered

Examine Value Delivered

Fiduciary Benchmarks
Independent | Comprehensive | Informative

THE FOURTH STEP is to examine the value delivered from Investment Managers. Fiduciary Benchmarks has summarized three key areas to help in this assessment. Investment costs are generally the largest expenses borne by a plan, but it is important to not consider cost in isolation. Also deserving consideration are an investment's relative performance and ability to remain in compliance with a plan's investment policy, which are both key value factors that support participant retirement readiness and overall plan governance. In addition, an investment's alignment with a plan's policies and procedures pertaining to indirect compensation should be considered.

Investment Performance

Investment performance measurement varies based on the goals and objectives of the specific manager. Generally, the following is considered when benchmarking the performance of an investment:

- Absolute Performance
- Risk Adjusted Performance
- Performance vs. Index
- Performance vs. Peer Group
- Performance Volatility

Compliance with Plan's Investment Policy

Investment policy compliance is a measure of an investment's ability to meet a set of appropriateness standards over rolling periods of time which support its ongoing role as part of an investment line up. Common measures include:

- Performance vs. Index
- Performance vs. Peer Group
- Meets Risk/Volatility Objectives
- Meets Style/Composition Objectives
- Meets Capacity Requirements
- Maintains Consistency in Investment Process
- Maintains Stability in Management Team
- Maintains Stability in Organization

Optimized Treatment of Indirect Compensation

Indirect compensation from investments, including proprietary credits, can be used to offset plan expenses. Where such credits are utilized, investment expense ratios are commensurately higher. These amounts are generally treated in one of the three approaches below:

- Retained by plan service providers as payment for services rendered to the plan.
- Credited to the plan as a direct offset of explicit service provider fees.
- Rebated to participant accounts.

FIG. 57

Investment Manager: Evaluate Fees

Fiduciary Benchmarks
Independent | Comprehensive | Informative

THE FIFTH STEP is to evaluate the fees associated with each of your investment options. In order to ensure an apples-to-apples comparison, FBi considers each fund's characteristics (asset class, active/passive status, and if it pays revenue sharing) when determining which comparison set of funds within the benchmark group to use. The fee information given below should be considered in concert with the "Value Delivered" from each of your plan investments and not on a stand-alone basis.

Benchmark Group Treatment of Indirect Compensation

- Retained by Svc Provider(s): 50%
- Credited to Plan: 45%
- Rebated to Participants: 1%
- Multiple Approaches: 3%
- No Indirect Compensation: 1%

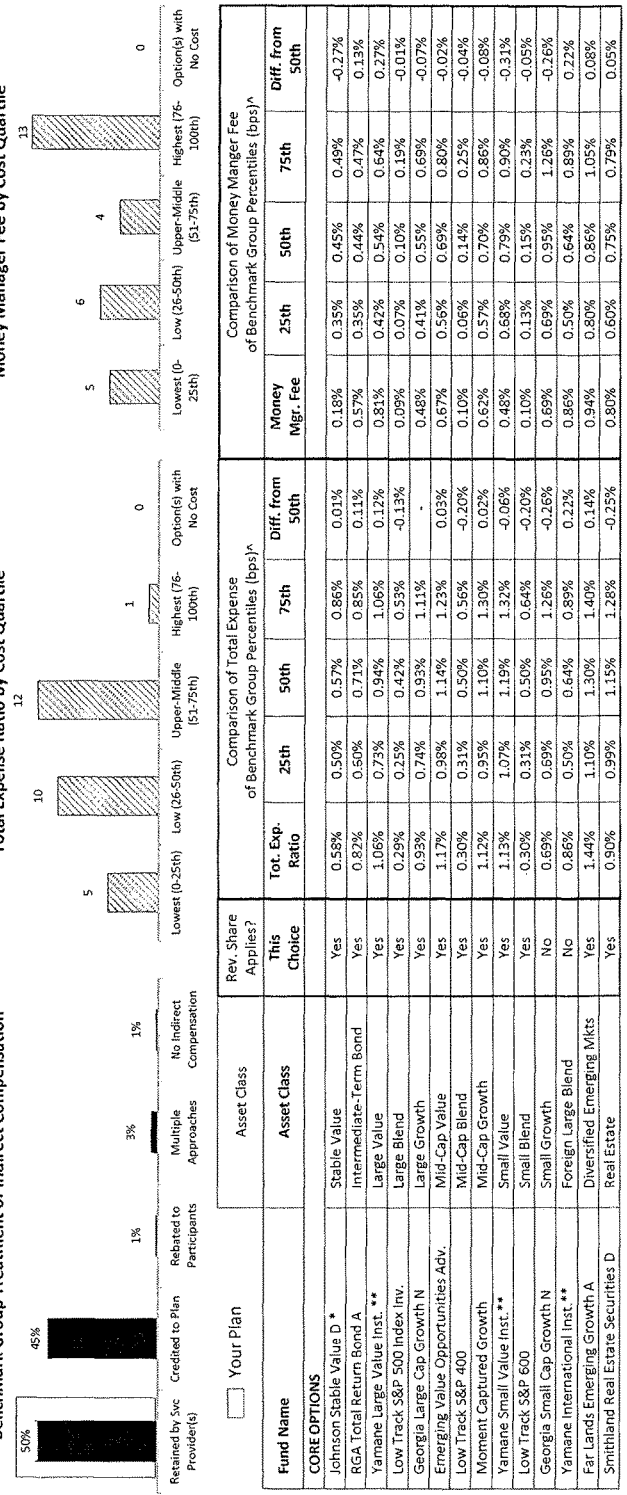

Total Expense Ratio by Cost Quartile

| | Lowest (0-25th) | Low (26-50th) | Upper-Middle (51-75th) | Highest (76-100th) | Option(s) with No Cost |
|---|---|---|---|---|---|
| | 5 | 10 | 12 | 1 | 0 |

Money Manager Fee by Cost Quartile

| | Lowest (0-25th) | Low (26-50th) | Upper-Middle (51-75th) | Highest (76-100th) | Option(s) with No Cost |
|---|---|---|---|---|---|
| | 5 | 6 | 4 | 13 | 0 |

☐ Your Plan

| Fund Name | Asset Class | Rev. Share Applies? This Choice | Tot. Exp. Ratio | Comparison of Total Expense of Benchmark Group Percentiles (bps)^ ||||| Money Mgr. Fee | Comparison of Money Manger Fee of Benchmark Group Percentiles (bps)^ |||||
|---|---|---|---|---|---|---|---|---|---|---|---|---|---|---|
| | | | | 25th | 50th | 75th | Highest (76-100th) | Diff. from 50th | | 25th | 50th | 75th | Highest (76-100th) | Diff. from 50th |
| CORE OPTIONS | | | | | | | | | | | | | | |
| Johnson Stable Value D * | Stable Value | Yes | 0.58% | 0.50% | 0.57% | 0.86% | | 0.01% | 0.18% | 0.35% | 0.45% | 0.49% | | -0.27% |
| RGA Total Return Bond A | Intermediate-Term Bond | Yes | 0.82% | 0.50% | 0.71% | 0.85% | | 0.11% | 0.57% | 0.35% | 0.44% | 0.47% | | 0.13% |
| Yamane Large Value Inst. ** | Large Value | Yes | 1.06% | 0.73% | 0.94% | 1.06% | | 0.12% | 0.81% | 0.42% | 0.54% | 0.64% | | 0.27% |
| Low Track S&P 500 Index Inv. | Large Blend | Yes | 0.29% | 0.25% | 0.42% | 0.53% | | -0.13% | 0.09% | 0.07% | 0.10% | 0.19% | | -0.01% |
| Georgia Large Cap Growth N | Large Growth | Yes | 0.93% | 0.74% | 0.93% | 1.11% | | - | 0.48% | 0.41% | 0.55% | 0.69% | | -0.07% |
| Emerging Value Opportunities Adv. | Mid-Cap Value | Yes | 1.17% | 0.98% | 1.14% | 1.23% | | 0.03% | 0.67% | 0.56% | 0.69% | 0.80% | | -0.02% |
| Low Track S&P 400 | Mid-Cap Blend | Yes | 0.30% | 0.31% | 0.50% | 0.56% | | -0.20% | 0.10% | 0.06% | 0.14% | 0.25% | | -0.04% |
| Moment Captured Growth | Mid-Cap Growth | Yes | 1.12% | 0.95% | 1.10% | 1.30% | | 0.02% | 0.62% | 0.57% | 0.70% | 0.86% | | -0.08% |
| Yamane Small Value Inst.** | Small Value | Yes | 1.13% | 1.07% | 1.19% | 1.32% | | -0.06% | 0.48% | 0.68% | 0.79% | 0.90% | | -0.31% |
| Low Track S&P 600 | Small Blend | Yes | 0.30% | 0.31% | 0.50% | 0.64% | | -0.20% | 0.10% | 0.13% | 0.15% | 0.23% | | -0.05% |
| Georgia Small Cap Growth N | Small Growth | No | 0.69% | 0.69% | 0.95% | 1.26% | | -0.26% | 0.69% | 0.69% | 0.95% | 1.26% | | -0.26% |
| Yamane International Inst. ** | Foreign Large Blend | No | 0.86% | 0.50% | 0.64% | 0.89% | | 0.22% | 0.86% | 0.50% | 0.64% | 0.89% | | 0.22% |
| Far Lands Emerging Growth A | Diversified Emerging Mkts | Yes | 1.44% | 1.10% | 1.30% | 1.40% | | 0.14% | 0.94% | 0.80% | 0.86% | 1.05% | | 0.08% |
| Smithland Real Estate Securities D | Real Estate | Yes | 0.90% | 0.99% | 1.15% | 1.28% | | -0.25% | 0.80% | 0.60% | 0.75% | 0.79% | | 0.05% |

^ Comparison illustrates range of expenses for investments having the same asset category and revenue sharing characteristics as the plan fund in question.
* This fund may be subject to a market value adjustment upon termination. If due to its structure, this investment does not report an explicit expense ratio and/or fee credit, a market based average may be applied. The market based average is established by Fiduciary Benchmarks based on the reported levels of expense and fee offsets for similar vehicles across similar benchmark groups. The resulting combined total expense ratio will be used for benchmarking. The characteristics and associated value of Guaranteed Rate investments varies based on such things as the current guaranteed rate, the minimum guaranteed rate, the terms and conditions of rate resets, the credit quality of the guarantor and other accruing benefits associated with investment. Accordingly, cost should always be considered in conjunction with an investment's overall value characteristics.
** A proprietary fund is defined as "Investments that are managed by the Recordkeeper or its affiliates and excludes choices where a sub-advisor has been hired". The amount of assets or number of funds that are managed by the Recordkeeper should not be the determining factor of the plan's final investment lineup. Ultimately, each option must be able to withstand the normal fiduciary due diligence of people, process, performance, cost, and other factors. This plan's allocation to proprietary choices is 14% of plan assets. The Benchmark Group average amount of assets in proprietary choices (where applicable) is 33%.

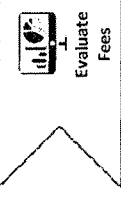

FIG. 58

Investment Manager: Evaluate Fees

Fiduciary Benchmarks
Independent | Comprehensive | Informative

THE FIFTH STEP is to evaluate the fees associated with each of your investment options. In order to ensure an apples-to-apples comparison, FBi considers each fund's characteristics (asset class, active/passive status, and if it pays revenue sharing) when determining which comparison set of funds within the benchmark group to use. The fee information given below should be considered in concert with the "Value Delivered" from each of your plan investments and not on a stand-alone basis.

| Fund Name | Asset Class | Asset Class | Rev. Share Applies? This Choice | Tot. Exp. Ratio | Comparison of Total Expense of Benchmark Group Percentiles (bps)^ | | | | Money Mgr. Fee | Comparison of Money Manger Fee of Benchmark Group Percentiles (bps)^ | | | |
|---|---|---|---|---|---|---|---|---|---|---|---|---|---|
| | | | | | 25th | 50th | 75th | Diff. from 50th | | 25th | 50th | 75th | Diff. from 50th |
| AUTO DIVERSIFIED OPTIONS | | | | | | | | | | | | | |
| Holistic Conservative Fund A | Conservative Allocation | | Yes | 0.65% | 0.81% | 0.97% | 1.15% | -0.32% | 0.30% | 0.45% | 0.55% | 0.74% | -0.25% |
| Holistic Aggressive Fund A | Moderate Allocation | | Yes | 0.99% | 0.63% | 0.86% | 1.08% | 0.13% | 0.64% | 0.34% | 0.54% | 0.72% | 0.10% |
| Holistic Balanced Fund A | Moderate Allocation | | Yes | 0.92% | 0.63% | 0.86% | 1.08% | 0.06% | 0.57% | 0.34% | 0.54% | 0.72% | 0.03% |
| Holistic Moderate Fund A | Moderate Allocation | | Yes | 0.87% | 0.63% | 0.86% | 1.08% | 0.01% | 0.52% | 0.34% | 0.54% | 0.72% | -0.02% |
| Achieve Retirement Moderate 2010 E | Target Date 2000-2010 | | Yes | 0.79% | 0.60% | 0.70% | 0.85% | 0.09% | 0.54% | 0.27% | 0.37% | 0.45% | 0.17% |
| Achieve Retirement Moderate 2015 E | Target Date 2011-2015 | | Yes | 0.84% | 0.56% | 0.85% | 0.96% | -0.01% | 0.59% | 0.36% | 0.45% | 0.50% | 0.14% |
| Achieve Retirement Moderate 2020 E | Target Date 2016-2020 | | Yes | 0.87% | 0.59% | 0.90% | 0.99% | -0.03% | 0.62% | 0.36% | 0.49% | 0.54% | 0.13% |
| Achieve Retirement Moderate 2025 E | Target Date 2016-2020 | | Yes | 0.84% | 0.59% | 0.90% | 0.99% | -0.06% | 0.59% | 0.36% | 0.49% | 0.54% | 0.10% |
| Achieve Retirement Moderate 2030 E | Target Date 2021-2025 | | Yes | 0.92% | 0.73% | 0.88% | 1.00% | 0.04% | 0.67% | 0.38% | 0.49% | 0.57% | 0.18% |
| Achieve Retirement Moderate 2035 E | Target Date 2026-2030 | | Yes | 0.92% | 0.75% | 0.92% | 1.03% | - | 0.67% | 0.44% | 0.54% | 0.60% | 0.13% |
| Achieve Retirement Moderate 2040 E | Target Date 2031-2035 | | Yes | 0.93% | 0.77% | 0.96% | 1.05% | -0.03% | 0.68% | 0.46% | 0.52% | 0.62% | 0.16% |
| Achieve Retirement Moderate 2045 E | Target Date 2036-2040 | | Yes | 0.93% | 0.78% | 0.94% | 1.05% | -0.01% | 0.68% | 0.46% | 0.56% | 0.63% | 0.12% |
| Achieve Retirement Moderate 2050 E | Target Date 2041-2045 | | Yes | 0.94% | 0.78% | 0.99% | 1.06% | -0.05% | 0.69% | 0.46% | 0.53% | 0.63% | 0.16% |
| Achieve Retirement Moderate 2055 E | Target Date 2051+ | | Yes | 0.95% | 0.79% | 0.83% | 1.06% | 0.12% | 0.70% | 0.47% | 0.63% | 0.64% | 0.07% |
| OTHER OPTIONS | | | | | | | | | | | | | |
| Self-Directed Brokerage | Self-Directed Brokerage | | No | | | | | | | | | | |
| Total | | | | 0.787% | | | | | 0.511% | | | | |

^ Comparison illustrates range of expense for investments having the same asset category and revenue sharing characteristics as the plan fund in question.
* This fund may be subject to a market value adjustment upon termination. If due to its structure, this investment does not report an explicit expense ratio and or fee credit, a market based average may be applied. The market based average is established by Fiduciary Benchmarks based on the reported levels of expense and fee offsets for similar vehicles across similar benchmark groups. The resulting combined total expense ratio will be used for benchmarking. The characteristics and associated value of Guaranteed Rate investments varies based on such things as the current guaranteed rate, the minimum guaranteed rate, the terms and conditions of rate resets, the credit quality of the guarantor and other accruing benefits associated with investment. Accordingly, cost should always be considered in conjunction with an investment's overall value characteristics.
** A proprietary fund is defined as "investments that are managed by the Recordkeeper or its affiliates and excludes choices where a sub-advisor has been hired". The amount of assets or number of funds that are managed by the Recordkeeper should not be the determining factor of the plan's final investment lineup. Ultimately, each option must be able to withstand the normal fiduciary due diligence of people, process, performance, cost, and other factors. This plan's allocation to proprietary choices is 14% of plan assets. The Benchmark Group average amount of assets in proprietary choices (where applicable) is 33%.

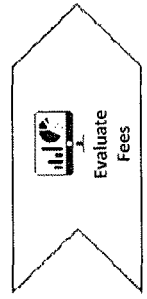

FIG. 59

Investment Manager: Evaluate Other Fees

Evaluate Fees

THE FIFTH STEP is to evaluate the fees associated with each of your investment options, in this case (where applicable) Managed Account programs and Self Directed Account ("SDA") options (as applicable to the investment offerings of this plan). In both cases, these options provide additional choices for participants to invest in beyond the core investments offered by your plan. Plan sponsors have the responsibility to assess the fees reasonableness of these options.

Fiduciary Benchmarks
Independent | Comprehensive | Informative

Managed Accounts Fees and Use

| % of Plans Offering in the Benchmark Group: | 7% |
|---|---|
| Managed Account Provider: | Fiduciary Money Management |
| Fiduciary Status: | 3(38) |

| | | | Benchmark Group Percentiles | | |
|---|---|---|---|---|---|
| Managed Account Utilization: | This Plan | % of Plan | 25th | 50th | 75th |
| No. of Plan Participants Using | 5 | 3.0% | 1% | 5% | 19% |
| Plan Assets in Managed Accounts | $750,000 | 6.0% | 1% | 12% | 34% |

| | | Benchmark Group Percentiles | | |
|---|---|---|---|---|
| Managed Account Utilization: | This Plan | 25th | 50th | 75th |
| Employer Annual Fee | $0 | $0 | $0 | $0 |
| Participant Minimum Fee | $0 | $0 | $0 | $0 |
| Fee for $10,000 Participant Account | 0.75% | 0.57% | 0.65% | 0.65% |
| Fee for $25,000 Participant Account | 0.70% | 0.55% | 0.65% | 0.65% |
| Fee for $50,000 Participant Account | 0.70% | 0.55% | 0.65% | 0.65% |
| Fee for $100,000 Participant Account | 0.60% | 0.54% | 0.63% | 0.65% |
| Fee for $250,000 Participant Account | 0.50% | 0.45% | 0.55% | 0.55% |
| Fee for $500,000 Participant Account | 0.50% | 0.35% | 0.35% | 0.50% |

SDA Accounts Fees and Use

| % of Plans Offering in the Benchmark Group: | 8% |
|---|---|
| SDA Provider: | Online Trading, Inc. |

| | | | Benchmark Group Percentiles | | |
|---|---|---|---|---|---|
| SDA Account Utilization: | This Plan | % of Plan | 25th | 50th | 75th |
| No. of Plan Participants Using | 10 | 5.6% | 0% | 2% | 4% |
| Plan Assets in SDA | $124,599 | 1.0% | 1% | 5% | 12% |

| | | Benchmark Group Percentiles ($) | | |
|---|---|---|---|---|
| SDA Account Fee Schedule | This Plan | 25th | 50th | 75th |
| Employer Annual Fee | $1,250 | $500 | $500 | $500 |
| Participant Minimum Fee | $100 | $100 | $100 | $195 |
| Internet Stock Trades | $19 | $8 | $9 | $21 |
| Phone Assisted Stock Trades | $79 | $25 | $32 | $39 |

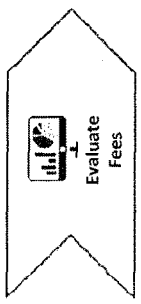

FIG. 60

Page 13 of 43

Investment Manager: Summary and Documentation

Fiduciary Benchmarks
Independent | Comprehensive | Informative

To assist you in the evaluation of your Investment Managers, Fiduciary Benchmarks has pulled the most relevant data and statistics from our process and displayed them below. As a Fiduciary, you have the ultimate responsibility of making sure you assess and negotiate REASONABLE fees from your Investment Managers. The information below should help you in that decision-making process.

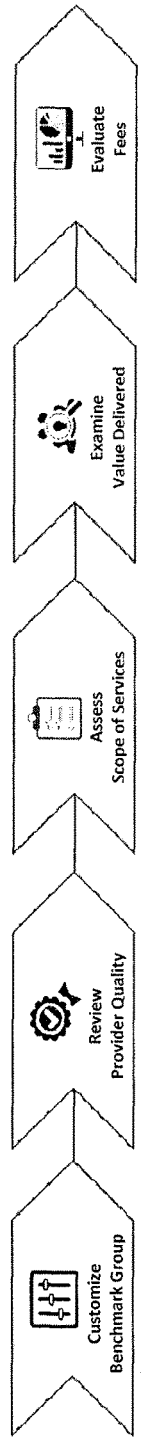

Customize Benchmark Group → Review Provider Quality → Assess Scope of Services → Examine Value Delivered → Evaluate Fees

Benchmark Group

The Characteristics of your customized benchmark group are shown below:

YOUR PLAN
- Assets: $12.5 M

ASSETS DRIVE FEES
- Low Value: $10 M
- Median: $12.5 M
- High Value: $15 M

YOUR BENCHMARK GROUP representing:
- 3930 investment options
- 216 money managers
- $14.8 B in invested assets

915

Provider Quality – Scope of Services – Value Delivered

Shown below are QUALITATIVE components that should be examined when assessing the fee reasonableness of your Investment Managers.

| Provider Quality – Scope of Services – Value Delivered |
|---|
| Organizational Characteristics |
| Investment Decision Makers |
| Investment Process |

Shown below are the QUANTITATIVE components that should also be examined when assessing the fee reasonableness of your Investment Managers.

| Provider Quality – Scope of Services – Value Delivered |
|---|
| Investment Performance |
| Compliance with Plan's Investment Policy |
| Optimized Treatment of Indirect Compensation |

Your discussion of these items should be documented and the related notes, as well as any other report notes, should be placed into your fiduciary file to assist in satisfying your fiduciary obligation.

91b

Fees

The charts below categorize the plan's 29 investment options into cost quartiles.

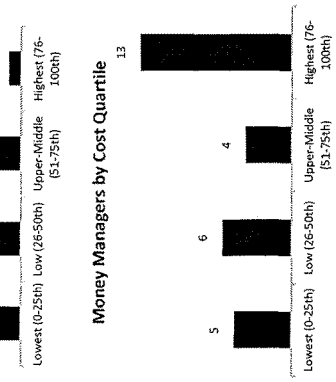

Expense Ratios by Cost Quartiles

| | 10 | 12 | 1 |
|---|---|---|---|
| 5 | | | |

Lowest (0-25th)  Low (26-50th)  Upper-Middle (51-75th)  Highest (76-100th)

Money Managers by Cost Quartile

| | 6 | 4 | 13 |
|---|---|---|---|
| 5 | | | |

Lowest (0-25th)  Low (26-50th)  Upper-Middle (51-75th)  Highest (76-100th)

91c

Page 14 of 43

FIG. 61

Recordkeeper Appendix

Recordkeeper: Customize Benchmark Group

Fiduciary Benchmarks
Independent | Comprehensive | Informative

THE FIRST STEP of Fiduciary Benchmarks' process is to build a customized benchmark group from our proprietary database of tens of thousands of plans. Note that all data is sourced directly from service providers, is typically updated on a quarterly basis, and normalized to allow for valid comparisons. A proprietary and sophisticated mathematical models is then applied to build a custom benchmark group that maximizes the degree of predictability. The end result is illustrated by the three tables shown below.

Customize Benchmark Group

Economically Logical
Total Plan Assets, Participants and Plan Average Account Balance are significant drivers of Recordkeeper Fees.

| Characteristics | This Plan | Low | Median | High |
|---|---|---|---|---|
| Assets | $12,459,886 | $10,000,000 | $11,915,668 | $15,000,000 |
| Participants | 177 | 129 | 173 | 249 |
| Avg. Acct. Balance | $70,395 | $50,000 | $64,825 | $90,000 |

63g, 63a, 63b, 63c, 63d, 63h, 63i, 63f

Statistically Valid
Our mathematical model discards outliers and uses those plans that are most predictive of the fees for your Recordkeeper.

| Characteristics | This Plan | 401(k) | 403(b) | Other |
|---|---|---|---|---|
| Plan Type | 401(k) | 29 | 1 | 1 |

63j, 63k

Diversified by Recordkeeper
We do not let any one type of Recordkeeper dominate the benchmark group.

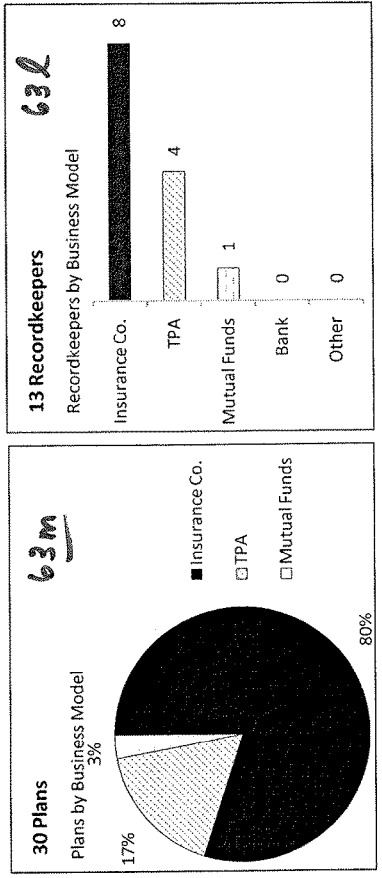

30 Plans
Plans by Business Model
3%
17%
80%
63m
■ Insurance Co.
□ TPA
□ Mutual Funds 13 Recordkeepers
Recordkeepers by Business Model
63l
Insurance Co. 8
TPA 4
Mutual Funds 1
Bank 0
Other 0

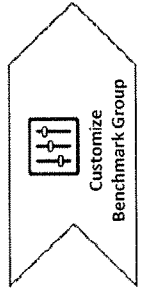

FIG. 63

Recordkeeper: Review Provider Quality

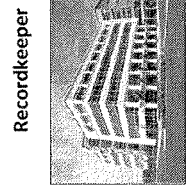 Fiduciary Benchmarks
Independent | Comprehensive | Informative

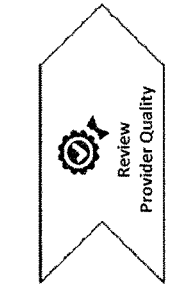
Review Provider Quality

THE SECOND STEP is to examine "What You Are Getting." In that regard, the DOL has specifically noted in prior rulings that the quality of a Service Provider can be considered when determining fee reasonableness. Fiduciary Benchmarks examined how leading Recordkeeper firms describe "quality" and we evaluated those quantitative and qualitative factors and categorized them into the three areas shown below. While Fiduciary Benchmarks does not currently benchmark the factors listed on this page, we do believe you should ask your Recordkeeper to discuss the items below that they believe are most important.

Recordkeeper

Ultimately, Recordkeeper Services are greatly dependent on the Firm and the individuals that service your account. Therefore, listed below are a number of items you should consider with respect to the firm and the people that are servicing your plan:

- Expertise with Retirement Plans
- Experience with similar plans and/or industry
- Insurance and Bonding coverage
- Non-401(k) Plan Expertise
- Cultural "Fit"

Services/Process

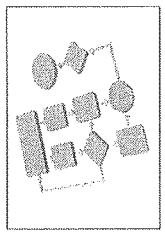

The services and processes used by your Recordkeeper are also important qualitative items that should be considered when determining fee reasonableness. Therefore, listed below are a number of different services and processes that should be examined.

- Definition of "What is Winning?"
- Process to ensure no conflicts of interest
- Process for Protecting and Improving your Plan:
  -- Plan Sponsor Services
  -- Participant Services
- Process for measuring Client Satisfaction
- Client Retention/References/Success Stories

People/Technology/Resources

Finally, the resources available to your Recordkeeper will have a large impact on their ability to deliver timely and accurate service on an ongoing basis. Listed below are people, technology and other resources that should be discussed as part of Fee Reasonableness.

- Aptitude of Team
- Attitude of Team
- Employee Retention
- Company Awards
- Technology for Delivering Plan Sponsor Services
- Technology for Delivering Participant Services
- Educational Resources
- Profitability/Sustainability
- Confidentiality/Security

FIG. 64

Recordkeeper: Assess Scope of Services

Fiduciary Benchmarks
Independent | Comprehensive | Informative

THE THIRD STEP is to assess the Scope of Services delivered by your Recordkeeper. Fiduciary Benchmarks has worked with dozens of the industry's largest and most prestigious recordkeepers to examine those services that have the greatest impact on servicing a plan across four different service categories. We then developed a mathematical model using a "core and more" approach based on the amount of work associated with each service. Thus, the model places less weight on differences in "core services" such as participant investment transfers and greater weight on differences in "more services" such as whether company stock is an investment option for the plan.

*More Services (checked if received by Plan)* — 65d

■ Your Plan  □ BMG Sample

| | Core Services | Small Cost Impact | Medium Cost Impact | Large Cost Impact |
|---|---|---|---|---|
| Recordkeeping Above Average* 61.5 / 55.8 | ✓ Recordkeeping Participants<br>✓ Rollovers IN to plan<br>✓ Investment Transfers<br>✓ Age 59 ½ Withdrawals<br>✓ Hardship Withdrawals<br>✓ MRDs and QDROs | □ Extra Contribution Types<br>✓ Extra Funds<br>□ Extra Contribution Activity<br>□ Extra Loan Activity<br>✓ Extra Terminations | □ Company Stock<br>✓ Managed Account<br>✓ Self Directed Account<br>□ Model Portfolios | ✓ Fund Additions<br>✓ Fund Deletions<br>□ Bad/Inconsistent Data<br>□ M&A Activity<br>✓ Plan Design Changes<br>✓ Periodic Valuation |
| Administration Well Above Average* 7.2 / 3.4 | □ Required Notices<br>□ Provide Plan Document<br>□ Administrative Forms<br>□ Approve Rollovers IN<br>□ Calculate Forfeitures<br>□ Calculate MRDs | □ Approve Loans<br>✓ Approve Withdrawals<br>□ Approve QDROs<br>□ Approve Terminations<br>✓ Administer ERISA Account<br>□ Administer Auto Increase | □ Determine Newly Eligibles<br>□ Census Validation<br>✓ Auto Enrollment<br>□ Default Employees into QDIA<br>□ Calculate Employer Match<br>□ Feedback Files to Employer | □ Plan Startup<br>□ Plan Transfer<br>□ Plan Termination<br>□ Bad/Inconsistent Data<br>□ 403(b) Common Remitter |
| Compliance & Consulting Well Above Average* 13.5 / 8.5 | □ ADP/ACP Testing<br>✓ 415 Testing<br>□ Form 5500 | □ ADP/ACP Refunds<br>□ ADP/ACP Contributions<br>✓ Failed 415 test | □ Calculate Top-Heavy Minimum<br>□ 414(s) Compensation Testing | ✓ Extra Sponsor Meetings<br>□ 410(b) Testing<br>□ 401(a)(4) Testing |
| Education & Comm. Well Above Average* 37.6 / 7.3 | □ Digital Enrollment Kits<br>□ Digital Participant Statements<br>✓ Standard Participant Website<br>✓ Standard 800 number | □ Branded Enrollment Kits<br>□ Branded Participant Statements<br>□ Website – Unique URL<br>□ Custom 800 number<br>□ Beneficiary Solicitation | ✓ Hardcopy Enrollment Kits<br>✓ Hardcopy Participant Statements | □ Custom Enrollment Kits<br>□ Custom Participant Statements<br>□ Custom Website<br>□ Dedicated 800 number team<br>✓ Group Meetings<br>✓ One on One Meetings |

*See details on the following page

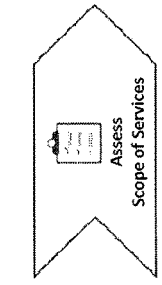

Recordkeeper: Services Detail

Services are summarized into four different categories: Recordkeeping, Administration, Compliance and Consulting and Education and Communication. The "amount" of a service received by the plan shows in the units column, while the value of the service (i.e. amount of work) received by the plan shows in the points column. For example, the "Recordkeep active participants" service would show your plan's active participant count in the units column, while the points associated with the service would show in the points column. The BMG column shows the points your plan would earn if receiving BMG level services.

| Services | Plan Units | Plan Pts | BMG Pts |
|---|---|---|---|
| Recordkeeping | | | |
| Recordkeep active participants | 177 | 8.0 | 8.0 |
| Recordkeep terminated participants | 1 | 0.0 | 0.0 |
| Recordkeep newly added participants | 15 | 0.7 | 0.8 |
| Recordkeep newly added parts. due to M&A activity | - | - | 0.0 |
| Remove participants from plan due to M&A activity | - | - | 0.0 |
| Process corrected contributions | - | - | 0.2 |
| Process rollovers | 10 | 0.8 | 0.1 |
| Process payrolls | 26 | 13.2 | 12.2 |
| Process investment transfers | 40 | 0.2 | 0.1 |
| Post company stock dividends | - | - | 0.0 |
| Process new general purpose loans | 15 | 1.3 | 1.7 |
| Process new primary residence loans | - | - | 0.2 |
| Process new hardship loans | - | - | 0.2 |
| Recordkeep outstanding loans | 45 | 0.3 | 0.2 |
| Re-amortize loans | - | - | 0.2 |
| Process loan pay-offs | - | - | 3.0 |
| Process in-service withdrawals | 8 | 0.7 | 0.3 |
| Process hardship withdrawals | 3 | 0.5 | 0.6 |
| Process 401(a)(9) minimum distributions | 15 | 1.3 | 0.3 |
| Process qualified domestic relations orders | 3 | 1.5 | 0.5 |
| Process lump sum distributions that WERE NOT cash-outs | 18 | 1.5 | 0.8 |
| Process lump sum distributions that WERE cash outs | - | - | 0.3 |
| Process installment distributions | - | - | 0.0 |
| Add funds to the plan | 1 | 8.5 | 8.5 |
| Delete funds from the plan | 1 | 16.9 | 16.9 |
| Determine plan valuation | 1 | 0.0 | 0.0 |
| Process plan data | | | |
| Recordkeep company stock | - | - | - |
| Recordkeep risk/age-based models built from the core | - | - | - |
| Service managed account programs | 1 | 2.8 | - |
| Recordkeep self-directed brokerage | 1 | 2.8 | - |
| Process plan design changes | 1 | 0.5 | 0.6 |
| Support mergers and/or acquisitions | - | - | - |
| Recordkeep non-eligibles participants | - | - | - |
| Recordkeep eligible parts. without account balances | - | - | 0.2 |
| Total: | | 61.5 | 55.8 |

| Plan Characteristics Pertaining to Recordkeeping: | | | |
|---|---|---|---|
| Determine plan valuation – Daily Valuation | | | ◊ |
| Process plan data – Data is nearly perfect | | | ◊ |
| Company Stock – none | | | ◊ |

| Services | Plan Units | Plan Pts | BMG Pts |
|---|---|---|---|
| Administration | | | |
| Provide plan document services | - | - | - |
| Provide administrative forms for the plan | - | - | - |
| Track when ineligible employees can begin making | - | - | - |
| Administer auto-enrollment program | 18 | 0.8 | 0.8 |
| Edit census data for participants in the plan | - | - | - |
| Provide feedback files to the plan sponsor containing | - | - | - |
| Administer auto-increase program | - | - | - |
| Provide 403(b) common remitter service | - | - | - |
| Calculate or help calc. employer matching contributions | - | - | - |
| Calculate or help calc. employer TRUE-UP matching contributions | - | - | - |
| Calculate or help calc. employer other contributions | - | - | - |
| Calculate or help calc. the re-allocation of forfeitures | - | - | - |
| Administer the default of all employees to QDIA | 177 | 5.0 | - |
| Approve rollovers | - | - | - |
| Approve new loans | - | - | - |
| Approve age 59.5 withdrawals | 8 | 0.2 | - |
| Approve hardship withdrawals | - | - | - |
| Calculate 401(a)(9) Min. Required Distributions (MRDs) | - | - | 0.1 |
| Approve Qualified Domestic Relations Orders (QDROs) | 3 | 0.5 | - |
| Approve termination distributions | - | - | - |
| Administer/help administer the ERISA Spending Account | 1 | 0.6 | - |
| Provide administration to a plan that is LESS THAN 1 year old | - | - | - |
| Transition plan to a new recordkeeper (last 12 months) | - | - | - |
| Support partial or complete plan termination (last 12 months) | - | - | - |
| Notices | 1 | 0.1 | 2.5 |
| Total | | 7.2 | 3.4 |

| Plan Characteristics Pertaining to Administration: | |
|---|---|
| Auto enrollment – Yes – new hires | ◊ |
| Auto increase – none | ◊ |
| Plan document – none | ◊ |
| Provide some administration forms to plan – none | ◊ |
| Track employee eligibility – none | ◊ |
| Provide feedback files to sponsor – none | ◊ |
| Notices provided – hard copy | |
| Notices provided – digital | ← |

| Degree of Difficulty vs. Benchmark Group: | |
|---|---|
| ← Service is more difficult | |
| → Service is less difficult | |
| ◊ Service difficulty is the same | |

| Services | Plan Units | Plan Pts | BMG Pts |
|---|---|---|---|
| Compliance and Consulting | | | |
| Perform ADF test | - | - | - |
| Perform ACP test | - | - | - |
| Process ADP/ACP refunds | - | - | - |
| Process ADP/ACP contributions | - | - | - |
| Perform 415 test | 177.0 | 5.0 | - |
| Perform Top Heavy test | - | - | - |
| Perform the 401(a)(4) test | - | - | - |
| Perform the 414(s) Compensation test | - | - | - |
| Perform the 410(b) test | - | - | - |
| Prepare Form 5500 package | - | - | - |
| Meet with Plan Fiduciary | 1.0 | 8.5 | 8.5 |
| Total | | 13.5 | 8.5 |

| Services | Plan Units | Plan Pts | BMG Pts |
|---|---|---|---|
| Education and Communication | | | |
| Provide hard copy enrollment kits | 15 | 0.5 | 0.9 |
| Provide digital enrollment kits | - | - | - |
| Solicit beneficiary designations from eligible participants | - | - | - |
| Answer participant phone calls for the plan | 177 | 1.0 | 1.0 |
| Provide participant internet service | 177 | 1.0 | 1.0 |
| Provide hardcopy participant statements | 177 | 4.0 | 4.4 |
| Provide digital participant statements | - | - | - |
| Provide participant group meetings | 5 | 28.2 | - |
| Provide participant one-on-one meetings | 5 | 2.8 | - |
| Total | | 37.6 | 7.3 |

| Plan Characteristics Pertaining to Compliance and Consulting: | |
|---|---|
| Form 5500 – none | ◊ |
| Materials for meeting with Fiduciary – Standard Reporting | ◊ |

| Plan Characteristics Pertaining to Education and Communication: | |
|---|---|
| Solicit beneficiary designations – none | ◊ |
| Provide group meetings – standard | ← |
| Provide one-on-one meetings – standard | ← |
| Provide hard copy enrollment kits – standard | → |
| Provide digital copy enrollment kits – none | ◊ |
| Answer 800 calls from parts. – std number and shared team | |
| Provide part. internet service – std URL and std website | ◊ |
| Provide hard copy participant statements – standard | → |
| Provide digital participant statements – none | ◊ |

Fiduciary Benchmarks
Independent | Comprehensive | Informative

FIG. 66

Recordkeeper: Examine Value Delivered

Examine Value Delivered

Fiduciary Benchmarks
Independent | Comprehensive | Informative

THE FOURTH STEP in understanding "What You Are Getting" is to examine the value being delivered. For you as Plan Sponsor, Fiduciary Benchmarks worked with leading and prestigious recordkeepers to examine how they "add value" for their Plan Sponsors. We concluded their efforts can be concentrated into three areas that help Plan Sponsors become better Responsible Plan Fiduciaries. For your Participants, we compare the Participant Success Measures for your plan versus your industry. We also may project how these metrics impact the projected account balances of all participants, assuming they are all 'average.'

Value Delivered to You as Plan Sponsor

SERVICE QUALITY: ACCURACY AND TIMELINESS

Quite simply, your Recordkeeper is supposed to provide services that are accurate and timely. *In that regard, you should ask your Recordkeeper how do they measure their service standards and what types of reporting do you receive to monitor those service levels.*

SUPPORT SERVICES

Being a Plan Sponsor is not easy. There are a myriad of rules and regulations that seem to change every year and you have a need for information to help you manage the plan and answer participant questions. *In that regard, you should consider the People, Processes and Technology provided by your Recordkeeper that help you as the Plan Fiduciary.*

PLAN DESIGN ASSISTANCE

More and more plan fiduciaries are taking advantage of lessons learned from behavioral finance and other research to make changes to Plan Design which lead to improved participant behavior and better retirement outcomes. *In that regard, you should consider the ability of your Recordkeeper to help you design and implement changes to your plan that allow your participants to retire well.*

Value Delivered to Your Participants

| Participant Success Measures | Your Plan | Industry Median[1] |
|---|---|---|
| Participation Rate | 75.0% | 64.0% |
| Deferral Rate | 4.5% | 4.4% |
| Percent Maximizing Company Match | 32.0% | 48.0% |
| Percent Assets in Auto-Diversified Options | 65.1% | 14.0% |
| Percent "Delegators" (80% in Auto-Diversified Option) | *** | *** |
| Percent "Doers" Diversified & Auto-Rebalancing | *** | *** |
| Percent Terminated Participants NOT "Cashing Out" | 75.0% | 81.0% |

[1] Industry: 11 – Agriculture, Forestry, Fishing and Hunting
*** Available upon request via Retirement Outcomes Evaluator The chart below projects current account balances in 2015 for the 177 active participants in the plan *assuming all participants are average* using the metrics shown above.

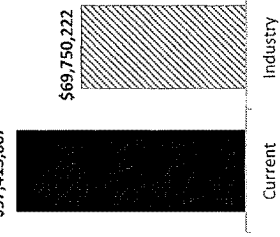

$97,415,667  $69,750,222
Current     Industry

| Assumptions | Your Plan 2015-02-23 | Industry 2014-02-28 |
|---|---|---|
| Average Age | 42 | 42 |
| Average Salary | $61,050 | $61,050 |
| Inflation Rate | 3.0% | 3.0% |
| Beginning Balance | $70,395 | $70,395 |
| Employee Deferral | 4.5% | 4.4% |
| Employer Contribution | 1.5% | 1.5% |
| Rate of Return | 6.4% | 5.5% |
| Ending Balance | $511,923 | $432,421 |
| Number of Parts | 177 | 151 |
| Projected Balance | $97,415,667 | $69,750,222 |

This is a hypothetical example and individual results will vary. The difference in the rates of return used are due to research showing "Advised" investors do better than "Not Advised" investors. See the Disclaimers page for an example of the rate of return calculation. Also note that this example does not show the expenses associated with investing.

Page 20 of 43

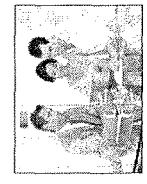

FIG. 67

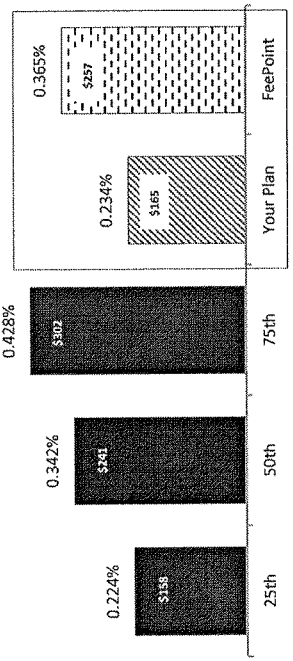
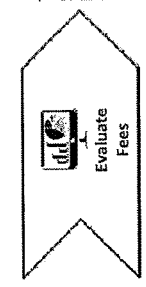
FIG. 68

Recordkeeper: Evaluate Fees

Investment Fees to Recordkeeper

This is the summary of the Investment Fees from the Recordkeeper: Evaluate Fees page.

Fiduciary Benchmarks
Independent | Comprehensive | Informative

| Fund Name | Ticker | Assets | Fee Retained by Recordkeeper | Fee Credited to Plan | Fee Rebated to Participants | Benchmark Group Percentiles and Comparison ||||
|---|---|---|---|---|---|---|---|---|---|
| | | | | | | 25th | 50th | 75th | Diff. from 50th |
| CORE OPTIONS | | | | | | | | | |
| Johnson Stable Value D | - | $1,744,383 | 0.25% | - | - | 0.09% | 0.15% | 0.40% | 0.10% |
| RGA Total Return Bond A | - | $1,370,587 | 0.25% | - | - | 0.11% | 0.17% | 0.25% | 0.08% |
| Yamane Large Value Inst. | - | $747,593 | 0.25% | - | - | 0.09% | 0.21% | 0.35% | 0.04% |
| Low Track S&P 500 Index Inv. | - | $872,192 | 0.20% | - | - | 0.09% | 0.22% | 0.36% | -0.02% |
| Georgia Large Cap Growth N | - | $622,994 | 0.35% | - | - | 0.12% | 0.17% | 0.29% | 0.18% |
| Emerging Value Opportunities Adv. | - | $249,198 | 0.25% | - | - | 0.08% | 0.14% | 0.36% | 0.11% |
| Low Track S&P 400 | - | $249,198 | 0.20% | - | - | 0.08% | 0.14% | 0.38% | 0.06% |
| Moment Captured Growth | - | $186,898 | 0.25% | - | - | 0.11% | 0.17% | 0.34% | 0.08% |
| Yamane Small Value Inst. | - | $124,599 | 0.40% | - | - | 0.10% | 0.14% | 0.32% | 0.26% |
| Low Track S&P 600 | - | $124,599 | 0.20% | - | - | 0.05% | 0.14% | 0.28% | 0.06% |
| Georgia Small Cap Growth N | - | $124,599 | - | - | - | 0.06% | 0.17% | 0.37% | - |
| Yamane International Inst. | - | $872,192 | - | - | - | 0.09% | 0.15% | 0.36% | - |
| Far Lands Emerging Growth A | - | $87,219 | 0.25% | - | - | 0.06% | 0.15% | 0.37% | 0.10% |
| Smithland Real Estate Securities D | - | $99,679 | 0.10% | - | - | 0.10% | 0.22% | 0.40% | -0.12% |
| AUTO DIVERSIFIED OPTIONS | | | | | | | | | |
| Holistic Conservative Fund A | - | $249,198 | 0.10% | - | - | 0.11% | 0.12% | 0.40% | -0.02% |
| Holistic Aggressive Fund A | - | $124,599 | 0.10% | - | - | 0.05% | 0.14% | 0.40% | -0.04% |
| Holistic Balanced Fund A | - | $498,395 | 0.10% | - | - | 0.05% | 0.14% | 0.40% | -0.04% |
| Holistic Moderate Fund A | - | $249,198 | 0.10% | - | - | 0.05% | 0.14% | 0.40% | -0.04% |
| Achieve Retirement Moderate 2010 E | - | $373,797 | 0.25% | - | - | 0.12% | 0.14% | 0.33% | 0.11% |
| Achieve Retirement Moderate 2015 E | - | $373,797 | 0.25% | - | - | 0.10% | 0.18% | 0.33% | 0.07% |
| Achieve Retirement Moderate 2020 E | - | $622,994 | 0.25% | - | - | 0.07% | 0.22% | 0.32% | 0.03% |
| Achieve Retirement Moderate 2025 E | - | $747,593 | 0.25% | - | - | 0.07% | 0.22% | 0.32% | 0.08% |
| Achieve Retirement Moderate 2030 E | - | $498,395 | 0.25% | - | - | 0.11% | 0.17% | 0.28% | 0.08% |
| Achieve Retirement Moderate 2035 E | - | $373,797 | 0.25% | - | - | 0.11% | 0.16% | 0.38% | 0.09% |
| Achieve Retirement Moderate 2040 E | - | $373,797 | 0.25% | - | - | 0.08% | 0.19% | 0.24% | 0.06% |
| Achieve Retirement Moderate 2045 E | - | $124,599 | 0.25% | - | - | 0.09% | 0.18% | 0.39% | 0.07% |

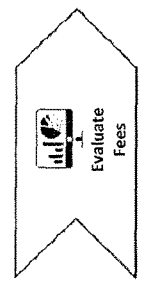

FIG. 69

Recordkeeper: Evaluate Fees

Evaluate Fees

This is the summary of the Investment Fees from the Recordkeeper: Evaluate Fees page.

Investment Fees to Recordkeeper

70a

70b

Fiduciary Benchmarks
Independent | Comprehensive | Informative

| Fund Name | Ticker | Assets | Fee Retained by Recordkeeper | Fee Credited to Plan | Fee Rebated to Participants | Benchmark Group Percentiles and Comparison | | | |
|---|---|---|---|---|---|---|---|---|---|
| | | | | | | 25th | 50th | 75th | Diff. from 50th |
| AUTO DIVERSIFIED OPTIONS | | | | | | | | | |
| Achieve Retirement Moderate 2050 E | -- | $124,599 | 0.25% | -- | -- | 0.12% | 0.13% | 0.24% | 0.12% |
| Achieve Retirement Moderate 2055 E | -- | $124,599 | 0.25% | -- | -- | 0.11% | 0.22% | 0.26% | 0.03% |
| OTHER OPTIONS | | | | | | | | | |
| Self-Directed Brokerage | -- | $124,599 | -- | -- | -- | 0.06% | 0.18% | 0.40% | -- |
| TOTAL | | $12,459,886 | 0.214% | | | | | | |

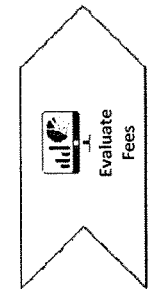

FIG. 7D

Recordkeeper: Summary and Documentation

To assist you in the evaluation of your Recordkeeper, Fiduciary Benchmarks has pulled the most relevant data and statistics from our process and displayed them below. As a Fiduciary, you have the ultimate responsibility of making sure you assess and negotiate REASONABLE fees from your Recordkeeper. The information below should help you in that decision-making process.

Fiduciary Benchmarks
Independent | Comprehensive | Informative

Customize Benchmark Group → Review Provider Quality → Assess Scope of Services → Examine Value Delivered → Evaluate Fees

Benchmark Group

The Characteristics of your customized benchmark group are shown below:

YOUR PLAN
- Assets: $12.5 M
- Participants: 177
- Avg. Balance: $70,395

ASSETS DRIVE FEES
- Low Value: $10 M
- Median: $11.9 M
- High Value: $15 M

AVG. BALANCE DRIVES FEES
- Low Value: $50,000
- Median: $64,825
- High Value: $90,000

30 PLANS IN YOUR BENCHMARK GROUP REPRESENTING:
- 13 Recordkeepers

71a

Provider Quality – Scope of Services – Value Delivered

Shown below are *QUALITATIVE* components that should be examine when assessing the fee reasonableness of your Recordkeeper.

| Provider Quality – Scope of Services – Value Delivered |
|---|
| Service Provider Quality |
| Service Quality: Accuracy and Timeliness |
| Support Services: People, Processes and Technology |
| Plan Design Assistance |

Your discussion of these items should be documented and the related notes, as well as any other report notes, should be placed into your fiduciary file to assist in satisfying your fiduciary obligation.

Shown below are *QUANTITATIVE* components evaluated by Fiduciary Benchmarks that can also be examined when assessing the reasonableness of your Recordkeeper.

| Provider Quality - Scope of Services - Value Delivered | Your Plan | Benchmark | FBi Score |
|---|---|---|---|
| Scope of Services – Recordkeeping | 61.5 | 55.8 | Above Average* |
| Scope of Services – Administration | 7.2 | 3.4 | Well Above Average* |
| Scope of Services – Compliance & Consulting | 13.5 | 8.5 | Well Above Average* |
| Scope of Services – Communication & Education | 37.6 | 7.3 | Well Above Average* |

* See details on Assess Scope of Services pages

71b

Fees

Shown below are how your fees compare to the Benchmark Group median and to Fiduciary Benchmarks' proprietary benchmark for your Recordkeeper: FeePoint.

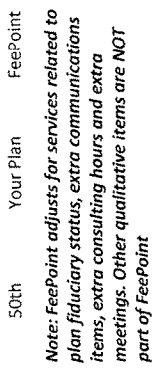

0.342%  $211
0.234%  $165
0.365%  $257

50th    Your Plan    FeePoint

*Note: FeePoint adjusts for services related to plan fiduciary status, extra communications items, extra consulting hours and extra meetings. Other qualitative items are NOT part of FeePoint*

TPA Appendix

TPA: Customize Benchmark Group

Fiduciary Benchmarks
Independent | Comprehensive | Informative

THE FIRST STEP of Fiduciary Benchmarks' process is to build a customized benchmark group from our proprietary database of tens of thousands of plans. Note that all data is sourced directly from service providers, is typically updated on a quarterly basis, and normalized to allow for valid comparisons. A proprietary and sophisticated mathematical model is then applied to build a custom benchmark group that maximizes the degree of predictability. The end result is illustrated by the four tables shown Benchmark Group below.

Customize Benchmark Group

Economically Logical
Total Plan Assets, Participants and Plan Average Account Balance are significant drivers of TPA Fees.

| Characteristics | This Plan | Low | Median | High |
|---|---|---|---|---|
| Assets | $12,459,886 | $10,000,000 | $11,915,668 | $15,000,000 |
| Participants | 177 | 129 | 173 | 249 |
| Avg. Acct. Balance | $70,395 | $50,000 | $64,825 | $90,000 |

Statistically Valid
Our mathematical model discards outliers and uses those plans that are most predictive of the fees for your TPA.

| Characteristics | This Plan | 401(k) | 403(b) | Other |
|---|---|---|---|---|
| Plan Type | 401(k) | 29 | 1 | 1 |

Diversified by Recordkeeper
We do not let any one type of Recordkeeper dominate the benchmark group.

30 Plans
Plans by Business Model
- Insurance Co. 80%
- TPA 3%
- Mutual Funds 17%

13 Recordkeepers
Recordkeepers by Business Model
- Insurance Co. 8
- TPA 4
- Mutual Funds 1
- Bank 0
- Other 0

FIG. 73

TPA: Review Provider Quality

Review Provider Quality

Fiduciary Benchmarks
Independent | Comprehensive | Informative

THE SECOND STEP is to examine "What You Are Getting." In that regard, the DOL has specifically noted in prior rulings that the quality of a Service Provider can be considered when determining fee reasonableness. Fiduciary Benchmarks examined how leading TPA firms describe "quality" and we evaluated those quantitative and qualitative factors and categorized them into the three areas shown below. While Fiduciary Benchmarks does not currently benchmark the factors listed on this page, we do believe you should ask your TPA to discuss the items below that they believe are most important.

TPA

Ultimately, TPA Services are greatly dependent on the Firm and the individuals that service your account. Therefore, listed below are a number of items you should consider with respect to the firm and the people that are servicing your plan.

- Expertise with Retirement Plans
- Experience with Similar Plans and/or Industry
- Insurance and Bonding Coverage
- Non-401(k) Plan Expertise
- Cultural "Fit"

Services/Process

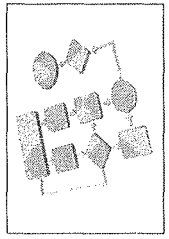

The services and processes used by your TPA are also important qualitative items that should be considered when determining fee reasonableness. Therefore, listed below are a number of different services and processes that should be examined.

- Definition of "What is Winning?"
- Process to ensure no conflicts of interest
- Process for Protecting and Improving Your Plan:
  - Plan Sponsor Services
  - Participant Services
- Process for Measuring Client Satisfaction
- Client Retention/References/Success Stories

People/Technology/Resources

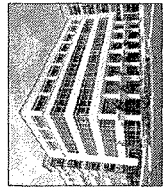

Finally, the resources available to your TPA will have a large impact on their ability to deliver timely and accurate service on an ongoing basis. Listed below are people, technology and other resources that should be discussed as part of Fee Reasonableness.

- Aptitude of Team
- Attitude of Team
- Employee Retention
- Company Awards
- Technology for Delivering Plan Sponsor Services
- Technology for Delivering Participant Services
- Educational Resources
- Profitability/Sustainability
- Confidentiality/Security Page 27 of 43

FIG. 74

TPA: Assess Scope of Services

Assess Scope of Services

Fiduciary Benchmarks
Independent | Comprehensive | Informative

THE THIRD STEP is to assess the Scope of Services delivered by your Third Party Administrator. Fiduciary Benchmarks has worked with dozens of the industry's largest and most prestigious TPAs to examine those services that have the greatest impact on servicing a plan across four different service categories. We then developed a mathematical model using a "core and more" approach based on the amount of work associated with each service. Thus, the model places less weight on differences in "core services" such as participant investment transfers and greater weight on differences in "more services" such as whether company stock is an investment option for the plan.

■ Your Plan  ▨ BMG Sample

*More Services (checked if received by Plan)*

| Core Services | Small Cost Impact | Medium Cost Impact | Large Cost Impact |
|---|---|---|---|

Recordkeeping
Average* — 0 / 0

- ☐ Recordkeeping Participants
- ☐ Rollovers IN to plan
- ☐ Investment Transfers
- ☐ Age 59½ Withdrawals
- ☐ Hardship Withdrawals
- ☐ MRDs and QDROs

- ☐ Extra Contribution Types
- ☐ Extra Funds
- ☐ Extra Contribution Activity
- ☐ Extra Loan Activity
- ☐ Extra Terminations

- ☐ Company Stock
- ☐ Managed Account
- ☐ Self Directed Account
- ☐ Model Portfolios

- ☐ Fund Additions
- ☐ Fund Deletions
- ☐ Bad/Inconsistent Data
- ☐ M&A Activity
- ☐ Plan Design Changes
- ☐ Periodic Valuation

Administration
Well Above Average* — 53.7 / 18

- ☐ Required Notices
- ✓ Provide Plan Document
- ✓ Administrative Forms
- ✓ Approve Rollovers IN
- ✓ Calculate Forfeitures
- ☐ Calculate MRDs

- ☐ Approve Loans
- ☐ Approve Withdrawals
- ☐ Approve QDROs
- ☐ Approve Terminations
- ☐ Administer ERISA Account
- ☐ Administer Auto Increase

- ✓ Determine Newly Eligibles
- ✓ Census Validation
- ☐ Auto Enrollment
- ☐ Default Employees into QDIA
- ☐ Calculate Employer Match
- ☐ Feedback Files to Employer

- ☐ Plan Startup
- ☐ Plan Transfer
- ☐ Plan Termination
- ☐ Bad/Inconsistent Data
- ☐ 403(b) Common Remitter

Compliance & Consulting
Well Above Average* — 55.4 / 38.9

- ✓ ADP/ACP Testing
- ✓ 415 Testing
- ✓ Form 5500

- ✓ ADP/ACP Refunds
- ✓ ADP/ACP Contributions
- ✓ Failed 415 test

- ☐ Calculate Top-Heavy Minimum
- ☐ 414(s) Compensation Testing

- ✓ Extra Sponsor Meetings
- ✓ 410(b) Testing
- ☐ 401(a)(4) Testing

Education & Comm.
Average* — 0 / 0

- ☐ Digital Enrollment Kits
- ☐ Digital Participant Statements
- ☐ Standard Participant Website
- ☐ Standard 800 number

- ☐ Branded Enrollment Kits
- ☐ Branded Participant Statements
- ☐ Website – Unique URL
- ☐ Custom 800 number
- ☐ Beneficiary Solicitation

- ☐ Hardcopy Enrollment Kits
- ☐ Hardcopy Participant Statements

- ☐ Custom Enrollment Kits
- ☐ Custom Participant Statements
- ☐ Custom Website
- ☐ Dedicated 800 number team
- ☐ Group Meetings
- ☐ One on One Meetings \* See details on the following page

FIG. 75

TPA: Services Detail

Fiduciary Benchmarks
Independent | Comprehensive | Informative

Services are summarized into four different categories: Recordkeeping, Administration, Compliance and Consulting and Education and Communication. The "amount" of a service received by the plan shows in the units column, while the value of the service (i.e. amount of work) received by the plan shows in the points column. For example, the "Perform 415 test" service would show the number of times the test was performed in the units column, while the points associated with the service would show in the points column. The BMG column shows the points your plan would earn if receiving BMG level services.

| Services | Plan Units | Plan Pts | BMG Pts |
|---|---|---|---|
| Recordkeeping | | | |
| Recordkeep newly added participants | - | - | - |
| Recordkeep newly added participants due to M&A activity | - | - | - |
| Remove participants from plan due to M&A activity | - | - | - |
| Process corrected contributions | - | - | - |
| Process rollovers | - | - | - |
| Process payrolls | - | - | - |
| Process investment transfers | - | - | - |
| Post company stock dividends | - | - | - |
| Process new general purpose loans | - | - | - |
| Process new primary residence loans | - | - | - |
| Process new hardship loans | - | - | - |
| Recordkeep outstanding loans | - | - | - |
| Re-amortize loans | - | - | - |
| Process loan pay-offs | - | - | - |
| Process in-service withdrawals | - | - | - |
| Process hardship withdrawals | - | - | - |
| Process 401(a)(9) minimum distributions | - | - | - |
| Process qualified domestic relations orders | - | - | - |
| Process lump sum distributions that WERE NOT cash-outs | - | - | - |
| Process lump sum distributions that WERE cash outs | - | - | - |
| Process installment distributions | - | - | - |
| Add funds to the plan | - | - | - |
| Delete funds from the plan | - | - | - |
| Determine plan valuation | - | - | - |
| Process plan data | - | - | - |
| Recordkeep company stock | - | - | - |
| Recordkeep risk/age-based models built from the core | - | - | - |
| Service managed account programs | - | - | - |
| Recordkeep self-directed brokerage | - | - | - |
| Process plan design changes | - | - | - |
| Support mergers and/or acquisitions | - | - | - |
| Recordkeep non-eligibles participants | - | - | - |
| Recordkeep eligible parts. without account balances | - | - | - |
| Total | | 0.0 | 0.0 |

Plan Characteristics Pertaining to Recordkeeping:
- Determine plan valuation – none ◊
- Process plan data – none ◊
- Company Stock – none ◊

| Services | Plan Units | Plan Pts | BMG Pts |
|---|---|---|---|
| Administration | | | |
| Provide plan document services | 1 | 42.4 | 8.5 |
| Provide administrative forms for the plan | 1 | 8.5 | 8.5 |
| Administer auto-enrollment program | - | - | - |
| Edit census data for participants in the plan | 1 | 0.6 | - |
| Administer auto-increase program | - | - | - |
| Provide 403(b) common remitter service | - | - | - |
| Calculate or help calc. employer matching contributions | - | - | - |
| Calculate or help calc. employer TRUE-UP matching contributions | - | - | - |
| Calculate or help calc. employer other contributions | - | - | - |
| Calculate or help calc. the re-allocation of forfeitures | 1 | 0.6 | - |
| Administer the default of all employees to QDIA | - | - | - |
| Approve rollovers | - | - | - |
| Approve new loans | - | - | - |
| Approve age 59.5 withdrawals | - | - | - |
| Approve hardship withdrawals | - | - | - |
| Calculate 401(a)(9) Min. Required Distributions (MRDs) | - | - | - |
| Approve Qualified Domestic Relations Orders (QDROs) | - | - | - |
| Approve termination distributions | - | - | - |
| Administer/help administer the ERISA Spending Account | - | - | - |
| Provide administration to a plan that is LESS THAN 1 year old | - | - | - |
| Transition plan to a new recordkeeper (last 12 months) | - | - | - |
| Support partial or complete plan termination (last 12 months) | - | - | 1.0 |
| Notices | - | - | 17.9 |
| Total | | 53.7 | 17.9 |

Plan Characteristics Pertaining to Administration:
- Auto enrollment – none ◊
- Auto increase – none ← ◊
- Plan document – Custom with Amendments ◊
- Provide some administration forms to plan – Some ← ◊
- Track employee eligibility – Quarterly ← ◊
- Provide feedback files to sponsor – none ◊
- Notices provided – hard copy
- Notices provided – digital ◊ 0.0

Degree of Difficulty vs. Benchmark Group:
- ↑ Service is more difficult
- ↓ Service is less difficult
- ∞ Service difficulty is the same

| Services | Plan Units | Plan Pts | BMG Pts |
|---|---|---|---|
| Compliance and Consulting | | | |
| Perform ADP test | 2.0 | 5.6 | 4.2 |
| Perform ACP test | 2.0 | 5.6 | 4.2 |
| Process ADP/ACP refunds | 1.0 | 0.2 | - |
| Process ADP/ACP contributions | 1.0 | 0.0 | - |
| Perform 415 test | 354.0 | 10.0 | 5.0 |
| Perform Top Heavy test | - | - | - |
| Perform the 401(a)(4) test | - | - | - |
| Perform the 414(s) Compensation test | - | - | - |
| Perform the 410(b) test | 2.0 | 4.2 | - |
| Prepare Form 5500 package | 1.0 | 16.9 | 16.9 |
| Meet with Plan Fiduciary | 1.0 | 12.7 | 8.5 |
| Total | | 55.4 | 38.9 |

| Services | Plan Units | Plan Pts | BMG Pts |
|---|---|---|---|
| Education and Communication | | | |
| Provide hard copy enrollment kits | - | - | - |
| Provide digital enrollment kits | - | - | - |
| Solicit beneficiary designations from eligible participants | - | - | - |
| Answer participant phone calls for the plan | - | - | - |
| Provide participant internet service | - | - | - |
| Provide hardcopy participant statements | - | - | - |
| Provide digital participant statements | - | - | - |
| Provide participant group meetings | - | - | - |
| Provide participant one-on-one meetings | - | - | - |
| Total | | 0.0 | 0.0 |

Plan Characteristics Pertaining to Compliance and Consulting:
- Form 5500 – Long form ◊ ←
- Materials for meeting with Fiduciary – Custom Reporting

Plan Characteristics Pertaining to Education and Communication:
- Solicit beneficiary designations – none ◊
- Provide group meetings – none ◊
- Provide one-on-one meetings – none ◊
- Provide hard copy enrollment kits – none ◊
- Provide digital copy enrollment kits – none ◊
- Answer 800 calls from parts. – none ◊
- Provide part. internet service – none ◊
- Provide hard copy participant statements – none ◊
- Provide digital participant statements – none ◊

FIG. 76

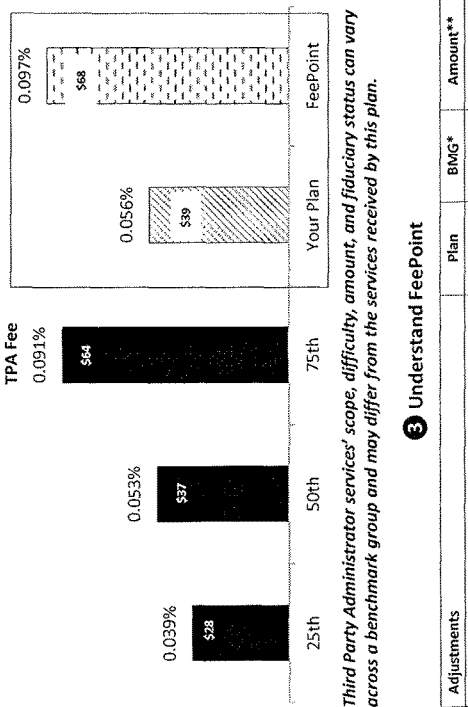
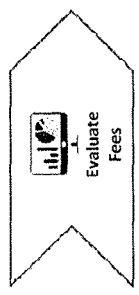
FIG. 78

TPA: Summary and Documentation

Fiduciary Benchmarks
Independent | Comprehensive | Informative

To assist you in the evaluation of your TPA, Fiduciary Benchmarks has pulled the most relevant data and statistics from our process and displayed them below. As a Fiduciary, you have the ultimate responsibility of making sure you assess and negotiate REASONABLE fees from your TPA. The information below should help you in that decision-making process.

Customize Benchmark Group → Review Provider Quality → Assess Scope of Services → Examine Value Delivered → Evaluate Fees

Benchmark Group

The Characteristics of your customized benchmark group are shown below:

YOUR PLAN
- Assets: $12.5 M
- Participants: 177
- Avg. Balance: 70,395

ASSETS DRIVE FEES
- Low Value: $10 M
- Median: $11.9 M
- High Value: $15 M

AVG. BALANCE DRIVES FEES
- Low Value: $50,000
- Median: $64,825
- High Value: $90,000

30 PLANS IN YOUR BENCHMARK GROUP REPRESENTING
- 13 Recordkeepers

Provider Quality – Scope of Services – Value Delivered

Shown below are *QUALITATIVE* components that should be examined when assessing the fee reasonableness of your TPA.

| Provider Quality – Scope of Services – Value Delivered |
|---|
| Service Provider Quality |
| Service Quality: Accuracy and Timeliness |
| Support Services: People, Processes and Technology |
| Plan Design Assistance |

Shown below are *QUANTITATIVE* components evaluated by Fiduciary Benchmarks that can also be examined when assessing the reasonableness of your Recordkeeper.

| Provider Quality - Scope of Services - Value Delivered | Your Plan | Benchmark | FBi Score |
|---|---|---|---|
| Scope of Services – Recordkeeping | - | - | Average* |
| Scope of Services – Administration | 53.7 | 17.9 | Well Above Average* |
| Scope of Services – Compliance & Consulting | 55.4 | 38.9 | Well Above Average* |
| Scope of Services – Education & Communication | - | - | Average* |

* See details on Assess Scope of Services pages

Fees

Shown below are how your fees compare to the Benchmark Group median and to Fiduciary Benchmarks' proprietary benchmark for your TPA: FeePoint.

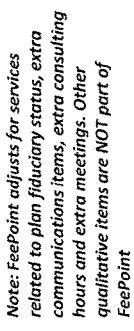

| | 0.053% | 0.056% | 0.097% |
| | $37 | $39 | $68 |
| | 50th | Your Plan | FeePoint |

*Note: FeePoint adjusts for services related to plan fiduciary status, extra communications items, extra consulting hours and extra meetings. Other qualitative items are NOT part of FeePoint*

FIG. 79

Advisor/Consultant Appendix

Advisor/Consultant: Customize Benchmark Group

Fiduciary Benchmarks
Independent | Comprehensive | Informative

Customize Benchmark Group

THE FIRST STEP of Fiduciary Benchmarks' process is to build a customized benchmark group from our proprietary database of tens of thousands of plans. Note that all data is sourced directly from service providers, is typically updated on a quarterly basis, and normalized to allow for valid comparisons. A proprietary and sophisticated mathematical model is then applied to build a custom benchmark group that maximizes the degree of predictability. The end result is illustrated by the four tables shown Benchmark Group below.

81a  81b  81c

| Characteristics | This Plan | Low | Median | High |
|---|---|---|---|---|
| Assets | $12,459,886 | $10,000,000 | $11,203,321 | $12,500,000 |

81d  81e

| Characteristics | This Plan | 401(k) | 403(b) | Other |
|---|---|---|---|---|
| Plan Type | 401(k) | 306 | 6 | 13 |

81f  81g

| # Advisor/Consultant Firms | # Advisor/Consultants |
|---|---|
| 201 | 273 |

Economically Logical
Total Plan Assets is a significant driver of Advisor/Consultant Fees.

Statistically Valid
Our mathematical model discards outliers and uses those plans that are most predictive of the fees for your Advisor/Consultant.

Diversified by Advisor/Consultant
We do not let any one type of Advisor/Consultant dominate the benchmark group.

Diversified by Recordkeeper
We do not let any one type of Recordkeeper dominate the benchmark group.

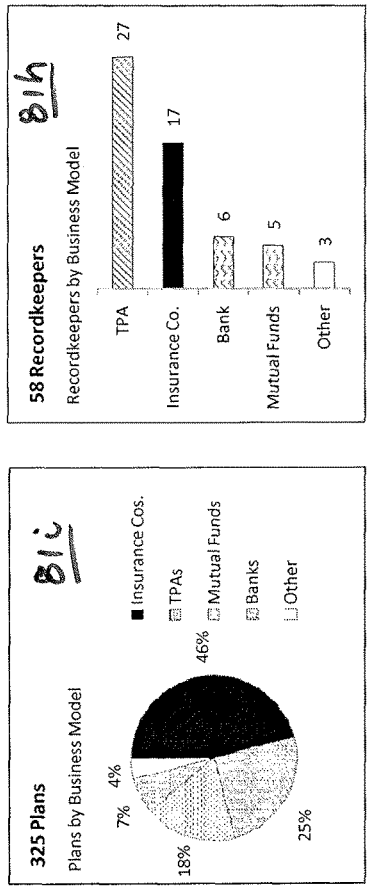

81i — 325 Plans, Plans by Business Model (Insurance Cos. 46%, TPAs 25%, Mutual Funds 18%, Banks 7%, Other 4%)

81h — 58 Recordkeepers by Business Model (TPA 27, Insurance Co. 17, Bank 6, Mutual Funds 5, Other 3)

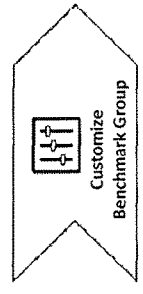

Fig. 81

Advisor/Consultant: Review Provider Quality

Fiduciary Benchmarks
Independent | Comprehensive | Informative

Review Provider Quality

THE SECOND STEP is to examine "What You Are Getting." In that regard, the DOL has specifically noted in prior rulings that the quality of a Service Provider can be considered when determining fee reasonableness. Fiduciary Benchmarks examined how leading Advisor/Consultant firms describe "quality" and we evaluated those quantitative and qualitative factors and categorized them into the three areas shown below. While Fiduciary Benchmarks does not currently benchmark the factors listed on this page, we do believe you should ask your Advisor/Consultant to discuss the items below that they believe are most important.

Advisor/Consultant

Ultimately, Advisor/Consultant Services are greatly dependent on the Firm and the individuals that service your account. Therefore, listed below are a number of items you should consider with respect to the firm and the people that are servicing your plan.

- Clean and Transparent Regulatory Record
- Expertise with Retirement Plans
- Experience with Similar Plans and/or Industry
- Credentials and Designations
- Awards and Recognitions
- Memberships and Associations
- Fiduciary Status Capability
- Insurance and Bonding Coverage
- Non-401(k) Plan Expertise
- Cultural "Fit"

Services/Process

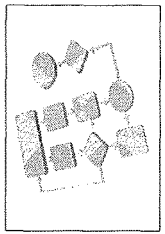

The services and processes used by your Advisor/Consultant are also important qualitative items that should be considered when determining fee reasonableness.

- Definition of "Plan Success"
- Process to Mitigate Conflicts of Interest
- Process for Protecting and Improving Your Plan:
  - Investment Services
  - Vendor Management Services
  - Plan Management Services
  - Participant Services
- Rollover Process
- Process for Measuring and Reporting Results
- Client Retention/References/Success Stories

People/Technology/Resources

Finally, the resources available to your Advisor/Consultant will have a large impact on their ability to deliver timely and accurate service on an ongoing basis. Listed below are people, technology and other resources that should be discussed as part of Fee Reasonableness.

- Aptitude of Team
- Attitude of Team
- Shared Staff versus Dedicated Staff
- Employee Retention
- Technology for Delivering Plan Sponsor Services
- Technology for Delivering Participant Services
- Educational Resources
- Profitability/Sustainability
- Confidentiality/Security

FIG. 82

Advisor/Consultant: Assess Scope of Services

Fiduciary Benchmarks
Independent | Comprehensive | Informative

Assess Scope of Services

THE THIRD STEP is to assess the Scope of Services delivered by your Advisor/Consultant. Fiduciary Benchmarks surveyed hundreds of expert Advisors/Consultants to develop a list of over 30 services that also have varying degrees of difficulty across four different service categories. We then developed a mathematical model that places more weight on more difficult services and higher degrees of difficulty. A score of 100 in a service area can only be achieved by providing each service at the highest degree of difficulty.

■ Your Plan   ▨ BMG Sample

*More Services (checked if received by Plan)*

| | Core Services | Small Cost Impact | Medium Cost Impact | Large Cost Impact |
|---|---|---|---|---|
| Investment Services Average* 59.1 / 56.9 | ✓ Assess Plan's Inv. Objectives<br>✓ Design Investment Structure<br>✓ Implement & Maintain Investment Structure | ✓ Review QDIA Option<br>✓ Develop, Maintain & Monitor IPS | ❏ Search & Monitor Inv Mgrs<br>✓ Provide/Review Perf Reports<br>✓ 3(21) Fiduciary Status: Plan<br>❏ 3(21) Fiduciary Status: Model | ✓ Build/Manage Model Portfolios<br>❏ Extra Investment Due Diligence<br>❏ 3(38) Fiduciary Status: Plan<br>✓ 3(38) Fiduciary Status: Models |
| Vendor Management Well Above Average* 45.8 / 28 | ✓ Monitor Service Provider | ❏ Support Contract Negotiation<br>✓ Ensure All Fees Are Disclosed | ✓ Benchmarks Fees/Value Reasonableness<br>✓ Generate/Evaluate RFI<br>❏ Support Svc Provider Transition | ✓ Generate/Evaluate RFP<br>❏ Extra Due Diligence |
| Plan Management Well Above Average* 36.9 / 22.2 | ❏ Review Plan Governance Structure<br>❏ Review of Education Plan | ❏ Review Use of ERISA Account<br>❏ Review 404(c) Protection | ❏ Analyze Plan Design<br>❏ Review E&O, D&O & Bonding Insurance<br>❏ Review Progress Against Education Goals | ✓ Daily Plan Management Support<br>✓ Create and Review Fiduciary File<br>✓ Meet with Plan Committee |
| Participant Services Above Average* 31.7 / 25.9 | ❏ Participant Education Program Support | ❏ Provide Participant Newsletter | ❏ Provide Participant Phone/Email Support | ❏ Provide Group Meetings<br>✓ Provide One-on-One Meetings<br>✓ Rendering of Participant Advice |

\* See details on the following page

Page 36 of 43

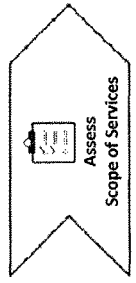

Advisor/Consultant: Services Detail

Fiduciary Benchmarks
Independent | Comprehensive | Informative

Services are summarized into four different categories: Investment Services, Vendor Management, Plan Management and Participant Services. Section A of the page identifies the services offered to the plan and their degrees of difficulty in relation to the BMG. Section B identifies the services offered to the plan and how they impact FBi's PlanCheck score in relation to the BMG. Section C of the page identifies the hours associated with meetings and work provided to the plan and how they compare to the BMG (additional details on reported hours is provided in the footnote below).

| | Scope of Svc | | SECTION A | | SECTION B PlanCheck | | SECTION C Service Hours^ | | |
|---|---|---|---|---|---|---|---|---|---|
| Services | BMG | Plan | Degree of Difficulty vs. Benchmark Group: ↑ Service is more difficult ↓ Service is less difficult ⇔ Service difficulty is the same | | BMG | Plan | Adv | Staff | Total | BMG |
| Investment Services | | | | | | | | | | |
| Assess Plan's Inv. Objectives | 9.0 | 9.0 | ⇔ | 3(21) Managed Non-Discretionary Fiduciary providing advice with decision making authority retained by the plan sponsor. | 7.3 | 7.3 | - | - | - | - |
| Design Investment Structure | 6.0 | 6.0 | ⇔ | 3(21) Managed Non-Discretionary Fiduciary providing advice with decision making authority retained by the plan sponsor. | 9.5 | 9.5 | - | - | - | - |
| Review QDIA Option | 7.0 | 7.0 | ⇔ | | 10.0 | 10.0 | - | - | - | - |
| Develop, Maintain & Monitor IPS | 2.5 | 10.0 | → | Utilize tool/service provided by Service Provider to build template | 16.8 | 16.8 | - | - | - | - |
| Implement & Maint Overall Invest Struct | 9.0 | 9.0 | ⇔ | 3(21) Managed Non-Discretionary Fiduciary providing advice with decision making authority retained by the plan sponsor. | 8.9 | 8.9 | - | - | - | - |
| Build/Manage Model Portfolios | 17.0 | 0.0 | ← | Provide custom asset allocation and fund selection for Model Portfolios using a dedicated resource | 8.2 | 0.0 | - | - | - | - |
| Provide/Review Perf Reports | 8.6 | 8.6 | ⇔ | Use enhanced tool – primarily mutual funds through a group resource | 13.4 | 13.4 | - | - | - | - |
| Search & Monitor Inv Mgrs | 0.0 | 7.4 | → | | 0.0 | 8.6 | - | - | - | 40 |
| Totals: | 59.1 | 56.9 | | | 74.3 | 74.6 | 0.0 | 0.0 | 0.0 | 40.0 |
| Vendor Management | | | | | | | | | | |
| Monitor Service Provider | 20.0 | 20.0 | ⇔ | Review service providers and agreements upon request | 13.8 | 13.8 | 2 | 2 | 4 | 10 |
| Ensure All Fees Are Disclosed | 4.4 | 4.4 | ⇔ | Use standard checklist to review service agreements, 408b2 and 404a5 disclosures with committee | 13.8 | 13.8 | - | - | - | - |
| Benchmarks Fees/Value Reasonableness | 3.6 | 3.6 | ⇔ | Benchmarking data obtained from own client base | 22.2 | 22.2 | - | - | - | - |
| Generate/Evaluate RFI | 7.1 | 0.0 | ← | Utilize RFI service to distribute RFI, aggregate results and provide analytics | 10.4 | 0.0 | 2 | 2 | 4 | - |
| Generate/Evaluate RFP | 10.7 | 0.0 | ← | Utilize RFP service to distribute RFP's, aggregate results and provide analytics | 14.5 | 0.0 | 2 | 2 | 4 | - |
| Support Contract Negotiation | 0.0 | 0.0 | ⇔ | | 0 | 0 | - | - | - | - |
| Support Svc Provider Transition | 0.0 | 0.0 | ⇔ | | 0 | 0 | - | - | - | - |
| Totals: | 45.8 | 28.0 | | | 74.7 | 49.8 | 6.0 | 6.0 | 12.0 | 10.0 |
| Plan Management | | | | | | | | | | |
| Review Plan Governance | 0.0 | 0.0 | ⇔ | | 0 | 0 | - | - | - | - |
| Review 404(c) Protection | 0.0 | 0.0 | ⇔ | | 0 | 0 | - | - | - | - |
| Review E&O, D&O & Bonding Insurance | 0.0 | 0.0 | ⇔ | | 0 | 0 | - | - | - | - |
| Create and Review Fiduciary File | 9.3 | 0.0 | ← | Using standard structure with offsite hard copy archival | 10.0 | 0 | - | - | - | - |
| Analyze Plan Design | 0.0 | 2.2 | → | | 0 | 15.0 | - | - | - | - |
| Review of Education Plan | 0.0 | 2.7 | → | | 0 | 10.0 | - | - | - | - |
| Review Progress Against Education Goals | 0.0 | 0.0 | ⇔ | | 0 | 0 | - | - | - | - |
| Review Use of ERISA Account | 0.0 | 0.0 | ⇔ | | 0 | 0 | - | - | - | - |
| Meet with Plan Committee | 11.9 | 5.9 | ← | Review RK/TPA reporting and provide additional analytics including items such as overall plan health | 15.0 | 15.0 | - | 8 | 8 | 28 |
| Daily Plan Management Support | 15.7 | 11.4 | ← | Interface with RK, TPA and Sponsor | 15.0 | 15.0 | 40 | 40 | 80 | 48 |
| Other Meeting(s) | 0.0 | 0.0 | ⇔ | | 0.0 | 0.0 | - | - | - | - |
| Totals: | 36.9 | 22.2 | | | 40.0 | 55.0 | 40.0 | 40.0 | 88.0 | 76.0 |
| Participant Services | | | | | | | | | | |
| Provide Participant Phone/Email Support | 0.0 | 15.6 | → | | - | - | - | - | - | - |
| Provide Participant Newsletter | 0.0 | 0.0 | ⇔ | | - | - | - | - | - | - |
| Provide Group Meetings | 0.0 | 6.9 | → | | - | - | - | - | - | - |
| Provide One-on-One Meetings | 11.7 | 0.0 | ← | Oversees Third-party providing one-on-one meetings to participants | - | - | - | - | - | - |
| Participant Education Program Support | 0.0 | 3.4 | → | | - | - | - | - | - | - |
| Rendering of Participant Advice | 20.0 | 0.0 | ← | Advisor is 3(38) Managed Account provider | - | - | - | - | - | - |
| Totals: | 31.7 | 25.9 | | | - | - | 0.0 | 0.0 | 0.0 | 0.0 |

^ Hours include: meetings (defined by prep time, meeting time, and related follow up time) and work performed by advisor or staff (employees or shared resources). FBi tracks hours on services where the greatest variability in hours spent occurs. The split of hours between advisor and staff is considered when assessing applicable FeePoint adjustments.

FIG. 84

Advisor/Consultant: Examine Value Delivered

Examine Value Delivered

Fiduciary Benchmarks
Independent | Comprehensive | Informative

THE FOURTH STEP in understanding "What You Are Getting" is to examine the value being delivered. For you as Plan Sponsor, Fiduciary Benchmarks calculates a PlanCheck Score using a proprietary model that associates certain services with current legal issues, DOL Audit concerns and relevant best practices (100 is the maximum score). For your Participants, we compare the Participant Success Measures for your plan versus your industry. We also may project how these metrics impact the projected account balances of all participants, assuming they are all "average."

Value Delivered to You as Plan Sponsor

INVESTMENT SERVICES

*Average\**
74

Your PlanCheck Score is shown on the left.
This score is Average versus a typical score of 75.

In addition, you should examine the additional investment performance being generated by your Advisor/Consultant. Note that 10 basis points of additional investment performance for your plan is worth $12,460.

VENDOR MANAGEMENT

*Well Above Average\**
75

Your PlanCheck Score is shown on the left.
This score is Well Above Average versus a typical score of 50.

In addition, you should examine how well your Advisor/Consultant is making sure that your service levels meet or exceed expectations from your Recordkeeper and TPA for a *reasonable (not low) price.*

PLAN MANAGEMENT

*Below Average\**
40

Your PlanCheck Score is shown on the left.
This score is Below Average versus a typical score of 55.

In addition, you should examine how well your Advisor/Consultant keeps you apprised of leading edge Plan Design provisions with respect to Eligibility, Participant Contributions, Employer Contributions, Investment Structure, and Distributions.

\*See details on prior page

Value Delivered to Your Participants

| Participant Success Measures | Your Plan | Industry Median[1] |
|---|---|---|
| Participation Rate | 75.0% | 64.0% |
| Deferral Rate | 4.5% | 4.4% |
| Percent Maximizing Company Match | 32.0% | 48.0% |
| Percent Assets in Auto-Diversified Options | 65.1% | 14.0% |
| Percent "Delegators" (80% in Auto-Diversified Option) | \*\*\* | \*\*\* |
| Percent "Doers" Diversified & Auto-Rebalancing | \*\*\* | \*\*\* |
| Percent Terminated Participants NOT "Cashing Out" | 75.0% | 81.0% |

[1] Industry: 11 – Agriculture, Forestry, Fishing and Hunting
\*\*\* Available upon request via Retirement Outcomes Evaluator.

The chart below projects current account balances in 2015 for the 177 active participants in the plan *assuming all participants are average* using the metrics shown above.

Current: $97,415,667
Industry: $69,750,222

| Assumptions | Your Plan 2015-02-23 | Industry 2014-02-28 |
|---|---|---|
| Average Age | 42 | 42 |
| Average Salary | $61,050 | $61,050 |
| Inflation Rate | 3.0% | 3.0% |
| Beginning Balance | $70,395 | $70,395 |
| Employee Deferral | 4.5% | 4.4% |
| Employer Contribution | 1.5% | 1.5% |
| Rate of Return | 6.4% | 5.5% |
| Ending Balance | $511,923 | $432,421 |
| Number of Parts | 177 | 151 |
| Projected Balance | $97,415,667 | $69,750,222 |

This is a hypothetical example and individual results will vary. The difference in the rates of return used are due to research showing "Advised" investors do better than "Not Advised" investors. See the Disclaimers page for an example of the rate of return calculation. Also note that this example does not show the expenses associated with investing.

FIG. 85

Advisor/Consultant: Evaluate Fees

Fiduciary Benchmarks
Independent | Comprehensive | Informative

Evaluate Fees

THE FIFTH STEP is to evaluate the fees being paid to your Advisor/Consultant. First, Fiduciary Benchmarks tracks ALL fees being paid to your Advisor/Consultant. Second, because Advisor/Consultant services vary greatly, we *compare your fees to the benchmark group* and to FeePoint – a proprietary market-based benchmark that reflects the unique services provided by your Advisor/Consultant. Third, we provide a detailed explanation of FeePoint so you can have a better understanding of the unique services provided by your Advisor/Consultant. FeePoint adjusts for services related to plan fiduciary status, asset allocation models and extra meetings/work. Other qualitative and quantitative services are NOT part of FeePoint.

❶ Track all Fees — 86a

| Source of Fees | Description | Amount | % |
|---|---|---|---|
| | Fees from Investments | $ 7,663 | 0.061% |
| | Other Fees | $ 29,912 | 0.240% |
| Payments | Payment to Recordkeeper | – | – |
| | Payment to TPA | – | – |
| | Payment to Others | – | – |
| Credits | Credits to Plan | – | – |
| | Credits to Participants | – | – |
| Total | Total Advisor/Consultant Fee | $ 37,575 | 0.302% |

Itemized Other Fees, Payments and Credits:

| Description | Type | Amount | How Paid |
|---|---|---|---|
| Advisory Fee | 0.220% on plan | $ 27,412 | Plan Credit Account |
| RFI and RFP work | $ amount | $ 2,500 | Plan Assets |

❷ Compare Fees to BMG and FeePoint — 86c

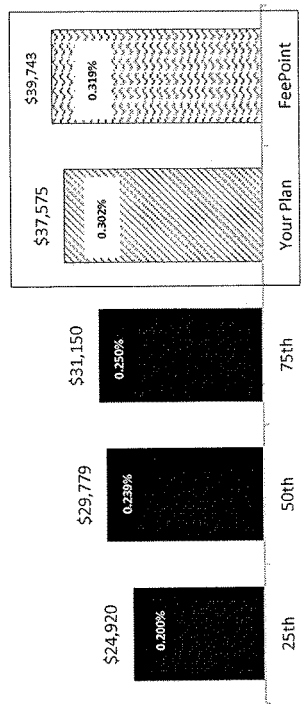

Advisor/Consultant Fees

25th: $24,920 (0.200%)
50th: $29,779 (0.239%)
75th: $31,150 (0.250%)
Your Plan: $37,575 (0.302%)
FeePoint: $39,743 (0.319%)

*Advisor/Consultant services' scope, difficulty, amount, and fiduciary status can vary across a benchmark group and may differ from the services received by this plan.*

❸ Understand FeePoint — 86b

| Adjustments | Plan | BMG* | Amount** |
|---|---|---|---|
| FBi Predictive Model for Base Advisor Fee | – | – | $ 25,343 |
| Model Fiduciary Status | 3(38) | none | $ 9,400 |
| Daily Plan Management Support – Hours | 80 | 48 | $ 4,000 |
| Generate & Evaluate Service Provide RFP – Hours | 4 | – | $ 500 |
| Generate & Evaluate Service Provide RFI – Hours | 4 | – | $ 500 |
| FeePoint Total | | | $ 39,743 |

\* BMG represents the most common occurrence. Higher and lower occurrences exist.
\** Assumed Hourly rate for Advisor/Consultant = $200

Page 39 of 43

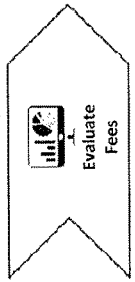

FIG. 86

Advisor/Consultant: Evaluate Fees

Evaluate Fees

Fiduciary Benchmarks
Independent | Comprehensive | Informative

This is the summary of the Investment Fees from the Advisor/Consultant: Evaluate Fees page.

Investment Fees to Advisor/Consultant

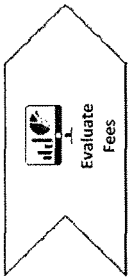
87a / 87b

| Fund Name | Ticker | Assets | Fee Retained by Advisor/Consultant | Fee Credited to Plan | Fee Rebated to Participants | Benchmark Group Percentiles and Comparison | | | |
|---|---|---|---|---|---|---|---|---|---|
| | | | | | | 25th | 50th | 75th | Diff. from 50th |
| CORE OPTIONS | | | | | | | | | |
| Johnson Stable Value D | - | $1,744,383 | 0.15% | - | - | 0.20% | 0.25% | 0.25% | -0.10% |
| RGA Total Return Bond A | - | $1,370,587 | - | - | - | 0.24% | 0.25% | 0.25% | - |
| Yamane Large Value Inst. | - | $747,593 | - | - | - | 0.23% | 0.25% | 0.25% | - |
| Low Track S&P 500 Index Inv. | - | $872,192 | - | - | - | 0.15% | 0.25% | 0.25% | - |
| Georgia Large Cap Growth N | - | $622,994 | 0.10% | - | - | 0.23% | 0.25% | 0.25% | -0.15% |
| Emerging Value Opportunities Adv. | - | $249,198 | 0.25% | - | - | 0.20% | 0.25% | 0.25% | - |
| Low Track S&P 400 | - | $249,198 | - | - | - | 0.23% | 0.25% | 0.25% | - |
| Moment Captured Growth | - | $186,998 | 0.25% | - | - | 0.23% | 0.25% | 0.25% | - |
| Yamane Small Value Inst. | - | $124,599 | 0.25% | - | - | 0.20% | 0.25% | 0.25% | - |
| Low Track S&P 600 | - | $124,599 | - | - | - | 0.20% | 0.20% | 0.25% | - |
| Georgia Small Cap Growth N | - | $124,599 | - | - | - | 0.20% | 0.25% | 0.25% | - |
| Yamane International Inst. | - | $872,192 | - | - | - | 0.24% | 0.25% | 0.25% | - |
| Far Lands Emerging Growth A | - | $87,219 | 0.25% | - | - | 0.20% | 0.25% | 0.25% | - |
| Smithland Real Estate Securities D | - | $99,679 | - | - | - | 0.20% | 0.25% | 0.25% | - |
| AUTO DIVERSIFIED OPTIONS | | | | | | | | | |
| Holistic Conservative Fund A | - | $249,198 | 0.25% | - | - | 0.20% | 0.25% | 0.25% | - |
| Holistic Aggressive Fund A | - | $124,599 | 0.25% | - | - | 0.20% | 0.24% | 0.25% | 0.01% |
| Holistic Balanced Fund A | - | $498,395 | 0.25% | - | - | 0.20% | 0.24% | 0.25% | 0.01% |
| Holistic Moderate Fund A | - | $249,198 | 0.25% | - | - | 0.20% | 0.24% | 0.25% | 0.01% |
| Achieve Retirement Moderate 2010 E | - | $373,797 | - | - | - | 0.24% | 0.25% | 0.25% | - |
| Achieve Retirement Moderate 2015 E | - | $373,797 | - | - | - | 0.20% | 0.25% | 0.25% | - |
| Achieve Retirement Moderate 2025 E | - | $622,994 | - | - | - | 0.23% | 0.25% | 0.25% | - |
| Achieve Retirement Moderate 2020 E | - | $747,593 | - | - | - | 0.23% | 0.25% | 0.25% | - |
| Achieve Retirement Moderate 2030 E | - | $498,395 | - | - | - | 0.21% | 0.25% | 0.25% | - |
| Achieve Retirement Moderate 2035 E | - | $373,797 | - | - | - | 0.22% | 0.25% | 0.25% | - |
| Achieve Retirement Moderate 2040 E | - | $373,797 | - | - | - | 0.20% | 0.25% | 0.25% | - |
| Achieve Retirement Moderate 2045 E | - | $124,599 | - | - | - | 0.21% | 0.25% | 0.25% | - |

Page 40 of 43

FIG. 87

Advisor/Consultant: Evaluate Fees

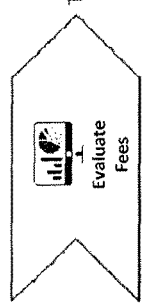

This is the summary of the Investment Fees from the Advisor/Consultant: Evaluate Fees page.

Investment Fees to Advisor/Consultant

88a

88b

| Fund Name | Ticker | Assets | Fee Retained by Advisor/Consultant | Fee Credited to Plan | Fee Rebated to Participants | Benchmark Group Percentiles and Comparison | | | |
|---|---|---|---|---|---|---|---|---|---|
| | | | | | | 25th | 50th | 75th | Diff. from 50th |
| AUTO DIVERSIFIED OPTIONS | | | | | | | | | |
| Achieve Retirement Moderate 2050 E | -- | $124,599 | -- | -- | -- | 0.20% | 0.25% | 0.25% | -- |
| Achieve Retirement Moderate 2055 E | -- | $124,599 | -- | -- | -- | 0.20% | 0.20% | 0.25% | -- |
| OTHER OPTIONS | | | | | | | | | |
| Self-Directed Brokerage | -- | $124,599 | -- | -- | -- | -- | -- | -- | -- |
| TOTAL | -- | $12,459,886 | 0.061% | | | | | | |

FIG. 88

Advisor/Consultant: Summary and Documentation

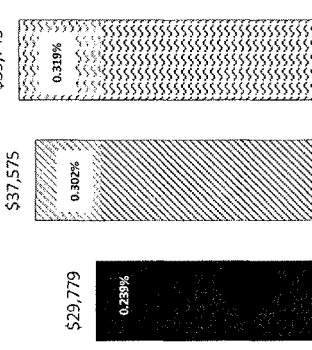
Fiduciary Benchmarks
Independent | Comprehensive | Informative

To assist you in the evaluation of your Advisor/Consultant, Fiduciary Benchmarks has pulled the most relevant data and statistics from our process and displayed them below. As a Fiduciary, you have the ultimate responsibility of making sure you assess and negotiate REASONABLE fees from your Advisor/Consultant. The information below should help you in that decision-making process.

| Customize Benchmark Group | Review Provider Quality | Assess Scope of Services | Examine Value Delivered | Evaluate Fees |

Benchmark Group

The Characteristics of your customized benchmark group are shown below:

YOUR PLAN
- Assets: $12.5 M

YOUR BENCHMARK GROUP REPRESENTING:
- 201 Advisory Firms
- 273 Advisors/Consultants
- 58 Recordkeepers

ASSETS DRIVE FEES
- Low Value: $10 M
- Median: $11.2 M
- High Value: $12.5 M

Provider Quality – Scope of Services – Value Delivered

Shown below are QUALITATIVE components that should be examined when assessing the reasonableness of your Advisor/Consultants.

| Provider Quality – Scope of Services – Value Delivered |
|---|
| Service Provider Quality |
| Investment Services – Investment Performance |
| Vendor Management – Meets Service Levels |
| Plan Management – Apprised of Leading Edge Plan Design |

Your discussion of these items should be documented and the related notes, as well as any other report notes, should be placed into your fiduciary file to assist in satisfying your fiduciary obligation.

Shown below are QUANTITATIVE components evaluated by Fiduciary Benchmarks that can also be examined when assessing the reasonableness of your Advisor/Consultant.

| Provider Quality – Scope of Services – Value Delivered | Your Plan | Benchmark | FBi Score |
|---|---|---|---|
| Scope of Services – Investment Services | 59.1 | 56.9 | Average* |
| Scope of Services – Vendor Management | 45.8 | 28.0 | Well Above Average* |
| Scope of Services – Plan Management | 36.9 | 22.2 | Well Above Average* |
| Scope of Services – Participant Services | 31.7 | 25.9 | Above Average* |
| PlanCheck Score – Investment Services | 74.3 | 74.6 | Average* |
| PlanCheck Score – Vendor Management | 74.7 | 49.8 | Well Above Average* |
| PlanCheck Score – Plan Management | 40.0 | 55.0 | Below Average* |

* See details on Assess Scope of Services pages

Fees

Shown below are how your fees compare to the Benchmark Group median and to Fiduciary Benchmarks' proprietary benchmark for your Advisor/Consultant: FeePoint.

$29,779   0.239%
$37,575   0.302%
$39,743   0.319%

50th    Your Plan    FeePoint

*Note: FeePoint adjusts for services related to plan fiduciary status, asset allocation models and extra meetings/work. Other qualitative and quantitative services are NOT part of FeePoint*

Important Information and Disclaimers

Fiduciary Benchmarks
Independent | Comprehensive | Informative

Nature of Report and FBi's Role

- This report was prepared solely by Fiduciary Benchmarks Insights, LLC (FBi) with data provided by the various service providers for your plan. FBi has provided the report to support the review of your plan's fees and services.
- This report is provided for educational and informational purposes only. You must decide yourself how to use and interpret the report, including whether you need a professional to assist you. Neither FBi nor any of your service providers are responsible for how you interpret or use the information. The report is a tool to aid you in evaluating your plan and should not be the sole source of information you use to evaluate your plan.
- This report is not investment advice and FBi does not act as an "investment adviser" as defined in the Investment Advisers Act of 1940. Nor is FBi a fiduciary to you under the Employee Retirement Income Security Act of 1974 ("ERISA") or any other law.
- FBi is not rendering legal, tax or accounting services. Consult your tax or legal advisors before establishing a retirement plan and make sure you understand the tax, ERISA and related consequences of investments made under the plan.

Information Disclaimer

- The information in this report is based upon data received from (1) you and your agents and service providers regarding your retirement plan and the investment options offered thereunder ("Subject Plan") and (2) plan sponsors of other retirement plans that have certain similarities to your plan and their agents and service providers ("Benchmark Group").
- The report is provided on an "AS IS" and "AS AVAILABLE" basis and use of the information and data therein is solely at your risk. FBi has not verified the accuracy or completeness of the information in the report and FBi is not responsible for any data in the report, including any inaccuracies. FBi makes no representation or warranty, express or implied, of any kind to any person and expressly disclaims all warranties, including the implied warranties of title, non-infringement of third-party intellectual property rights, merchantability, fitness for a particular purpose, accuracy, timeliness or completeness. Furthermore, you should notify us if you believe that any of the assumptions or information reflected in this report is incorrect.
- This report was prepared as of the date shown on the cover and data used in this report generally has been updated within 90 days of the report date. However, data is received from various sources and at different times. In addition, a lot of the information in the report is time-sensitive. Over time, different data will be available to FBi and enhancements may be made to the methodology and report and thus results may vary with each report generated. FBi is under no obligation to monitor or update this report in the future unless expressly engaged to do so. FBi may modify the content of the report at any time in its sole discretion.
- It may be that certain investment options have been made available under your plan and that certain fees have been charged in connection with your plan and/or the investment options offered thereunder, but they are not reflected in this report. Please refer to the separate disclosures regarding these investment options and fees and include them in your evaluation of your plan and its investment options.

Methodology

- This report is based on the methodology utilized by FBi to gather, compile and present information. You should review the description of this methodology in the page titled Fiduciary Benchmarks' Evaluation Process in order to understand the approaches taken by FBi in preparing this report in order to properly evaluate the report and the information in the report. FBi may modify its methodology to gather, compile and present information at any time in its sole discretion as well as modify the content of the report at any time in its sole discretion.
- The Rate of Return calculation is based on a 2014 study by Financial Engines and Aon Hewitt which can be referenced at: www.fiduciarybenchmarks.com/rate of return. This study shows that 723,000 individual participants with over $55 billion in assets that received "Help" have rates of return 3.40% HIGHER than those who DID NOT receive "Help" over the period 1/1/2006 to 12/31/2012. FBi uses a baseline of 5% for the Industry Rate of Return and then adds/subtracts 50% of 3.40% if the amount of assets in Auto-Diversified "help" options is more/less than the Industry. Example: Plan has 60% of Assets in Auto-Diversified Options versus Industry of 25%. Adjustment to Rate of Return is calculated as follows: 50% times 3.40% times (60% – 25%) which equals .59% which is then added to the 5% Industry baseline figure thus taking the Plan Rate of Return to 5.59%.
- FeePoint is a market-based proprietary estimate of the fee for the Advisor/Consultant Recordkeeper, or TPA. Note that FeePoint consists of two parts. The first part is a base fee estimated by using mathematical models that examine highly predictive fee variables such as plan assets or average account balance. The second part is a variable fee for "extra credit" items due to extra work/services/meetings or ficuciary status that are not typical for plans in the Benchmark Group. "Extra Credit" can be submitted in either hard dollar expenditures or hours. If hours are used, FBi requests the specific resource doing the work and allows the service provider to choose an hourly rate that falls within the following ranges:
  Advisor/Consultant: $200 to $600, Advisor/Consultant Staff: $50 to $200, Recordkeeper/TPA Consultant: $200 to $600, Recordkeeper/TPA staff: $50 to $200.

Page 43 of 43

FIG. 9O

SYSTEM AND METHOD FOR EVALUATING A SERVICE PROVIDER OF A RETIREMENT PLAN

CROSS-REFERENCE TO RELATED APPLICATIONS

This application is a continuation-in-part of U.S. application Ser. No. 14/519,974 filed on Oct. 21, 2014, which claims the benefit of and priority to U.S. Provisional Application No. 61/894,358, filed Oct. 22, 2013, both of which are incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

According to the U.S. Census Bureau, 24 million baby boomers will retire over the next ten years. Traditionally, Defined Benefit (DB) Plans (i.e., employer-provided pensions) were an employee's primary source for income during their retirement. In recent years, however, employers and the retirement industry as a whole have shifted away from DB Plans toward Defined Contribution (DC) Plans, such as 401(k) Plans, profit sharing Plans, money purchase Plans and the like.

Today, there are literally hundreds of thousands of different 401(k) Plans, each having any number of Plan designs, services, and fees associated with them. In addition, ERISA requires that Plan Sponsors ensure that Plan fees are "reasonable." To do this, Plan Sponsors traditionally employ a laborious Request for Proposal (RFP) process that is not only expensive and time consuming but is also limiting in terms of the ability of a Plan Sponsor to compare one Plan to another. Consequently, Plan Sponsors using traditional methods may not be able to determine whether or not the fees that are charged to a DC Plan are reasonable and equitable in view of the services the Plan receives as compared to the fees and services associated with other Plans.

For example, a DC Plan, such as a 401(k) Plan, may pay fees to a number of entities that provide services to the Plan Sponsor, such as fees that pay for record keeping, fees that pay for advisors/consultants, fees that pay for investment managers, and fees paid to others for a variety of services. In addition, Plan fees may include different types of fees, such as investment fees, commissions, finders' fees, managed account fees. Exacerbating the difficulty of determining how much, to whom, and when fees are paid is the fact that many of the fees associated with a given Plan are completely hidden to the Plan Sponsor.

That said, fees may contribute only one aspect of determining the "value" of a given Plan to a Plan Sponsor. The Plan Sponsor may be willing to pay higher fees, for example, if the services that the Plan receives in return are better than the average for similarly constructed Plans. Likewise, the Plan Sponsor may be less willing to pay higher fees if the services that the Plan receives in return are less than average for similarly constructed Plans. Consequently, a method and system for comparing DC Plans and which takes into account not only the fees that are paid for various services that a Plan receives, but also the quantity and quality of services that the Plan receives would assist Plan Sponsors, Recordkeepers, Advisor/Consultants, and the like in evaluating a given Plan against other similarly structured Plans.

A challenge to making this comparison is determining what "other" Plans should be used for this comparison, as well as what features, aspects, and considerations of the "other" Plans that should be used in order to make an apples-to-apples comparison of a selected Plan's fees, design, support and services. Another challenge is determining how best to display and/or report the comparison in a meaningful manner to quickly identify a given Plan's quantitative and qualitative aspects relative to the "other" Plans.

From the perspective of a provider of services (i.e., Service Provider) under or in association with a given Plan, equally challenging is determining the value of such services in view of the fees and costs associated with the provision of such services in comparison to what providers of services are providing in similarly constructed Plans.

If a meaningful comparison can be made, the various aspects and features of a given Plan and/or services provided by a Service Provider may become transparent to the Plan Sponsor, to the Service Provider, or to others so as to enable an informed decision as to the Plan's overall value and/or the value of services provided by a Service Provider, as well as to lead to clearer documentation of fiduciary objectives, better assistance for Plan Participants, lower potential levels of litigation, and objectively manage Plan fees and services.

SUMMARY

A method of evaluating a service provider of a retirement plan, comprising the steps of: (a) receiving data corresponding to a plurality of retirement plans; (b) storing the data in memory on a device associated with at least one web-accessible computer; (c) determining from the data, via a processor associated with the at least one web-accessible computer, a fee component, a cost component, and a value component associated with each of the retirement plans and for each of a plurality of service providers associated with the retirement plans; (d) for a selected service provider of a retirement plan, assembling, via the processor, a comparison group from among the plurality of retirement plans, the comparison group including characteristics matched to the selected service provider and of the retirement plan associated with the service provider; and (e) providing, via the processor, a comparison of the fee component, the cost component, and the value component associated with the selected service provider to the fee component, cost component, and the value component of the service provider associated with the comparison group of retirement plans.

The service provider may include an Investment Manager. The service provider may include a Recordkeeper. The service provider may include a Third Party Administrator. The service provider may include an Advisor. The service provider may include any provider of services to the retirement plan.

The step of assembling a comparison group of plans may include the step of determining a plurality of factors that are determinative of a reasonableness of service provider fees to the retirement plan serviced by the service provider. The step of assembling a comparison group of plans may include dynamically selecting endpoints of the factors to place the retirement plan associated with the service provider near a middle point of the comparison group of retirement plans.

The fee component may include Plan Driven Fees. The method may include determining whether the Plan Driven Fees of the retirement plan associated with the service provider lie above or below a point on a regression line passed through a scatter plot of the Plan Driven Fees associated with the comparison group of plans at the same plan asset amount as that of the retirement plan associated with the selected service provider. The method may include determining an amount of a difference in percent or dollars per plan participant between the Plan Driven Fees of the retirement plan associated with the service provider and the point on the regression line associated with Plan Driven Fees of the comparison group of plans at the same plan asset amount as that of the retirement plan associated with the selected service provider. The fee component may include Participant Driven Fees.

The cost component may include a plurality of drivers of cost of the retirement plan associated with the service provider. The method may include determining a plan complexity score. The method may include determining a plan recordkeeping services score. The method may include determining a plan administration services score. The method may include determining a plan compliance and consulting services score. The method may include determining a plan communications and education services score.

The value component may include a plurality of qualitative factors relevant to assessing a reasonableness of service provider fees to the retirement plan serviced by the service provider.

The comparison may include a report. The report may include an analysis of at least one of the fee component, the cost component, and the value component of a plurality of service providers associated with the retirement plan. The report may include an analysis of at least one of the fee component, the cost component, and the value component of at least one of the service providers associated with the retirement plan.

Additional features and advantages of the present disclosure are described in, and will be apparent from, the following Detailed Description and the Figures.

BRIEF DESCRIPTION OF THE DRAWINGS

FIGS. 7 to 43 illustrate an exemplary report to assist a user in evaluating a service provider to a retirement plan;

FIGS. 47 to 52 illustrate a summary portion of an exemplary report to assist a user in evaluating the Service Providers associated with a retirement plan;

FIGS. 53 to 61 illustrate an exemplary report to assist a user in evaluating an Investment Manager of a retirement plan;

FIGS. 62 to 71 illustrate an exemplary report to assist a user in evaluating a Record keeper of a retirement plan;

FIGS. 72 to 79 illustrate an exemplary report to assist a user in evaluating a TPA of a retirement plan; and FIGS. 80 to 90 illustrate an exemplary report to assist a user in evaluating an Advisor/Consultant of a retirement plan.

DEFINITIONS

The following definitions are illustrative and are not intended to be limiting.

"Plan" means any Defined Contribution Plan, including, 401(k), 403(b), 457, profit sharing, and money purchase Plans.

"Plan Sponsor" means an employer or offeror of the Plan to a Plan Participant.

"Plan Participant" means an employee or beneficiary of a Plan.

"Plan Advisor" or "Advisor" or "Advisor/Consultant" means any person or entity that, among other things, provides consulting services to the Plan Sponsor, such as how and where to invest Plan assets.

"Service Provider" means any provider of any service to or for the Plan, including, Recordkeeper; Advisor/Consultant; Investment Manager; and Managed Accounts Provider and other service providers.

"Recordkeeper" means any person or entity that, among other things, keeps or maintains records for a Plan.

"Investment Manager" means any person or entity that, among other things, manages Plan investment options.

"Managed Accounts Provider" means a Service Provider that, among other things, provides personalized services to Plan Participants, including creating, implementing, and monitoring of personalized retirement plans for Plan Participants. The services offered by a Managed Accounts Provider are elective in nature and result in additional fees to a given Plan.

"Other Provider" means other providers of services to the Plan, including, legal, accountant, and tax services.

"Third Party Administrator" means any person or entity that, among other things, designs and/or administers 401(k) Plans for Plan Sponsors, and who may ensure compliance with ERISA and the IRS.

"TPA" means Third Party Administrator.

DETAILED DESCRIPTION

Figure 1:
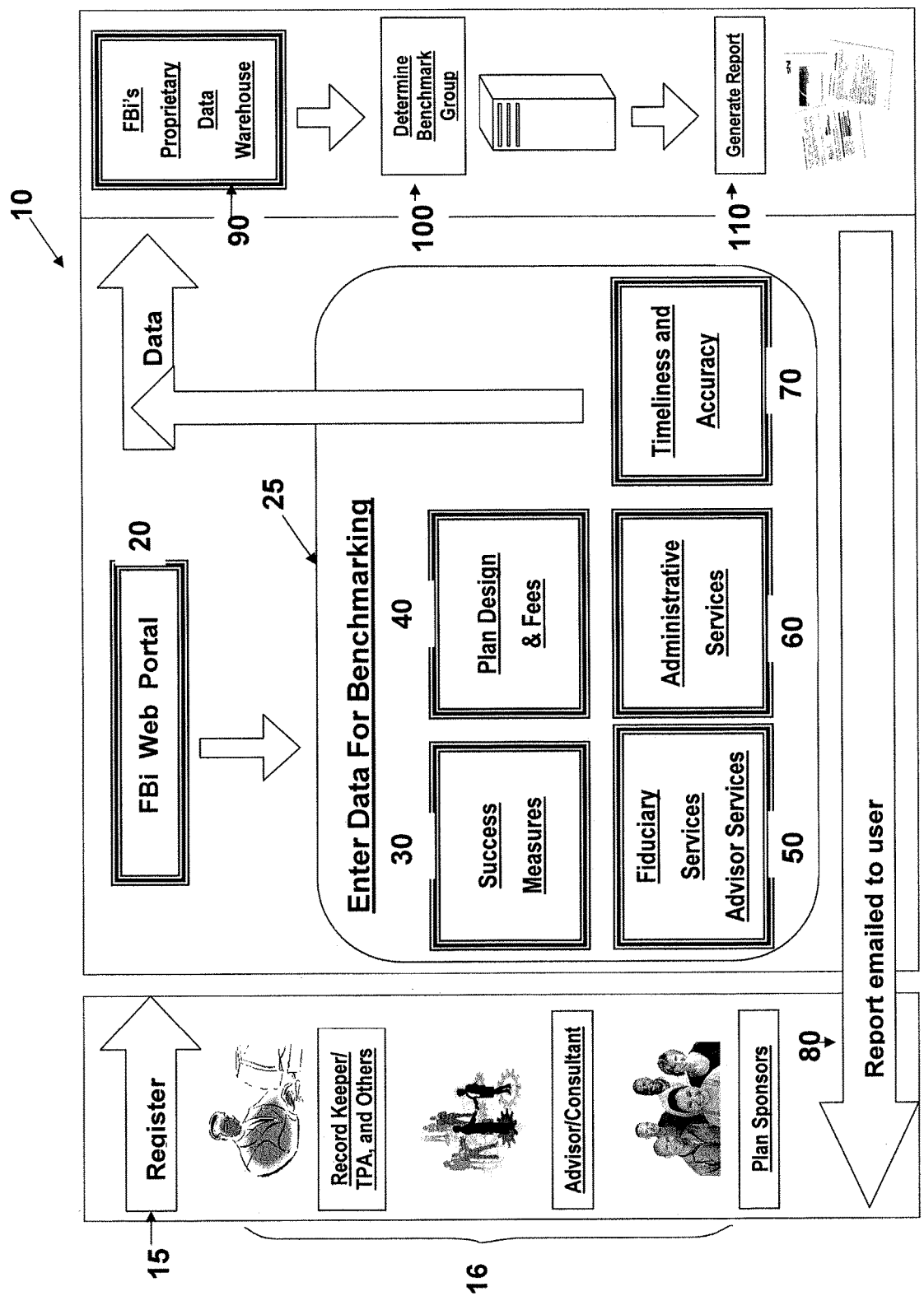
FIG. 1 illustrates an aspect of the present disclosure describing an exemplary system and method to collect data, including retirement plan data, and to generate one or more reports concerning the data.

Turning now to the figures, wherein like reference numerals refer to like elements, there is illustrated in FIG. 1 one embodiment of the present disclosure to help, for example, a Plan Fiduciary including, for example, a Plan Sponsor or a Service Provider, for example, to determine if the fees and costs being paid to various Service Providers are reasonable. In the embodiment of FIG. 1, system 10 includes: (a) a web-based user interface portal 20 configured to receive a variety of data including Plan data 25 into database 90 by a User 16, comprising, for example, a Plan Sponsor, a Recordkeeper, a Third Party Administrator, an Investment Manager, an Advisor/Consultant or any other person or entity, (b) a registration/login module 15 configured to permit authenticated login access to authorize a User 16 of system 10, (c) a data entry module configured to facilitate the entry and receipt of data, such as Plan data 25, into system 10, (d) a database 90 configured to store and retrieve the data, such as Plan data 25 for a multitude of Plans, (e) a benchmark group module 100 configured to determine an appropriate Benchmark Group of Plans that are similar in size, fees, features and services, among others, to the Plan, (f) a report generation engine 110 configured to generate a selected report on demand or at predetermined intervals as may be selected by User 16, and (g) a delivery module 80 configured to deliver, transmit, or otherwise make the selected report available to User 16. In other embodiments, data including Plan data may be received and stored in database 90 via any of a number of other mechanisms other than by the web-based user interface portal 20, as described more fully below.

As shown in FIG. 1, Plan data 25 that may be entered into or collected by system 10 may include, for example, success measures data 30 (e.g., Plan participation rate), Plan design and fees data 40 (e.g., fees to Record keepers and Plan eligibility information), investment data (not shown) (e.g., investment offering information), fiduciary services, advisor services, and advisor satisfaction data 50 (e.g., Advisor/Consultant support services and fee information), administrative services data 60 (e.g., Participant-driven administration services), and timeliness and accuracy factors data 70 (e.g., factors that might be Participant-driven or Plan-driven). System 10 may collect any other data that is pertinent to evaluating any aspect of a Plan, including any aspect of the services provided to the Plan by any Service Provider.

Figure 2:
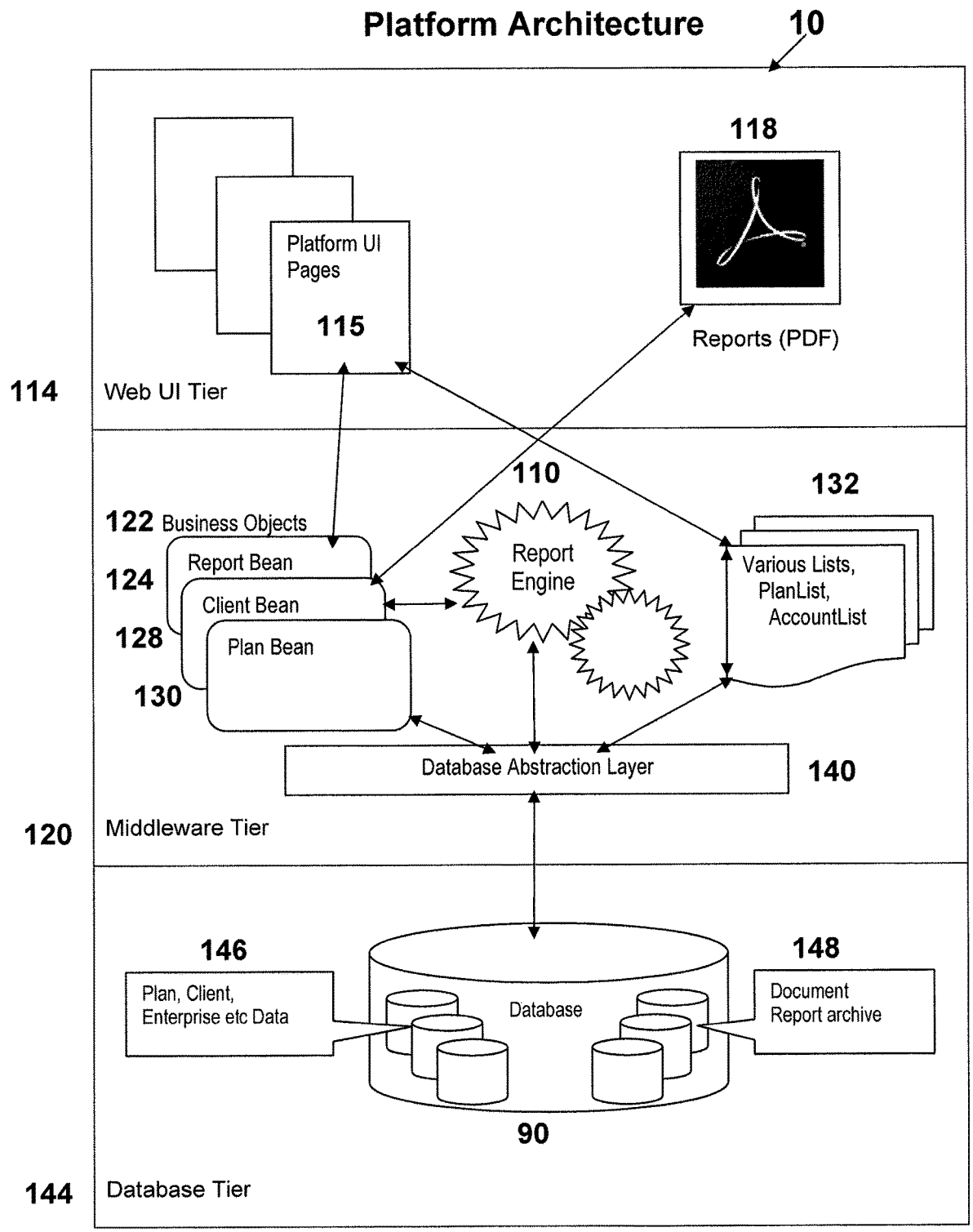
FIG. 2 illustrates one embodiment of a platform architecture of the present disclosure.

Moving to FIG. 2, there is shown an exemplary platform architecture for system 10. For example, system 10 may include: (a) web user interface tier 114, (b) middleware tier 120, and (c) database tier 144. Web user interface tier 114 may include platform user interface pages 115 for interacting with system 10, and particularly, for entering Plan data 25 into database 90, and for selecting one or more pre-styled reports 118 or for selecting one or more options for customizing a dynamically prepared, user-customizable report 118.

As shown in FIG. 2, middleware tier 120 may include various business objects 122, various objects 132 including list functions, database abstraction layer 140, and report generation engine 110. Business objects 122 may further comprise a report bean 124, a client bean 128, a Plan bean 130, and other objects, such as a Benchmark Group bean (not shown). Each of these business objects 122 may include software, one or more CPU's and memory to perform the functions of displaying HTML user interface pages 115 in a web browser and dynamically interacting with User 16, acquiring Plan data 25 or other input data or input selections from User 16, temporarily storing all input data in memory, real-time automatically and dynamically adjusting or manipulating user interface pages 115 in response to various user selections and/or data input by toggling on and off subsequent input fields and selections according to pre-programmed rules, and causing the storage of input data and user selections in database 90. Consequently, User 16 may enter Plan data 25 after logging into web portal 20 and, using user interface pages 115, interact with business objects 122 of middleware tier 120.

By way of example, when entering data, such as Plan data 25, Plan bean 130 may temporarily receive and store the Plan data in middleware memory until such time as the User 16 has entered all of the Plan data. Upon clicking a "Save and Continue" button, for example, on a web page by User 16, software of business object 122 may then command the storage of the data into database 90 of database tier 144. Similarly, when User 16 enters information about themselves, for example, after registering as a "new user" in web portal 20, client bean 128 may present user interface pages 115 having various fields for entering such items as user name, address, etc. Once User 16 has completed entering data, such as Plan data, on a particular web page, client bean 128 may then cause this data to be stored in database 90 when User 16 clicks on a "Save and Continue" button to, for example, cause the system to display another web page or data entry screen.

Instead of entering Plan data 25 into system 10, User 16 may also be presented with various objects 132 connected to various lists stored in database 90. For example, User 16 may select an icon on a user interface page 115 that calls up and displays previously entered and stored Plan list data, user data, or account information data from database 90. Consequently, various objects 132 may comprise read-only functions for retrieving previously entered data from database 90 and displaying this data in user interface pages 115.

Data such as Plan data 25 may make its way into database 90 of system 10 by any number of different ways. As shown in FIG. 1, data may be directly entered by User 16 into system 10 via web portal 20. Alternatively, system 10 may collect Plan data 25 through automated direct data feeds, which may be scheduled on demand or at regular or irregular intervals, through uploads from third party investment databases, or through proprietary processing of government Plan databases. Data entry through web portal 20 may also be performed by an Advisor/Consultant, a Record keeper, or by any other Service Provider of a particular Plan, and in some instances the Plan Sponsor may enter the data themselves. Alternatively, Plan data 25 may be entered by the operator or administrator of database 90, or by a subcontracted third party.

Also shown in FIG. 2 is database 90 of database tier 144. Database 90 may be configured for storing Plan, client (e.g., user) data 146 and the like as well as storing any other documents, such as previously prepared reports 118 for later recall should User 16 so elect.

Figure 3A:
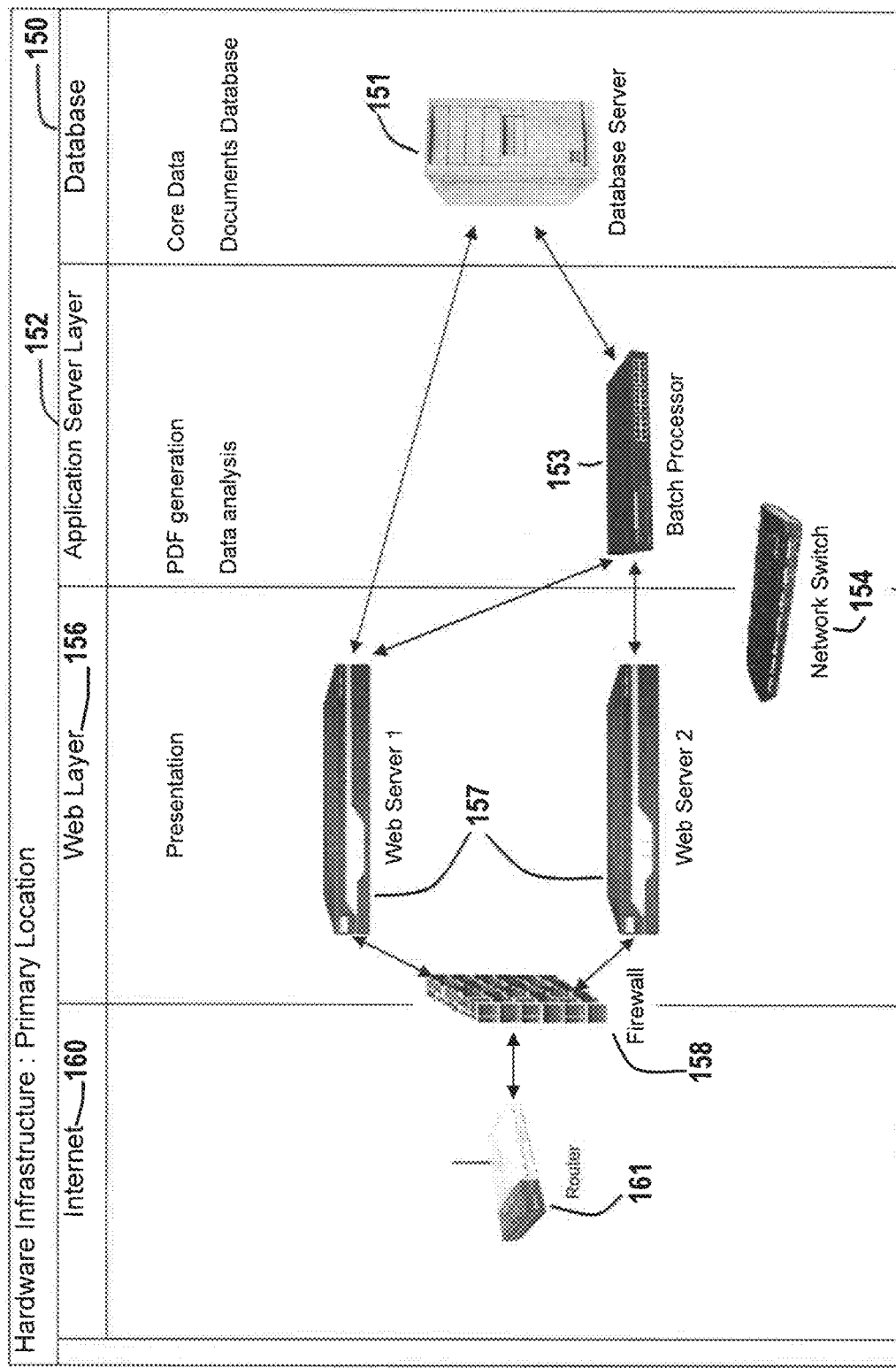
FIG. 3a illustrates one embodiment of a hardware infrastructure of the present disclosure.

FIG. 3a shows one embodiment of a hardware infrastructure that may be employed for the operation of system 10, comprising database layer 150, application server layer 152, web layer 156, and Internet layer 160. For example, database layer 150 may include database server 151 comprising database 90 which may include various data 146 and documents 148. Database server 151 may be connected to batch processor 153 of application server layer 152. Batch processor 153 may execute business objects 122, various objects 132, and report generation engine 110 to, for example, execute software programs to analyze, store data or for generating reports.

Batch processor 153 may be connected to web layer 156 comprising one or more web servers 157 for communicating with User 16 via the Internet. As shown in FIG. 3a, web server 157 may operate behind firewall 158 to protect data stored on database 90 from malicious attack. Communication web server 157 may operate to deliver various web pages and other documents to User 16 using a web browser and who may be logged into web portal 20. Such web pages may include platform user interface pages 115. The software represented by business objects 122 may be executed by batch processor 153 and temporarily stored in batch processor 153 as previously described.

In addition, when a user selects or requests a particular report 118, batch processor 153, through business objects 122, may execute software of report generation engine 110 to generate the selected report using data stored on database server 151 of database 90. When such software completes the preparation of the selected report 118, system 10 may then communicate that report back to User 16 through business objects 122 and through web server 157 and post the selected report 118 on web portal 20 for retrieval or download by User 16 subject to, for example, entering into a payment arrangement with the operator or administrator of web portal 20 before system 10 releases or otherwise allows access to report 118 by User 16. Consequently, at some point prior to User 16 obtaining a deliverable, such as a selected report 118, User 16 may be asked to provide payment to the operator or administrator of web portal 20. Alternatively, access to system 10 by User 16 may be in the form of a subscription spanning a particular time period, such as a month or a year. In this way, either a limited or unlimited quantity of reports 118, as determined by the subscription arrangement, may be delivered to User 16 within the subscription period.

Alternatively, as shown in FIG. 1, system 10 may communicate the selected report 118 to User 16 by sending the selected report 118 as an attachment, such as a PDF, to an email to User 16. In another embodiment, system 10 may communicate the selected report 118 to User 16 by causing the selected report 118 to display in a web browser on a computer screen operated by User 16. Such display may be effected in real-time or near real time, depending on how quickly system 10 can perform the calculations necessary to generate the selected report 118 and transmit the selected report 118 to User 16's computer, as well as the connectivity and available bandwidth that exists between User 16's computer and the hardware elements of system 10 that generate and transmit the selected report 118. In another embodiment, system 10 may communicate the selected report 118 to User 16 using any other electronic or tangible means, including as an attachment to a text message or as an electronic file stored on a CD, flash drive, or any other storable media, as may be selected by User 16. In yet another embodiment, system 10 may communicate the selected report 118 to User 16 via cellular communications, facsimile communications, radio frequency, Wi-Fi, satellite communications, and the like. User 16 may also schedule the delivery of a selected report 118 at scheduled times or intervals as may be selected by User 16 in web portal 20.

As shown in FIG. 3a, network router 161 of internet layer 160 may operate to complete the transmission of various web pages and documents, such as user selected reports to platform user interface pages 115. Also shown in FIG. 3a is network switch 154, which may operate to connect multiple computers together behind the firewall 158. Lastly, as shown in FIG. 3a, database server 151 may be directly connected to web server 157 to permit various objects 132 to communicate previously entered data from database 90 to User 16 without any processing of the data.

Figure 3B:
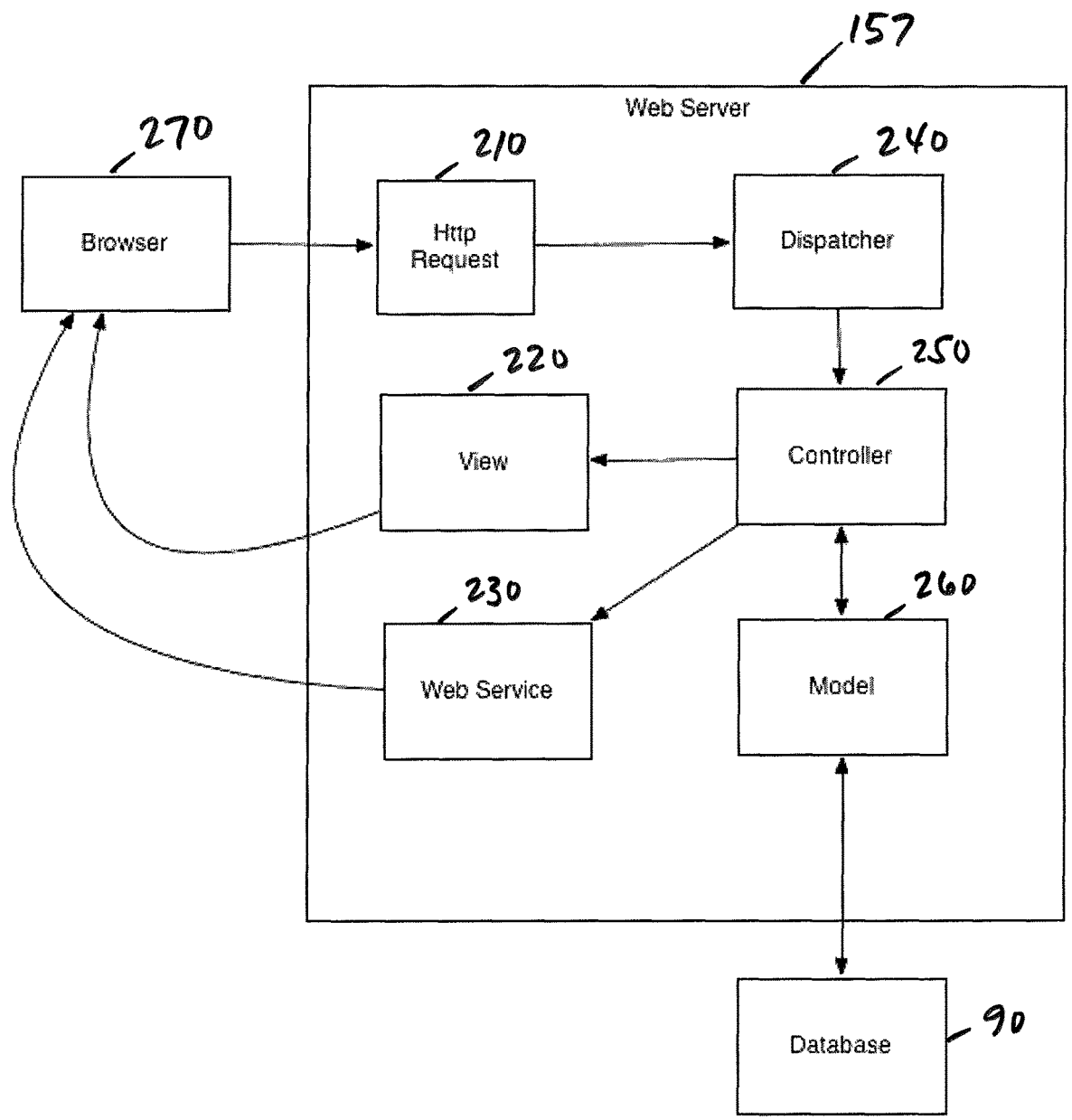
FIG. 3b illustrates one embodiment of a logic diagram of the present disclosure.

Referring to FIG. 3b, there is shown a representative logic diagram to enable system 10 to respond to a request from User 16 for data using web portal 20. Web server 157 in this embodiment includes http request handler 210, views 220, web service 230, dispatcher 240, controller 250, and models 260. Web server 157 is responsible for handling http requests received by http request handler 210 from User 16 using web browser 270 and responding with the requested data or views rendered in web browser 270. Dispatcher 240 is responsible for taking a web request from web browser 270 and sending it to the correct controller 250. The web server 157 then uses the dispatcher 24 to create a new controller, call the action and pass the parameters. Views 220 are responsible for presenting user interface pages 115 to web browser 270. Views 220 are a presentation of data in a particular format, triggered by a controller's decision to present the data. Models 260 are responsible for creating, reading, updating, and deleting records in database 90. Models 260 maintain the relationship between model objects and database 90. Models 260 provides an interface and binding between the tables in database 90 and the program code that manipulates database records in database 90. Controller 250 is responsible for coordinating with models 260 and views 220 to fulfill a web request from web browser 270. Controller 250 directs request and fulfillment traffic, queries the models 260 for specific data, and organizes (e.g., searches, sorts, and modifies) the data into a form that fits the needs of a given view. Controller 250 is a data broker positioned between model 260 and view 220. Web service 230 is responsible to take actions delegated to it by controller 250 and responding to requests from web browser 270.

In one embodiment, User 16 using web browser 270 sends a request for data to web server 157, which processes the request in this order:

1. Http request handler 210 receives the request and forward the request to dispatcher 240, which forwards the request to controller 250, which in turn, forwards the request to model 260.
2. Model 260 then retrieves the requested data from database 90 and forwards the data to controller 250, which forwards the data to view 220 for routing to web browser 270 for display to the User 16.
3. In some cases, controller 250 sends instructions to web service 230, which in turn, is forwarded to web browser 270 to enable data to be rendered on web browser 270. Commands to web service 230 may be made by controller 250 in parallel with those made to view 220.

This process and architecture may be implemented to a variety of system 10 features or aspects including benchmarking algorithms, user management, authentication, and authorization, benchmark report generation, historic report storage, user subscription management, disclosure creation and distribution.

In one embodiment, report generation engine 110 prepares one or more reports 118 using various software means, including Big Faceless Java Report Generator (available at http://big.faceless.org/), which takes XML data, such as Plan data 25 stored in database 90, and converts such data into PDF format. In another embodiment, report generation engine 110 uses Microsoft Excel to create charts and tables, which may be assembled using, for example, Microsoft Publisher and output to, for example, PDF and delivered to User 16 as described above. Report 118 may alternatively be formatted for delivery to User 16 as JPEG, TIFF, as a Microsoft Word document, as HTML web pages, or any other report format suitable for displaying comparison information between a selected Plan and a suitable Benchmark Group on either a computer display or in hard copy form.

In one embodiment, database 90 may manage and store all data that it acquires using, for example, a MySQL database with a standby server. In one embodiment, all of the data that is stored on database 90 may be centrally stored on database server 151. In another embodiment, data may be stored on many database servers 151 distributed and/or located throughout the world.

In various embodiments, a method to help a User 16, such as for example a Plan Fiduciary, determine if the fees and costs being paid to various Service Providers in connection with a particular Plan are reasonable in view of the value of the services provided by the Plan, may include some or all of the following steps: (1) building database 90 comprising a plurality of data including Plan data; (2) determining a group or subset of Plans (a "Benchmark Group of Plans") selected from a plurality of Plans described by data stored in database 90, where the Benchmark Group of Plans is determined using, for example, a plurality of Economic Factors that are considered most determinative of the fee reasonableness for that Service Provider. In some embodiments, this includes selecting characteristics among the universe of Plans stored in database 90 that are identical to identified characteristics of the given Plan or which correspond to a range bracketing identified characteristics of the Plan to the extent such characteristics are considered determinative of the fee reasonableness for that Service Provider; (3) examining the fees paid to the Service Provider of the Plan in comparison to the Benchmark Group of Plans; (4) examining the drivers of costs associated with the services provided by the Service Provider to the Plan; (5) examining various value factors associated with the services provided by the Service Provider to the Plan; and (6) generating a report for the User 16 comprising one or more of these comparisons.

To ensure that comparisons against a Benchmark Group of Plans are as relevant and accurate as possible, system 10 may receive and report current, actual Plan data. In one embodiment, fee and service data for a particular Plan must have been bid or reviewed within the last three years to avoid stale data from becoming part of the Benchmark Group of Plans. Entry of data within a given time period may help to ensure that system 10 acquires only relatively new or current information. For example, system 10 may restrict data entry on web portal 20 to Plan data that is less than a prescribed time period, such as less than three months old. Similarly, system 10 may restrict data from automatic data feeds to real Plan data that is less than, for example, one month old. Some information, such as platform data from, for example, Recordkeepers, may be updated quarterly, or at any other interval, in system 10. Basic investment information may be updated monthly, for example, from the Service Provider.

In one embodiment, the first step is to determine a Benchmark Group of Plans comprising a number of Plans from database 90 that are most similar to the given Plan. This task of determining a Benchmark Group of Plans from database 90, which may comprise potentially hundreds of thousands of plans and millions of records, is challenging at least because Defined Contribution Plans come in a myriad of shapes and sizes, where no two Plans are exactly identical. However, system 10 may consider a number of "sort factors," such as relative Plan size and relative number of Plan Participants, to quickly identify from database 90 which Plans are most similar to the given Plan.

The Benchmark Group of Plans may be dynamically determined according to a category or type of services provided by the Service Provider. In one embodiment, the Service Provider includes a Record keeper. In another embodiment, the Service Provider includes a Third Party Administrator. In another embodiment, the Service Provider includes an Advisor. In another embodiment, the Service Provider includes an Investment Manager.

System 10 may determine a Benchmark Group of Plans that is tailored to the given Plan's characteristics. For example, system 10 may identify plans in database 90 with similar economic profiles, cost structures and designs. By grouping plans in this way, system 10 may generate one or more reports 118 that enable a Plan Sponsor, for example, to accurately assess a particular Service Provider's fees, costs, and value of services provided to a given Plan relative to the fees, costs, and value of the services provided by Service Providers associated with the Benchmark Group of Plans.

For example, Plan size and number of Plan Participants may be selected as within a similar range of sizes and number of Participants to ensure matching economic profiles. In addition, by considering only those Plans that have bid or reviewed fees and services within, for example, three years may help to ensure that the Benchmark Group of Plans reflect relatively current assessment of the marketplace. It may also be inappropriate to compare a Plan with 100% passive investments to one with 100% active investments because the 100% passive Plan may have substantially lower costs due to the fiduciary's belief in indexing. However, costs associated with a 100% passive Plan may be high when compared to other passively managed Plans. Therefore, under certain circumstances, it may be useful to compare Plans with similar active/passive investment ratios. It may also be useful to compare Plans with similar exposure to Managed Accounts because Managed Accounts provide Plan Participants with an important additional service, albeit at higher structural costs. A Plan's participation and deferral rates can be directly related to the presence of an employer match or use of "auto" features. Consequently, grouping Plans of similar designs may help to determine what additional factors may generate better Participant behaviors. Establishing a Benchmark Group of Plans and comparing the Plan to the Benchmark Group of Plans in this way ensures an apples-to-apples comparison of various aspects of the Plan to those in the Benchmark Group of Plans, leading to better, more informed decision making by, for example, a Plan Sponsor.

To arrive at a Benchmark Group of Plans, system 10 may employ pre-programmed rules that may flexibly set the criteria for each sort factor depending on the system's analysis of the makeup of the plans in database 90. For example, system 10 may set ranges of the dollar amount of Plan assets to 0 to $20 million, $21-$50 million, $51-$100 million, etc., depending on the distribution of Plans that fall into each respective range or "bin." System 10 may change these ranges as new Plan data is stored in database 90. Thus, some ranges may become smaller or larger to distribute the universe of plans in database 90 into meaningful ranges for comparison purposes. During the report generation phase, the software of system 10 may analyze Plan data 25 for the given Plan and determines, given the universe of Plans in database 90 at the time, what the respective ranges for each of the sort factors should be as well as which and how many sort factors will be used to filter database 90 to arrive at the Benchmark Group of Plans. In another embodiment, the ranges applied to the sort factors is fixed regardless of the make up of and quantity of the universe of plans in database 90. In yet another embodiment, which and how many sort factors that system 10 uses to filter database 90 is fixed regardless of the make up of and quantity of the universe of plans in database 90. In still another embodiment, the ranges applied to the sort factors and the number of sort factors used to filter database 90 are selectable by User 16. In this way, User 16 may control, to some extent, not only the determination of the Benchmark Group of Plans but the resulting comparison output reflected in the one or more Reports 118 that User 16 chooses to receive. U.S. Pat. No. 8,510,198 describes a method for determining a group of Plans for use in evaluating the reasonableness of fees of a given Plan, the contents of which is incorporated by reference herein in its entirety.

To evaluate whether the fees of a Service Provider are reasonable for a given Plan, in one embodiment an appropriate Benchmark Group of Plans may be dynamically determined using a plurality of sort factors that may be determinative of the reasonableness of fees paid to a particular Service Provider, where the fees for the Service Provider in the Benchmark Group of Plans may be used as a comparison to the fees of the Service Provider for the given Plan. In one embodiment, to determine a Benchmark Group of Plans for a Recordkeeper, for example, a total of five sort factors may be used, including a dollar amount of Plan assets, the number of Plan Participants, the average balance in the Participants' accounts, and the Plan type, so as to filter database 90 from potentially hundreds of thousands of Plans to the Plans that are most relevant for comparison purposes to the Plan serviced by the Recordkeeper. Other embodiments may require more or fewer number of sort factors to determine a relevant Benchmark Group of Plans tailored to a given Service Provider. An initial composition of the Benchmark Group of Plans may be further refined and/or tailored to the Service Provider.

To examine the fees paid to the Service Provider, in some embodiments the method includes calculating a fee component comprising fees paid to the respective Service Provider of the Plan, which fees may include Plan Driven Fees and Participant Driven Fees. These fees may be compared to those associated with the Benchmark Group of Plans tailored to that Service Provider. By way of example, sources of Plan Driven Fees may include investment fees, commissions, Finder's fees, Managed Account Fees, or amounts credited to an ERISA Spending Account. Sources of Participant Driven Fees may include annual Participant advice fees, loan origination fees per occurrence, annual loan maintenance fees, hardship approval fees per occurrence, QDRO approval fees per occurrence, QDRO processing fees per occurrence, periodic payment processing fees per occurrence, and non-periodic payment processing fees per occurrence. Driven Fees may be driven by activity by the Participant, by Managed Accounts, or by Self-Directed Accounts (SDA's), for example.

In some embodiments, examining the fees paid to the Service Provider may also include comparing the fees against a scatter plot of the fees for all Plans associated with the Benchmark Group of Plans. A best fit regression can be estimated of the fees associated with the Benchmark Group of Plans as a function of average Plan assets. A numerical and/or qualitative comparison may then be made between the fees paid to the Service Provider of a Plan and the average amount of fees paid to the Service Providers of the Benchmark Group of Plans by determining whether the Service Provider's fees to the Plan are above or below the point on the regression line that intersects with the Plan asset amount as well as the dollar difference and percent difference between these values.

In some embodiments, to examine the drivers of costs associated with the services provided by the Service Provider to the Plan includes determining a numerical score to define, quantify and/or normalize a cost component comprising the various cost drivers that drive cost of the services provided by the Service Provider to the Plan. Cost drivers may include Plan complexity, recordkeeping services, administration services, compliance/consulting services, and communication and education services. Except for Plan complexity, the cost drivers may be determined using statistically valid sampling techniques to measure the labor cost of each service by examining, for example, three issues: (1) the actual service provided, (2) the degree of difficulty associated with providing the service to the Plan, and (3) the frequency at which the service is provided to the Plan.

In some embodiments, to examine value factors associated with the services provided by the Service Provider to the Plan includes determining a numerical score to define, quantify and/or normalize a value component comprising factors that drive, represent, or enhance value of the services provided by the Service Provider to the Plan. Value factors may include Participants Success Measures according to a model of Saving, Investing, Spending And Knowing as well as a qualitative measure of the Service Provider.

A pre-styled or user-customizable report may be generated to provide a User 16 with comparisons of the fee component, cost component, and value component associated with the services provided by a Service Provider to a given Plan against the appropriately determined Benchmark Group of Plans for that Service Provider. In one embodiment report 118 includes a bundled fee, cost, and value comparison of each of the Service Providers, such as the Investment Managers, Recordkeepers, and Advisors, associated with a given Plan against the same type of Services Providers providing services to the Benchmark Group of Plans. In another embodiment, report 118 may include user customizable selected portions of the bundled report, such as a section applicable to a number fewer than all of the Service Providers. The method may be repeated for each of the Plans to which the particular Service Provider provides services, resulting in a separate report 118 for each Plan or a single report 118 for all Plans associated with that Service Provider. A report 118 may be ordered by User 16 at any time, or may be automatically made available to User 16 at predefined intervals or at predefined dates and times in any given year.

Figure 4:
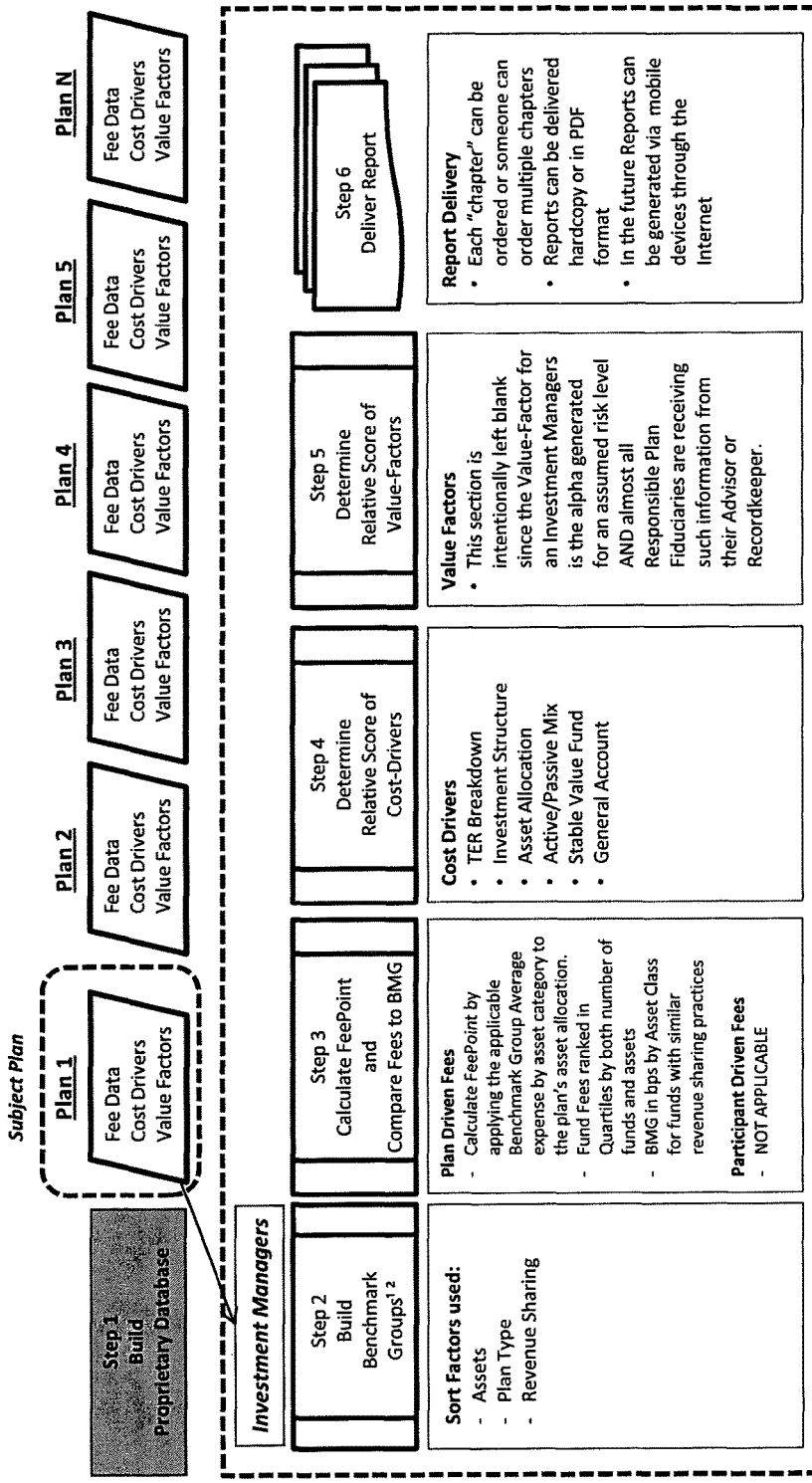
FIG. 4 illustrates one embodiment of a method of evaluating the reasonableness of fees of an Investment Manager to a retirement plan.
Figure 5:
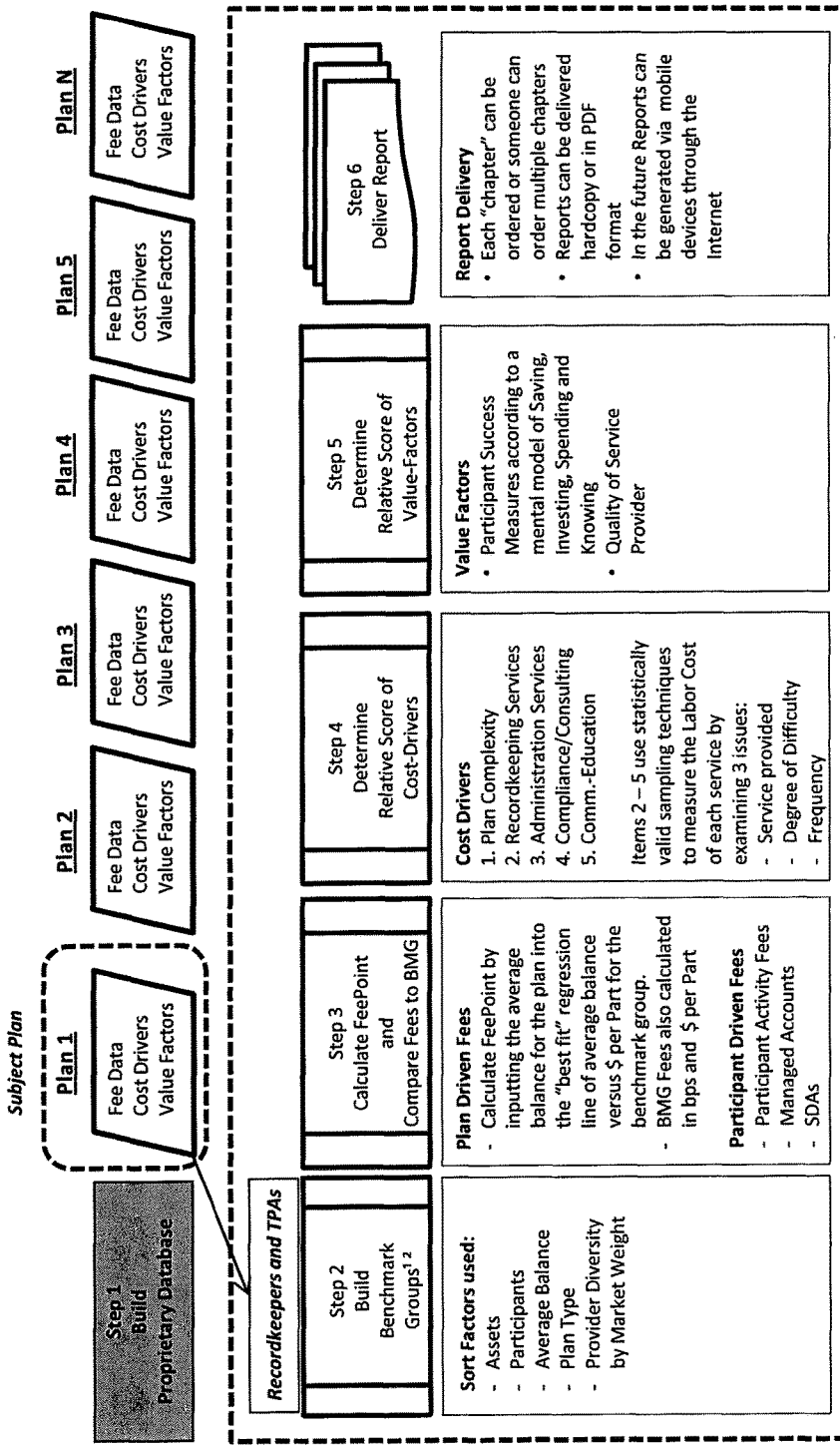
FIG. 5 illustrates one embodiment of a method of evaluating the reasonableness of fees of an Record keepers and TPA's to a retirement plan.
Figure 6:
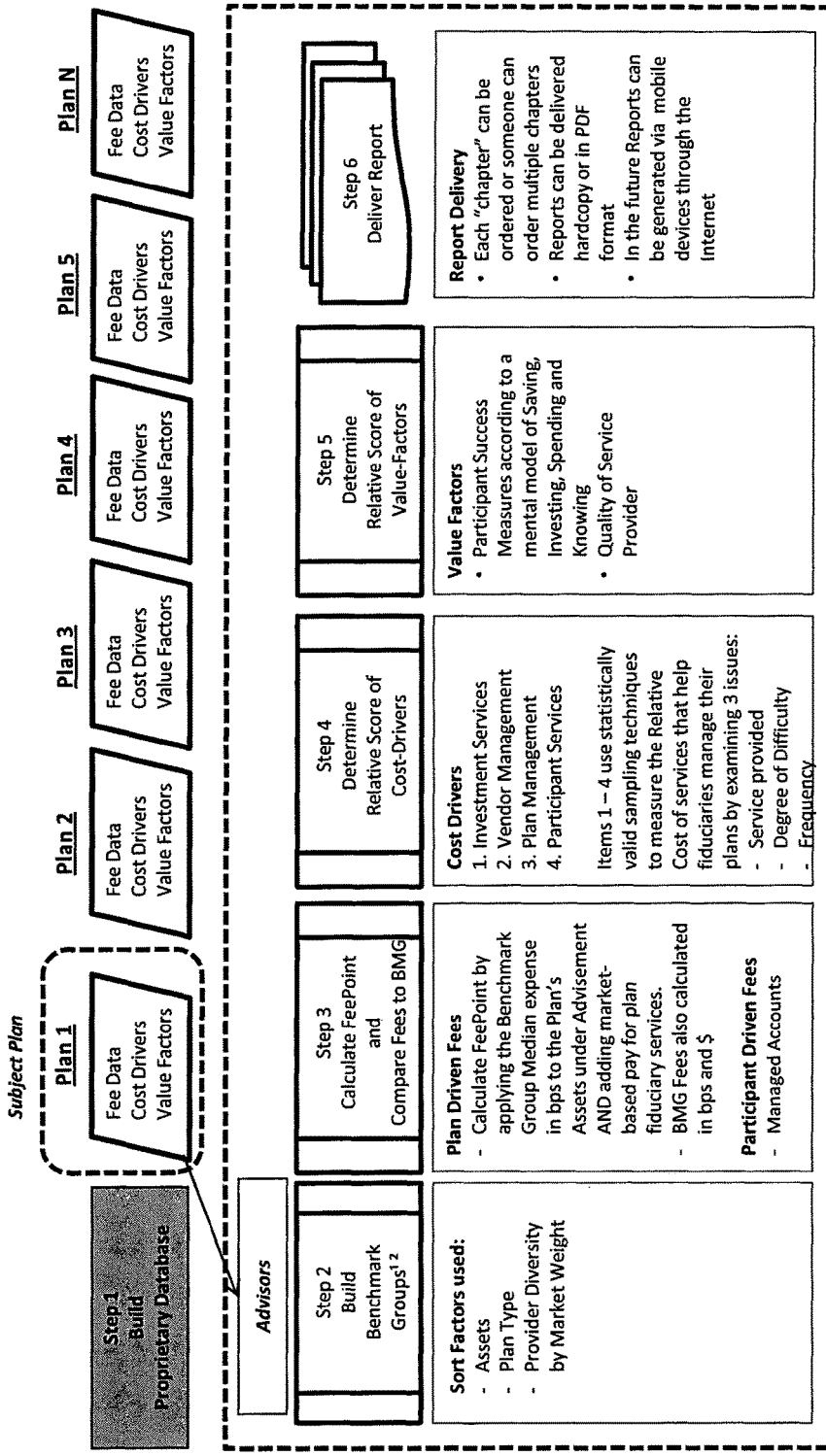
FIG. 6 illustrates one embodiment of a method of evaluating the reasonableness of fees of an Advisors to a retirement plan.

Referring to FIGS. 4 to 6, there is shown various embodiments for evaluating the reasonableness of the fees paid to various Service Providers of a Plan, including for example, Investment Managers, Recordkeepers, TPAs, and Advisors. In one embodiment, a method for evaluating the reasonableness of fees paid to an Investment Manager in connection with a Plan includes:

i. Building a Benchmark Group of Plans for the subject Plan for Investment Managers including the steps of:
   a) Determining what factors, for example, Economic Factors, that may be a determinant of the fee reasonableness for that service provider;
   b) Dynamically selecting specific endpoints of those Economic Factors that place the Plan near the middle of a subset group of Plans taken from the universe of Plans in database 90 to achieve a reasonably meaningful correlation coefficient;
   c) Tailoring the subset group of Plans by choosing similar Plan types as specified by the Internal Revenue Code and/or by eliminating Plan deemed to be outliers in that such Plans may distort the correlation coefficient. An example of a Plan that may distort the correlation coefficient is a Plan with a large amount of company stock. The end result is a Benchmark Group of Plans for that service provider;

ii. Examining the Plan Driven Fees for the subject Plan for Investment Managers including the steps of:
   a) Calculating the Plan Weighted Investment Expense by multiplying, for each Fund in the Plan, the percentage of assets in each Fund by the Total Expense Ratio for the Fund, then summing the total for each Fund to obtain the Plan Weighted Investment Expense;
  b) Calculating the Average Weighted Investment Expense by multiplying, for each Fund in the Plan, the percentage of assets in each Fund by the $50^{th}$ percentile observation for each Fund, then summing the total for each to obtain the Average Weighted Investment Expense, which in some embodiments may be known as a FeePoint for the Investment Managers of the Plan;
  c) Comparing the total Plan Weighted Investment Expense to the total Average Weighted Investment Expense of the Benchmark Group of Plans;
  d) Comparing the Fees paid to the Investment Manager for each Fund by examining the Investment Expense for each Fund in the Plan against the $25^{th}$, $50^{th}$ and $75^{th}$ percentile for funds that exhibit revenue sharing characteristics that are the same as the Fund being benchmarked;
iii. Examining the drivers of costs associated with the subject Plan for Investment Managers including the steps of:
  a) Examining the investment structure for the Plan by Asset Category and the Fund percentage for that asset category in the Benchmark Group of Plans that are Active or Passive;
  b) Summarizing the investment structure by the number of options by tier as well as by Active/Passive investment method and comparing it to the average Plan in the Benchmark Group of Plans;
  c) Examining the percentage of assets in each major asset category of the investment structure and comparing it to the average Plan in the Benchmark Group of Plans;
  d) Examining the percentage of assets by Active/Passive investment method and comparing it to each major asset category of the investment structure and comparing it to the average Plan in the Benchmark Group of Plans;
  e) Examining the characteristics of the Stable Value Option and comparing it to the Benchmark Group of Plans including:
    1. The percentage of Plans using such a Fund, the type of legal structure for such a Fund, as well as the percentages of assets invested in such Fund;
    2. The crediting rates and expense ratio for the Fund;
    3. The rate resets, credit quality, Portfolio Characteristics and Withdrawal Provisions;
  f) Examining the characteristics of the Guaranteed Rate General Account Option and comparing it to the Benchmark Group of Plans including:
    1. The percentage of Plans using such a Fund, the type of legal structure for such a Fund, as well as the percentages of assets invested in such Fund;
    2. The crediting rates and expense ratio for the Fund;
    3. The rate resets, credit quality, Portfolio Characteristics and Withdrawal Provisions;
iv. Generating report 118 for the subject Plan for User 16, including an Investment Manager, in electronic form, hard copy form, or both; and
v. Providing report 118 to User 16 or otherwise making report 118 available to User 16.

In another embodiment, a method for evaluating the reasonableness of fees paid to a Recordkeeper or a TPA in connection with a Plan includes:

i. Building a Benchmark Group of Plans for the subject Plan for Recordkeepers and/or Third Party Administrators including the steps of:
  a) Determining what factors, for example, Economic Factors, that may be a determinant of the fee reasonableness for that service provider;
  b) Dynamically selecting specific endpoints of those Economic Factors that place the Plan near the middle of a subset group of Plans taken from the universe of Plans in database 90 to achieve a reasonably meaningful correlation coefficient;
  c) Tailoring the subset group of Plans by choosing similar Plan types as specified by the Internal Revenue Code and/or by eliminating Plan deemed to be outliers in that such Plans may distort the correlation coefficient. An example of a Plan that may distort the correlation coefficient is a Plan with a large amount of company stock. The end result is a Benchmark Group of Plans for that service provider;
ii. Examining the Plan Driven Fees for the subject Plan for Recordkeepers or TPAs by using the following steps (Page 10—Step 3):
  a) Calculating the Recordkeeper Cost in basis points or in dollars per Participant from all sources of fees regardless of the payor of such fees;
  b) Determining the Recordkeeper fees for the Benchmark Group of Plans using a scatter plot of Recordkeeper fees for all Plans associated with the Benchmark Group of Plans, where a best fit regression line can be estimated of the fees per number of Participants as a function of the average Plan assets of the Benchmark Group of Plans. A numerical and/or qualitative comparison may then be made between the fees paid to the Recordkeeper of the Plan and the average amount of fees paid to the Recordkeepers of the Benchmark Group of Plans by determining whether the Recordkeeper's fees to the Plan are above or below the point on the regression line that intersects with the Plan asset amount as well as the dollar difference and percent difference between these values. In some embodiments, the point on the regression line through the scatter plot of the Benchmark Group of Plans that intersects with the Plan asset amount may be known as a FeePoint for the Recordkeepers of the Benchmark Group of Plans;
  c) Comparing the Plan Driven Fee for the subject Plan for Recordkeepers to the FeePoint of the Recordkeepers of the Benchmark Group of Plan. In one embodiment, the comparison includes a table of Fees in basis points or in dollars per Participant or both, which table may include: the Plan Driven Fee, the FeePoint for the Benchmark Group of Plans, and the $5^{th}$, $25^{th}$, $50^{th}$, $75^{th}$ and $95^{th}$ percentile fees of the Benchmark Group of Plans;
iii. Examining the Participant Driven Fees for the subject Plan for Recordkeepers or TPAs including the steps of:
  a) Examining the Participant Activity Fees for the subject Plan which may include data to allow valid comparisons such as how many Plans in the Benchmark Group of Plans have such a fee and the amount of that fee for the $25^{th}$, $50^{th}$ and $75^{th}$ percentile. It is possible the Participant Activity Fees included in this analysis could vary from year to year;
  b) Examining the Managed Account Fees and Usage for the Plan, which may include data on the percentage of Plans in the Benchmark Group of Plans offering this type of Participant Service, the name of the Provider, the utilization of the Managed Account, as well as the fee associated with the Managed Account;

c) Examining the Self Directed Account (SDA) Fees and Usage for the Plan, which may include data on the percentage of plans in the Benchmark Group of Plans offering this type of Participant Service, the name of the Provider, the utilization of the SDA, as well as the fees associated with the SDA;

iv. Examining the Cost-Drivers for the subject Plan for Recordkeepers or TPAs including the steps of:

a) Calculating a Plan Complexity Score including a plurality of Plan design provisions that have varying levels of impact on the cost of providing recordkeeping services. The Plan Complexity Score may then be compared to industry standards for an appropriate retirement plan marketplace segment or to the Benchmark Group of Plans to arrive at an amount more or less than the comparison. The provisions to be included can vary from year to year based on the changing dynamics of the marketplace.

b) Calculating a Recordkeeping Services Score including a plurality of Recordkeeping Services that have varying levels of impact on the cost of providing such services and which could include Labor Costs, Technology Costs and Other Costs. The Recordkeeping Services Score for a Plan may include whether the service is provided to the Plan, the number of times that service is provided to the Plan as well as the varying degree of difficulty of that service. The Recordkeeping Services Score may then be compared to industry standards for an appropriate retirement plan marketplace segment or to the Benchmark Group of Plans to arrive at an amount more or less than the comparison. The services to be included, the frequencies, as well as the varying degrees of difficulty for each service can vary from year to year based on the changing dynamics of the marketplace.

c) Calculating an Administration Services Score including a plurality of Administration Services that have varying levels of impact on the cost of providing such services and which could include Labor Costs, Technology Costs and Other Costs. The Administration Services Score may include whether the service is provided to the Plan, the number of times that services is provided to the Plan as well as the varying degree of difficulty for that service. The Plan Administration Services Score may then be compared to industry standards for an appropriate retirement plan marketplace segment or to the Benchmark Group of Plans to arrive at an amount more or less than the comparison. The services to be included, the frequencies as well as the varying degrees of difficulty for each service can vary from year to year based on the changing dynamics of the marketplace.

d) Calculating a Compliance and Consulting Services Score including a plurality of Compliance and Consulting Services that have varying levels of impact on the cost of providing such services and which could include Labor Costs, Technology Costs and Other Costs. The Compliance and Consulting Services Score may include whether the service is provided to the Plan, the number of times that services is provided to the Plan as well as the varying degree of difficulty for that service. The Plan Compliance and Consulting Services Score may then be compared to industry standards for an appropriate retirement plan marketplace segment or to the Benchmark Group of Plans to arrive at an amount more or less than the comparison. The services to be included, the frequencies as well as the varying degrees of difficulty for each service can vary from year to year based on the changing dynamics of the marketplace.

e) Calculating a Communications and Education Services Score including a plurality of Communications and Education Services that have varying levels of impact on the cost of providing such services and which could include Labor Costs, Technology Costs and Other Costs. The Communications and Education Services Score may include whether the service is provided to the Plan, the number of times that services is provided to the Plan as well as the varying degree of difficulty for that service. The Plan Communications and Education Services Score may then be compared to industry standards for an appropriate retirement plan marketplace segment or to the Benchmark Group of Plans to arrive at an amount more or less than the comparison. The services to be included, the frequencies as well as the varying degrees of difficulty for each service can vary from year to year based on the changing dynamics of the marketplace.

v. Examining the Value-Factors for the subject Plan for Recordkeepers or TPAs including the steps of:

a) Examining those Participant Success Measures that are deemed to impact a Participant's readiness to retire. The Participant Success Measures may generally be classified as those impacting Saving, Investing, Spending or Knowing behavior. A comparison may be made for the subject Plan to each of these metrics based on the NAICS code of the industry of the subject Plan stored in database 90. The metrics to be included can vary from year to year based on the changing dynamics of the marketplace;

b) Providing a list of those qualitative factors that a Fiduciary should or could consider when assessing the fee reasonableness of a Service Provider. This includes a list of items associated with the Recordkeeper Firm (see, e.g., FIG. 18, Table 18-1), a list of considerations associated with the Services/Processes of the Recordkeeper Firm (see, e.g., FIG. 18, Table 18-2), as well as a list of the resources of the Recordkeeper Firm to help execute their Services/Processes (see, e.g., FIG. 18, Table 18-3);

vi. Generating report 118 for the subject Plan for User 16, including a Recordkeeper and/or a TPA, in electronic form, hard copy form, or both; and vii. Providing report 118 to User 16 or otherwise making report 118 available to User 16.

In another embodiment, a method for evaluating the reasonableness of fees paid to an Advisor in connection with a Plan includes:

i. Building a Benchmark Group of Plans for the subject Plan for Advisors including the steps of:

a) Determining what factors, for example, Economic Factors, that may be a determinant of the fee reasonableness for that service provider;

b) Dynamically selecting specific endpoints of those Economic Factors that place the Plan near the middle of a subset group of Plans taken from the universe of Plans in database 90 to achieve a reasonably meaningful correlation coefficient;

c) Tailoring the subset group of Plans by choosing similar Plan types as specified by the Internal Revenue Code and/or by eliminating Plan deemed to be outliers in that such Plans may distort the correlation coefficient. An example of a Plan that may distort the correlation coefficient is a Plan with a large amount of company stock. The end result is a Benchmark Group of Plans for that service provider;

ii. Examining the Plan Driven Fees for the subject Plan for Advisors including the steps of:
  a) Calculating the Advisor Cost in basis points from all sources of fees regardless of the payor of such fees;
  b) Calculating the FeePoint for the Advisor for the Benchmark Group of Plans, which is based on the expected value of the regression line for the average account balance of the Benchmark Group of Plans or the median of the Benchmark Group of Plans, whichever metric provides for more reasonable comparisons;
  c) Adjusting the FeePoint for an extra fee associated with the Advisors's Fiduciary Status for the Plan;
  d) Comparing the Plan Driven Fee for the subject Plan for Advisors to the FeePoint for the Benchmark Group of Plans. In one embodiment, a table reflecting the comparison comprises Fees in basis points or in dollars and may include: the Plan Driven Fee, the FeePoint, and the $5^{th}$, $25^{th}$, $50^{th}$, $75^{th}$ and $95^{th}$ percentile fees of the Benchmark Group of Plans;

iii. Examining the Participant Driven Fees for the subject Plan for Advisors including the steps of:
  a) Examining the Managed Accounts and Fiduciary Advice provided for the Plan. This includes data on the percentage of plans in the Benchmark Group of Plans offering this type of Participant Service, the name of the Provider, the utilization of the Managed Account, as well as the fee associated with the Managed Account;

iv. Examining the Cost-Drivers for the subject Plan for Advisors including the steps of:
  a) Calculating an Investment Services Score including a plurality of Investment Services that have varying levels of impact on the cost of providing such services and may include Labor Costs, Technology Costs and Other Costs. The Investment Services Score for a Plan may include whether the service is provided to the Plan, the number of times that service is provided to the Plan as well as the varying degree of difficulty for that service. This Plan Investment Services Score may then be compared to industry standards for an appropriate retirement plan marketplace segment or to the Benchmark Group of Plans to arrive at an amount more or less than the comparison. The services to be included, the frequencies as well as the varying degrees of difficulty for each service can vary from year to year based on the changing dynamics of the marketplace.
  b) Calculating a Vendor Management Services Score including a plurality of Vendor Management Services that have varying levels of impact on the cost of providing such services and which could include Labor Costs, Technology Costs and Other Costs. The Vendor Management Services Score for a Plan may include whether the service is provided to the Plan, the number of times that service is provided to the Plan as well as the varying degree of difficulty for that service. The Vendor Management Services Score may then be compared to industry standards for an appropriate retirement plan marketplace segment to the Benchmark Group of Plans to arrive at an amount more or less than the comparison. The services to be included, the frequencies as well as the varying degrees of difficulty for each service can vary from year to year based on the changing dynamics of the marketplace.
  c) Calculating a Plan Management Services Score which uses a plurality of Plan Management Services that have varying levels of impact on the cost of providing such services and which could include Labor Costs, Technology Costs and Other Costs. The Plan Management Services Score for a Plan may include whether the service is provided to the Plan, the number of times that service is provided to the Plan as well as the varying degree of difficulty for that service. The Plan Management Services Score may then be compared to industry standards for an appropriate retirement plan marketplace segment or to the Benchmark Group of Plans to arrive at an amount more or less than the comparison. The services to be included, the frequencies as well as the varying degrees of difficulty for each service can vary from year to year based on the changing dynamics of the marketplace.
  d) Calculating a Participant Services Score including a plurality of Participant Services that have varying levels of impact on the cost of providing such services and which could include Labor Costs, Technology Costs and Other Costs. The Participant Services Score for a Plan may include whether the service is provided to the Plan, the number of times that service is provided to the Plan as well as the varying degree of difficulty for that service. This Participant Services Score may then be compared to industry standards for an appropriate retirement plan marketplace segment or to the Benchmark Group of Plans to arrive at an amount more or less than the comparison. The services to be included, the frequencies as well as the varying degrees of difficulty for each service can vary from year to year based on the changing dynamics of the marketplace.

v. Examining the Value-Factors for the subject Plan for Advisors including the steps of:
  a) Examining those Participant Success Measures that are deemed to impact a Participant's readiness to retire. The Success Measures may generally be classified as those impacting Saving, Investing, Spending or Knowing behavior. A comparison may be made for the subject Plan to each of these metrics based on the NAICS code of the industry of the subject Plan stored in database 90. The metrics to be included can vary from year to year based on the changing dynamics of the marketplace;
  b) Providing a list of those qualitative factors that a Fiduciary should or could consider when assessing the fee reasonableness of a Service Provider. This includes a list of items associated with the Advisor Firm (see, e.g., FIG. 30 at Table 30-1), a list of considerations associated with the Services/Processes of the Advisor Firm (see, e.g., FIG. 30 at Table 30-2), as well as a list of the resources of the Advisor Firm to help execute their Services/Processes (see, e.g., FIG. 30 at Table 30-3)

vi. Generating report 118 for the subject Plan for User 16, including an Advisor, in electronic form, hard copy form, or both; and vii. Providing report 118 to User 16 or otherwise making report 118 available to User 16.

Figure 7:
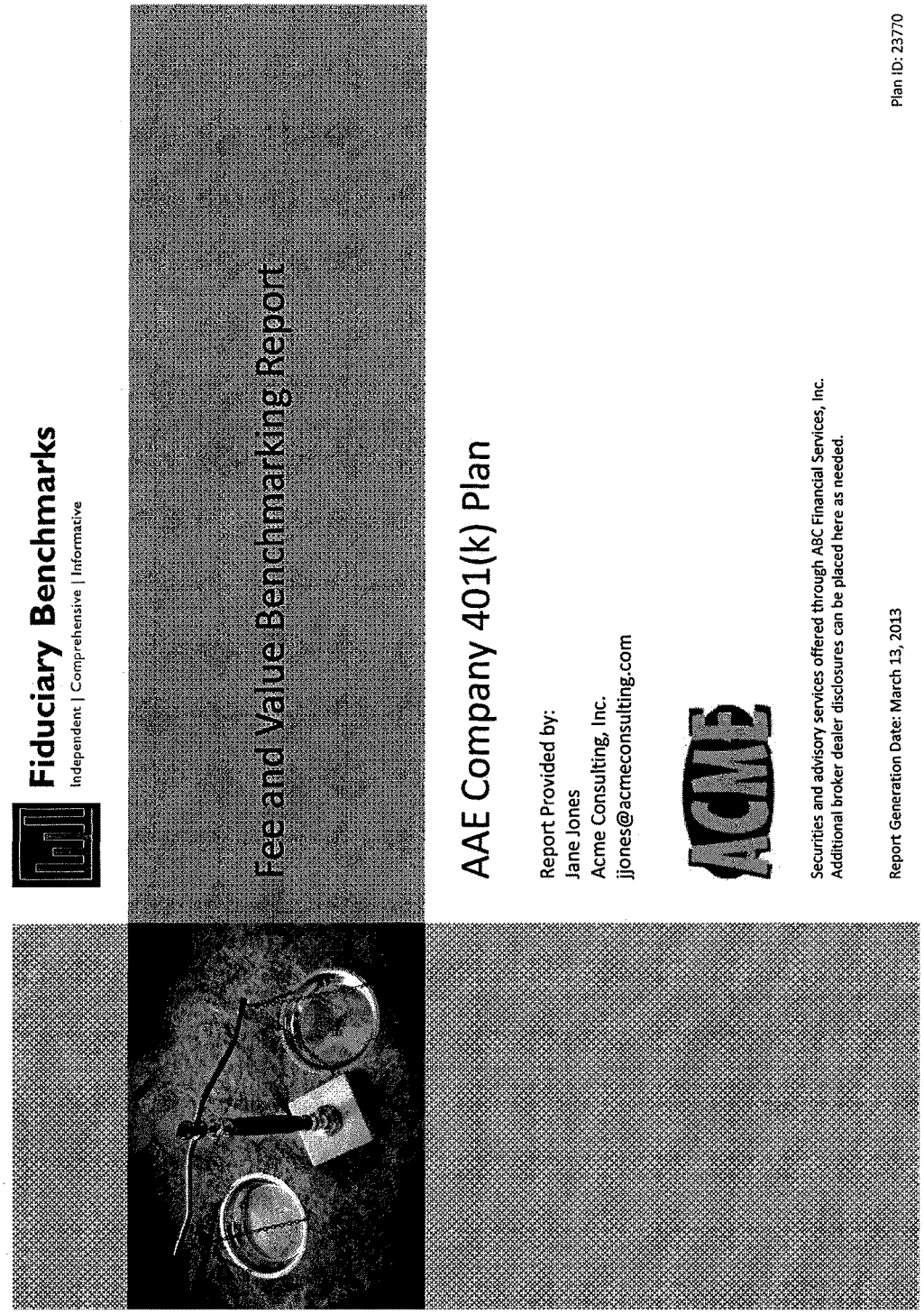
Figure 12:
Figure 37:

Referring to FIGS. 7 to 43 there is shown an embodiment of a bundled report 118 comprising analyses of a Plan's Service Providers including the Investment Managers, Recordkeepers, and Advisors. In other embodiments, report 118 may instead include only one or more chapters selected by User 16 corresponding to one or more of the Service Provider chapters as indexed, for example, on FIG. 8—Table of Contents. More particularly, in this embodiment, report 118 includes: (a) a cover page (FIG. 7); (b) a Table of Contents (FIG. 8); (c) a Reader's Guide (FIG. 9); (d) a chapter describing a comparison of the Investment Managers of a 401(k) Plan having assets of $10 million against the Benchmark Group of Plans tailored to the Investment Manager's services, which in this exemplary embodiment is 496 Plans. The Benchmark Group of Plans may exclude Plans from the universe of Plans in database 90 that may distort the Benchmark Group of Plans as it relates to Investment Managers, such as Plans having a large amount of company stock (FIGS. 10 to 15); (e) a chapter describing a comparison of the Recordkeepers of the 401(k) Plan having assets of $10 million against the Benchmark Group of Plans tailored to the Recordkeeper's services, which in this exemplary embodiment is 55 Plans (FIGS. 16 to 27); (f) a chapter describing a comparison of the Advisors/Consultants of the 401(k) Plan having assets of $10 million against the Benchmark Group of Plans tailored to the Advisor's services, which in this exemplary embodiment is 146 Plans (FIGS. 28 to 35); (g) a chapter describing how well Participants of the Plan are doing with respect to qualitative and quantitative measures for determining the readiness of the Participants toward meeting retirement objectives (FIGS. 36 to 38); (h) a Total Plan Fee Detail Summary (FIGS. 39 to 41); and (i) an Appendix (FIGS. 42 to 43).

Referring to FIGS. 10 to 15, there is shown a representative chapter in bundled report 118 reporting an evaluation of the Investment Managers who provide investment management services to the subject Plan. Referring to FIG. 10, there is illustrated: (a) an exemplary summary of the economic factors that were used for determining the Benchmark Group of Plans against which the subject 401(k) Plan is compared; (b) the relative placement of the Plan in terms of Plan assets relative to the Benchmark Group of Plans; (c) how the universe of Plans is further tailored to form the Benchmark Group of Plans, in this case based on Plan type; (d) and a summary of how diversified and meaningful the Benchmark Group of Plans is relative to the given Plan.

Taking these in turn, as shown in item 10a, the economic factors impacting the pricing for the investment manager is amount of assets, which, as shown in Table 10-1 at item 10b, is $10 million. In this exemplary embodiment, this amount sits squarely within the dynamically selected endpoints of the economic factors of the Benchmark Group of Plans, which ranges from $5 million on the low end, as shown in Table 10-1 at item 10c, to a high of $50 million, as shown in Table 10-1 at item 10d, with a median of all Plans in the Benchmark Group of Plans, shown at item 10e, totaling $11,100,500.

In this embodiment, the Benchmark Group of Plans totals 496 Plans from the universe of Plans stored in database 90 and includes 481 401(k) plans, as shown in Table 10-2 at item 10g, 9 403(b) plans, as shown in Table 10-2 at item 10h, and 6 plans characterized as Other, as shown in Table 10-2 at item 10i, as compared to the subject 401(k) Plan shown in Table 10-2 at item 10j. Table 10-3 of FIG. 10 illustrates a pie chart showing that the 496 Plans in the Benchmark Group of Plans are spread across 5 different business models: (a) 35% insurance companies (item 10k); (b) 23% mutual funds (item 10l); (c) 22% banks (item 10m); (d) 14% TPA's (item 10n); (e) and 6% Other (item 10o). Table 10-4 of FIG. 10 shows a bar chart that indicates for this sample investment service provider that the Benchmark Group of Plans contains 39 Recordkeepers spread across the 5 business models as follows: (a) 14 TPA's (item 10q); (b) 10 insurance companies (item 10r); (c) 6 mutual funds (item 10s); (d) 3 Others (item 10t); and (e) 6 Banks (item 10u). Table 10-5 indicates that the resulting Benchmark Group of Plans includes at least 25 Plans from at least 10 different Recordkeepers to represent a logical composition of the business models used for that benchmark group.

Referring to FIG. 11, there is shown a summary of the analyses of the Plan Driven Fees for Investment Manager servicing the Plan (for Service Providers that are Investment Managers, there are no Participant Driven Fees). For example, Table 11-1 shows the Weighted Investment Expense of the Plan (0.83—item 11d) as compared to the Average Weighted Investment Expense of the Benchmark Group of Plans (0.82—item 11e). In this embodiment, the Weighted Investment Expense of the Plan is computed by multiplying, for each Fund in the Plan, the percentage of assets in each Fund by the Total Expense Ratio for the Fund, then summing the total for each Fund to obtain the Plan Weighted Investment Expense. As shown in Table 11-4 at item 11a, a sample calculation of the RGA Total Return Bond Inv. Fund reveals 11.0% (item 11b) multiplied by 0.82% (item 11c). This process is repeated for each Fund and the sum is totaled to obtain the Plan Weighted Investment Expense, shown at Table 11-1, item 11d. The Average Weighted Investment Expense for the Benchmark Group of Plans is computed by multiplying, for each Fund in the Plan, the percentage of assets in each Fund by the $50^{th}$ percentile observation for each Fund, then summing the total for each to obtain the Average Weighted Investment Expense, which in some embodiments may be known as a FeePoint for the Investment Managers of the Plan. As shown in Table 11-4 at item 11a, a sample calculation of the RGA Total Return Bond Inv. Fund reveals 11.0% (item 11b) multiplied by 0.75% (item 11f). This process is repeated for each Fund and the sum is totaled to obtain the Average Weighted Investment Expense, shown at Table 11-1, item 11e.

Table 11-2 shows how the fees paid to the Investment Manager for each Fund compare to the $25^{th}$, $50^{th}$ and $75^{th}$ percentile for Funds that exhibit revenue sharing characteristics that are the same or similar to the Fund being benchmarked. For example, on FIG. 41 at Table 41-1, the Smithland Real Estate Securities D Fund (item 41a) illustrates that it pays zero revenue to the Recordkeeper (item 41b) for this Plan. Thus, the $25^{th}$, $50^{th}$ and $75^{th}$ percentiles shown in FIG. 11, Table 11-2 may include only funds that have similar revenue sharing characteristics. Table 11-2 shows the relative percentiles categorized for each Fund. The relative percentiles are categorized for the assets of those Funds as shown in the bar chart of Table 11-3.

Referring to FIG. 13, there is shown a summary of the analyses of the cost drivers for the Investment Manager servicing the Plan. Table 13-1 reports the investment structure for the Plan by Asset Category and the Fund percentage for that asset category in the Benchmark Group of Plans that are Active or Passive. Table 13-2 summarizes the investment structure by the number of options by tier as well as by Active/Passive investment method and comparing it to the average Plan in the Benchmark Group of Plans. Table 13-3 reports the percentage of assets in each major asset category of the investment structure and comparing it to the average Plan in the Benchmark Group of Plans. Table 13-4 reports the percentage of assets by Active/Passive investment method and comparing it to each major asset category of the investment structure and also comparing it to the average Plan in the Benchmark Group of Plans.

Referring to FIG. 14, there is shown an examination of the characteristics of the Stable Value Option investment. Table 14-1 reports the percentage of Plans using such a Fund, the type of legal structure for such a Fund, as well as the percentages of assets invested in such Fund, as compared to the Benchmark Group of Plans. Table 14-2 reports the crediting rates and expense ratio for the Fund as compared to the Benchmark Group of Plans. Table 14-3 reports the rate resets, credit quality, Portfolio Characteristics and Withdrawal Provisions as compared to the Benchmark Group of Plans.

Referring to FIG. 15, there is shown an examination of the Guaranteed Rate General Account Option of the Plan and how it compares it to the Benchmark Group of Plans. Table 15-1 reports the percentage of Plans using such a Fund, the type of legal structure for such a Fund, as well as the percentages of assets invested in such Fund, as compared to the Benchmark Group of Plans. Table 15-2 reports the crediting rates and expense ratio for the Fund as compared to the Benchmark Group of Plans. Table 15-3 reports the rate resets, credit quality, Portfolio Characteristics and Withdrawal Provisions as compared to the Benchmark Group of Plans.

Referring to FIGS. 16 to 27, there is shown a representative chapter in bundled report 118 reporting an evaluation of the Recordkeepers who provide services to the subject Plan. Turning to FIG. 16, there is shown a summary of how the Benchmark Group of Plans for the Recordkeeper of the subject Plan was determined, which may be different than the Benchmark Group of Plans that were used to evaluate the investment manager described above. For example, to determine an appropriate Benchmark Group of Plans for Recordkeepers of the Plan, item 16*a* shows that Plan assets, number of participants, and average account balance are the primary Economic Factors that apply to Recordkeepers. Table 16-1 reports the Plan has assets of $10 million, 144 participants, and an average account balance of 76,367 as shown in Column 16*b*. This compares to the median of the Benchmark Group of Plans shown in Column 16*c*, which is $9,922,888 in assets, 138 participants, and average account balance of $70,438. To achieve a reasonably meaningful correlation coefficient, Table 16-1 reports that the Benchmark Group of Plans includes Plan assets ranging from approximately $9 million to approximately $11 million. To tailor the Benchmark Group by choosing similar Plan types as specified by the Internal Revenue Code and/or by eliminating plan outliers that may distort the correlation coefficient, Table 16-2 reports that the sample Recordkeeper service provider in the Benchmark Group of Plans includes 54 401(k) Plans and 1 403(b) Plan, which resulted in a total of 55 plans in the Benchmark Group of Plans as shown at item 16*d* of Table 16-3. As reported in Table 16-5, the Benchmark Group of Plans includes at least 25 Plans from at least 10 different Recordkeepers to represent a logical composition of the business models used for that benchmark group. Table 16-3 shows a pie chart that indicates the Benchmark Group of Plans includes 55 plans spread across 5 business models: (a) 67% mutual funds (item 16*e*); (b) 13% insurance companies (item 16*f*); (c) 13% banks (item 16*g*); (d) 4% TPA's (item 16*h*); (e) and 3% Other (item 16*i*). Table 16-4 of FIG. 16 shows a bar chart that indicates for this sample Recordkeeper service provider that the Benchmark Group of Plans contains 33 Recordkeepers spread across the 5 business models as follows: (a) 6 mutual funds (item 16*j*); (b) 12 insurance companies (item 16*k*); (c) 5 banks (item 16*l*); (d) 8 TPA's (item 16*m*); and (e) 2 Other (item 16*n*).

Turning to FIG. 17 there is shown a summary of the Plan Driven Fees for the subject Plan for Recordkeepers and/or TPA's as compared to the Benchmark Group of Plans. More specifically, Table 17-1 shows the Plan's Recordkeeper fees is $196 per Participant (item 17*a*), which is 14% less than the $227 per Participant paid to Recordkeepers in the Benchmark Group of Plans (item 17*b*). The source for these numbers is better illustrated in FIG. 19, Table 19-3, which reports the Fee Detail for the Total Recordkeeper Fee of $28,220 (item 19*a*). This amount also is reported as including $32,220 of Investment Fees (item 19*b*). Both of these amounts are further detailed in FIGS. 20 to 21 at Columns 20*a*/21*a* of Tables 20-1/21-1. Because the subject Plan's assets are known to be $10 million (see FIG. 16, Column 16*b*), dividing $28,220 by $10 million equates to a Recordkeeper fee of 0.282% of the Plan assets, and dividing $28,220 by 144 (the number of Plan Participants in this example—see FIG. 16, Column 16*b*) equates to a Recordkeeper fee of $196 per Plan Participant.

To see how this compares to the Benchmark Group of Plans, Table 19-1 shows a scatter plot of the Recordkeeper fees for the Benchmark Group of Plans through which a regression line is passed. At an average balance of the subject Plan of $76,367 (see also Column 16*b* of Table 16-1), the Plan's Recordkeeper fees of $196 per Participant (item 19*d*) is 14% below the $227 per Plan Participant for the Benchmark Group of Plans (item 19*e*) at the same average balance of $76,367. In one embodiment, the $227 amount may be called a FeePoint, which is not adjusted for any cost drivers or value factors for the Plan Sponsors and Participants. This means that higher cost drivers and higher value factors may be worth a higher fee paid to the Recordkeeper of the plan.

Table 19-2 reports a summary of the Plan Driven Fee for the subject Plan for Recordkeepers to the FeePoint including a table of Fees in basis points or in dollars per Participant. For example, Table 19-2 includes the Plan Driven Fee expressed in basis points of 0.282% in this example (item 19*d*), the 0.327% FeePoint of the Benchmark Group of Plans (item 19*e*) as well as the $5^{th}$, $25^{th}$, $50^{th}$, $75^{th}$, and $95^{th}$ percentile fees of the Benchmark Group of Plans. Table 19-4 shows an additional comparison between the Plan's fees and the FeePoint of the Benchmark Group of Plans overlaid on a percentile range to allow a Fiduciary to quickly ascertain the relative dispersion of fees from the $5^{th}$ percentile to the $95^{th}$ percentile as well as where the Plan fees and the fees for the Benchmark Group of Plans lie relative thereto.

Referring to FIG. 22, there is shown a summary of the Participant Driven Fees for the subject Plan for Recordkeepers and/or TPA's as compared to the Benchmark Group of Plans. Table 22-1 reports the Participant Activity Fees for the subject Plan as compared to the Benchmark Group of Plans, and may include data to allow valid comparisons such as how many Plans in the Benchmark Group of Plans have such a fee and the amount of that fee for the $25^{th}$, $50^{th}$ and $75^{th}$ percentile. Table 22-2 reports the Managed Account Fees and Usage of the Plan as compared to the Benchmark Group of Plans, and may include data on the percentage of Plans in the Benchmark Group of Plans offering this type of Participant Service, the name of the Provider, the utilization of the Managed Account, as well as the fee associated with the Managed Account. Table 22-3 reports the Self Directed Accounts (SDA) Fees and Usage as compared to the Benchmark Group of Plans, and may include data on the percentage of plans in the Benchmark Group of Plans offering this type of Participant Service, the name of the Provider, the utilization of the SDA, as well as the fees associated with the SDA.

Referring again to FIG. 17, Table 17-2 reports the drivers or factors impacting Recordkeeper costs, such as Plan Complexity, Recordkeeping Services, Administration Services, and Compliance and Consulting Services, all of which are illustrated in more detail in FIGS. 23 to 26. For example, in Table 17-2, the complexity of the Plan is characterized as being 31% more complex than the Benchmark Group of Plans (item 17c). The Recordkeeping Services paid to the Plan are 168% greater than those paid to the Recordkeeper in the Benchmark Group of Plans (item 17d). The Administration Services paid to the Recordkeeper is 33% greater than the Administration Services paid to the Recordkeeper in the Benchmark Group of Plans (item 17e), and the Compliance And Consulting Services is 43% greater than the amounts paid to the Recordkeeper in the Benchmark Group of Plans (item 17f). Any or all of these higher amounts for the Plan may justify paying a higher amount to the Recordkeeper in this Plan because the Plan is clearly getting more services than those provided to the Benchmark Group of Plan.

Figure 23:
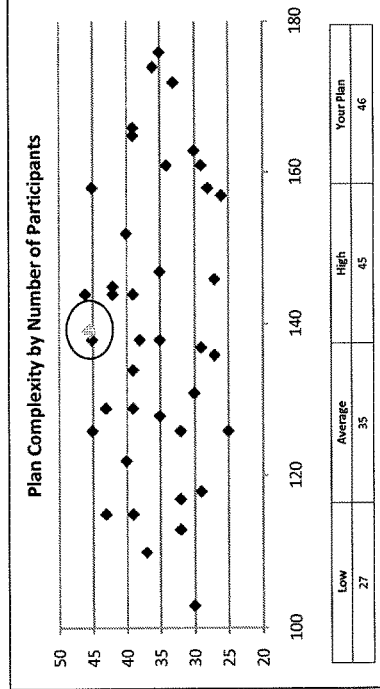

All of these cost drivers can be described by a numerical score. For example, the subject Plan is shown as having a Plan Complexity Score of 46 (item 17g), which includes a plurality of Plan Design provisions that have varying levels of impact on the cost of providing recordkeeping services. As shown in FIG. 23, Table 23-1, Column 23a, for example, the Plan Complexity Score may be determined by analyzing each of the various Plan provisions, assigning a Maximum Cost Impact Factor to each such provision (Column 23b) of the Plan to express a level of difficulty that each Plan provision adds to a Plan's design, and summing the total to obtain the Plan Complexity Score. The same may be performed for the provisions in the Benchmark Group of Plans (FIG. 17, item 17h). The bar chart format of Table 17-2 allows a side-by-side graphical and numerical expression of the Plan Complexity Score for the Plan and for the Benchmark Group of Plans.

Table 17-2 at item 17i reports the Recordkeeping Services Score, which includes a plurality of recordkeeping services that have varying levels of impact on the cost of providing such services, and which may include Labor Costs, Technology Costs, and Other Costs. As shown in FIG. 24, the Recordkeeping Services Score for a Plan (item 24a) may include whether the service is provided to the Plan, the number of times that service is provided to the Plan (Column 24b), and the varying degree of difficulty assigned to that service (Column 24c). The Recordkeeping Services Score (item 24a) is obtained by summing the score for each service and dividing by the number of Participants in the Plan. The bar chart of Table 17-2 shows the Recordkeeping Services Score of the Plan is 102 in this example (item 17l) as compared to the Recordkeeping Services Score of 38 for the Benchmark Group of Plans (item 17m).

Figure 25:

Table 17-2 at item 17k reports the Administration Services Score, which includes a plurality of Administration Services that have varying levels of impact on the cost of providing such services, and which could include Labor Costs, Technology Costs, and Other Costs. As shown in FIG. 25, the Administration Services Score for a Plan (item 25a) may include whether the services provided to the Plan, the number of times that service is provided to the Plan (Column 25b), as well as the varying degree of difficulty for that service (Column 25c). The Administration Services Score (item 25a) is obtained by summing the score for each service and dividing by the number of Participants in the Plan. The bar chart of Table 17-2 shows the Administration Services Score of the Plan is 50 in this example (item 17n) as compared to the Administration Services Score of 37 for the Benchmark Group of Plans (item 17o).

Table 17-2 at item 17k reports the Compliance and Consulting Services Score, which includes a plurality of Compliance and Consulting Services that have varying levels of impact on the cost of providing such services which could include Labor Costs, Technology Costs and Other Costs. As shown in FIG. 26, the Compliance and Consulting Services Score for a Plan (item 26a) may include whether the services provided to the Plan, the number of times that service is provided to the Plan (Column 26b), and the varying degree of difficulty for that service (Column 26c). The Compliance and Consulting Services Score (item 26a) is obtained by summing the score for each service and dividing by the number of participants in the plan. The bar chart of Table 17-2 shows the Compliance and Consulting Services Score of the Plan is 142 in this example (item 17p) as compared to the Compliance and Consulting Services Score of 99 for the Benchmark Group of Plans (item 17q).

Although not summarized in Table 17-2, FIG. 27 reports a representative Communications and Education Services Score, which includes a plurality of Communication and Education Services that have varying levels of impact on the cost of providing such services, and which may include Labor Costs, Technology Costs and Other Costs. As shown in FIG. 27, the Communications and Education Services Score for a Plan (item 27a) may include whether the services provided to the Plan, the number of times that service is provided to the Plan (Column 27b), and the varying degree of difficulty for that service (Column 27c). The Compliance and Consulting Services Score (item 27a) is obtained by summing the score for each service and dividing by the number of participants in the plan. Each of these cost drivers (Plan Complexity, Recordkeeping Services, Administration Services, Compliance and Consulting Services, and Communications and Education Services) may be compared to the Benchmark Group of Plans.

Referring again to FIG. 17, Table 17-3 reports the value factors for the subject Plan for Recordkeepers and/or TPA's, which includes examining those Participants Success Measures that are deemed to impact a Participants readiness to retire. The Participants Success Measures may generally be classified as those impacting Saving, Investing, Spending, or Knowing behavior. A comparison may be made for the subject plan to each of these metrics based on the NAICS Code of the Industry of the subject Plan stored in database 90. The value factors for the subject Plan for Recordkeepers and/or TPA's may include a list of those qualitative factors that a Fiduciary should or could consider when assessing the fee reasonableness of a Service Provider. This includes a list of items associated with the Recordkeeper Firm (see, e.g., FIG. 18 Table 18-1), a list of considerations associated with the services/processes of the Recordkeeper Firm (see, e.g., FIG. 18 Table 18-2), as well as a list of the resources of the Recordkeeper Firm to help execute their services/processes (see, e.g., FIG. 18 Table 18-3).

Figure 28:
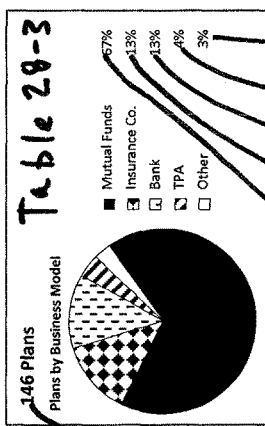
Figure 29:
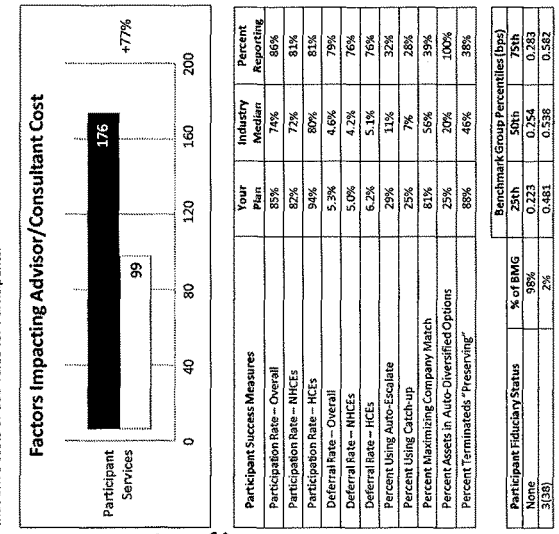
Figure 31:
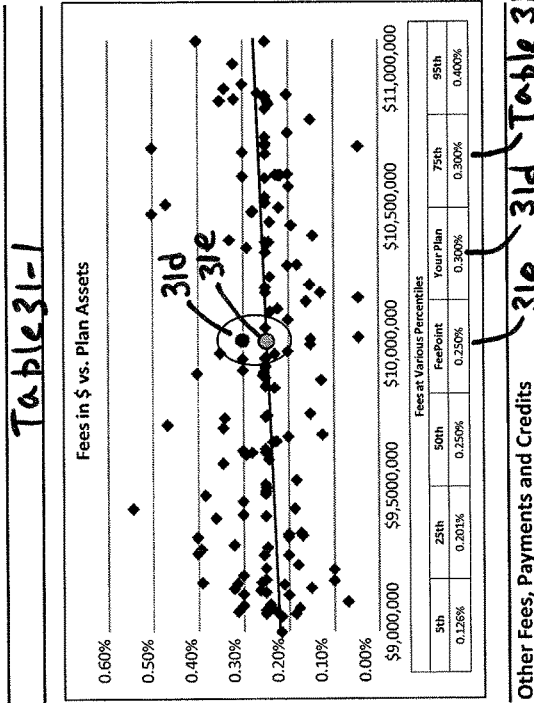

Referring to FIGS. 28 to 35, there is shown a representative chapter and bundled report 118 reporting an evaluation of the Advisors who provide services to the subject Plan. Turning to FIG. 28, there is shown a summary of how the Benchmark Group of Plans for the Advisors of the subject Plan was determined, which may be different than the Benchmark Group of Plans that were used to evaluate any of the Service Providers described above. For example, to determine an appropriate Benchmark Group of Plans for Advisors of the Plan, item 28*a* shows that Plan assets was the primary economic factor for building this Benchmark Group of Plans. Referring to FIG. 28, there is illustrated: (a) an exemplary summary of the factors that were used for determining the Benchmark Group of Plans against which the subject 401(a) Plan is compared; (b) the relative placement of the Plan in terms of Plan assets relative to the Benchmark Group of Plans; (c) how the Universe of Plans is further tailored to form the Benchmark Group of Plans, in this case based on Plan type; (d) and a summary of how diversified and meaningful the Benchmark Group of Plans is relative to the given Plan.

Taking these in turn, as shown in item 28*a*, the economic factors impacting the pricing for the investment manager is amount of assets, which, as shown in Table 28-1 at item 28*b*, is $10 million. In this exemplary embodiment, this amount sits squarely within the dynamically selected endpoints of the economic factors of the Benchmark Group of Plans, which ranges from approximately $10 million on the low end, as shown in Table 28-1 at item 28*c*, to a high of approximately $108 million, as shown in Table 28-1 at item 28*d*, with a median of all Plans in the Benchmark Group of Plans, shown at item 28*e*, totaling $9,875,778.

In this embodiment, the Benchmark Group of Plans totals 146 Plans from the universe of Plans stored in database 90 and includes 138 401(k) plans, as shown in Table 28-2 at item 28*g*, 6 403(b) plans, as shown in Table 28-2 at item 28*h*, and 2 plans characterized as Other, as shown in Table 28-2 at item 28*i*, as compared to the subject 401(k) Plan shown in Table 28-2 at item 28*j*. Table 28-3 of FIG. 28 illustrates a pie chart showing that the 146 Plans in the Benchmark Group of Plans are spread across 5 different business models: (a) 67% mutual funds (item 28*k*); (b) 13% insurance companies (item 28*l*); (c) 13% banks (item 28*m*); (d) 4% TPA's (item 28*n*); (e) and 3% Other (item 28*o*). Table 28-4 of FIG. 28 shows a bar chart that indicates for this sample service provider that the Benchmark Group of Plans contains 39 Recordkeepers spread across the 5 business models as follows: (a) 7 mutual funds (item 28*q*); (b) 18 insurance companies (item 28*r*); (c) 6 banks (item 28*s*); (d) 12 TPA's (item 28*t*); and (e) 2 other (item 28*u*). Table 28-5 reports that the resulting Benchmark Group of Plans includes at least 25 Plans from at least 10 different Recordkeepers to represent a logical composition of the business models used for that benchmark group Turning to FIG. 29 there is shown a summary of the Plan Driven Fees for the subject Plan for Advisors as compared to the Benchmark Group of Plans. More specifically, Table 29-1 shows the Plan's total Advisor's fees is 0.300% (item 29*a*), which is 9% more than the 0.250% paid to Advisors in the Benchmark Group of Plans (item 29*b*). The source for these numbers is better illustrated in FIG. 31, Table 31-3, which shows the Plan's fees at item 31*a* to be $30,000. Because this Plan's assets are known to be $10 million, dividing $30,000 by $10 million equates to an Advisor fee of 0.300% of the Plan assets. As shown in Table 29-1, the FeePoint may also be adjusted for an extra fee (see, item 29*c*) associated with the Advisor's fiduciary status (see, Table 29-2) for the Plan.

To see how this compares to the Benchmark Group of Plans, Table 31-1 shows a scatter plot of the Advisor fees for each of the Plans that make up the Benchmark Group of Plans through which a regression line is passed. At the Plan assets of the subject Plan of $10 million (see also item 28*b* of Table 28-1), the Plan's Advisor fees of 0.300% (item 31*d*) is 9% higher than the 0.024% for the Benchmark Group of Plans (item 31*e*). In one embodiment, the 0.250% amount may be called a FeePoint, which is not adjusted for any cost drivers or value factors for the Plan Sponsors and Participants. This means that higher cost drivers and higher value factors may be worth a higher fee paid to the Recordkeeper of the plan.

Table 31-2 reports a summary of the Plan Driven Fee for the subject Plan for Advisors to the FeePoint including a table of Fees in basis points. For example, Table 31-2 includes the Plan Driven Fee expressed in basis points of 0.300% in this example (item 31*d*), the 0.250% FeePoint of the Benchmark Group of Plans (item 31*e*) as well as the $5^{th}$, $25^{th}$, $50^{th}$, $75^{th}$, and $95^{th}$ percentile fees of the Benchmark Group of Plans. Table 31-4 shows an additional comparison between the Plan's fees and the FeePoint of the Benchmark Group of Plans overlaid on a percentile range to allow a Fiduciary to quickly ascertain the relative dispersion of fees from the $5^{th}$ percentile to the $95^{th}$ percentile as well as where the Plan fees and the fees for the Benchmark Group of Plans lie relative thereto.

To examine the Participant Driven Fees for the subject Plan for Advisors as compared to the Benchmark Group of Plans includes examining the Managed Accounts and Fiduciary Advice provided to the Plan by the Advisor. This may include data on the percentage of Plans in the Benchmark Group of Plans offering this type of Participant Service, the name of the Provider, the utilization of the Managed Account, as well as the fee associated with the Managed Account.

Referring again to FIG. 29, Table 29-4 reports the drivers or factors impacting Advisor costs, such as Investment Services, Vendor Management Services, and Plan Management Services, all of which are illustrated in more detail in FIGS. 32 to 34. For example, in Table 29-4, the Investment Services provided to the Plan is characterized as being 118% more expensive than the Benchmark Group of Plans (item 29*d*). The Vendor Management Services paid to the Plan are 200% greater than those paid to the Advisor in the Benchmark Group of Plans (item 29*e*). The Plan Management Services paid to the Advisor is 60% greater than the Plan Management Services paid to the Advisor in the Benchmark Group of Plans (item 29*f*). Any or all of these higher amounts for the Plan may justify paying a higher amount to the Advisor in this Plan because the Plan is clearly getting more services than those provided to the Benchmark Group of Plan.

All of these cost drivers can be described by a numerical score. For example, the subject Plan is shown as having an Investment Services Score of 168 (item 29*g*), which includes a plurality of Investment Services that have varying levels of impact on the cost of providing such services, and which may include Labor Costs, Technology Costs, and Other Costs. As shown in FIG. 32, the Investment Services Score for a Plan (item 32*a*) may include whether the service is provided to the Plan, the number of times that service is provided to the Plan (Column 32*b*), and the varying degree of difficulty assigned to that service (Column 32*c*). The Investment Services Score (item 32*a*) is obtained by summing the score for each service.

Table 29-4 at item 29*h* reports the Vendor Management Services Score, which includes a plurality of Vendor Management Services that have varying levels of impact on the cost of providing such services, and which may include Labor Costs, Technology Costs, and Other Costs. As shown in FIG. 33, the Vendor Management Services Score for a Plan (item 33a) may include whether the service is provided to the Plan, the number of times that service is provided to the Plan (Column 33b), and the varying degree of difficulty assigned to that service (Column 33c). The Vendor Management Services Score (item 33a) is obtained by summing the score for each service.

Table 29-4 at item 29i reports the Plan Management Services Score, which includes a plurality of Plan Management Services that have varying levels of impact on the cost of providing such services, and which could include Labor Costs, Technology Costs, and Other Costs. As shown in FIG. 34, the Plan Management Services Score for a Plan (item 34a) may include whether the services provided to the Plan, the number of times that service is provided to the Plan (Column 34b), as well as the varying degree of difficulty for that service (Column 34c). The Plan Management Services Score (item 34a) is obtained by summing the score for each service.

Although not summarized in Table 19-4, FIG. 35 reports a representative Advisor Participant Services Score, which includes a plurality of Participant Services that have varying levels of impact on the cost of providing such services, and which may include Labor Costs, Technology Costs and Other Costs. As shown in FIG. 35, the Participant Services Score for a Plan (item 35a) may include whether the services provided to the Plan, the number of times that service is provided to the Plan (Column 35b), and the varying degree of difficulty for that service (Column 35c). The Participant Services Score (item 35a) is obtained by summing the score for each service.

For each of the Investment Services, Vendor Management Services, Plan Management Services, and Participant Services, the same analysis and computations may be performed for Advisors in the Benchmark Group of Plans and compared to the Plan. The bar chart format of Table 29-4 allows a side-by-side graphical and numerical expression of each such score for the Plan and for the Benchmark Group of Plans (items 29j, 29k, and 29l, respectively).

Referring again to FIG. 29, Table 29-3 reports the value factors for the subject Plan for Advisors, which includes examining those Participants Success Measures that are deemed to impact a Participants readiness to retire. The Participants Success Measures may generally be classified as those impacting Saving, Investing, Spending, or Knowing behavior. A comparison may be made for the subject Plan to each of these metrics based on the NAICS Code of the Industry of the subject Plan stored in database 90. The value factors for the subject Plan for Advisors may include a list of those qualitative factors that a Fiduciary should or could consider when assessing the fee reasonableness of a Service Provider. This includes a list of items associated with the Advisor Firm (see, e.g., FIG. 30 Table 30-1), a list of considerations associated with the services/processes of the Advisor Firm (see, e.g., FIG. 30 Table 30-2), as well as a list of the resources of the Advisor Firm to help execute their services/processes (see, e.g., FIG. 30 Table 30-3).

Turning to FIGS. 36 to 38 there is shown a representative chapter in bundled report 118 reporting an evaluation of Participant's readiness to retire. For example, FIG. 37 at Table 37-1 shows the results of 20 industry statistics to measure how well a Plan helps Participants prepare for retirement.

FIGS. 39 to 40 provides a Total Plan Detail summary showing, among other things, investment fees paid to each of the Service Providers of the Plan. FIG. 41 describes a Total Expense Ratio Breakdown for the Investment Manager of the Plan. FIG. 41 summarizes the breakdown of investment expense ratios which are paid from the net asset values of underlying investments in the Plan. These fees are used to pay money managers, pay expense compensation to Plan service providers, and/or are available to offset Plan related expenses. Table 41-1 shows the investment fees by fund and allocates the total investment expense ratio by recipient. In this example, the Recordkeeper received 0.322% as shown at 41a, but the TPA received 0% as shown at 41d, the Advisor received 0% as shown in 41e, and so on.

Figure 44:
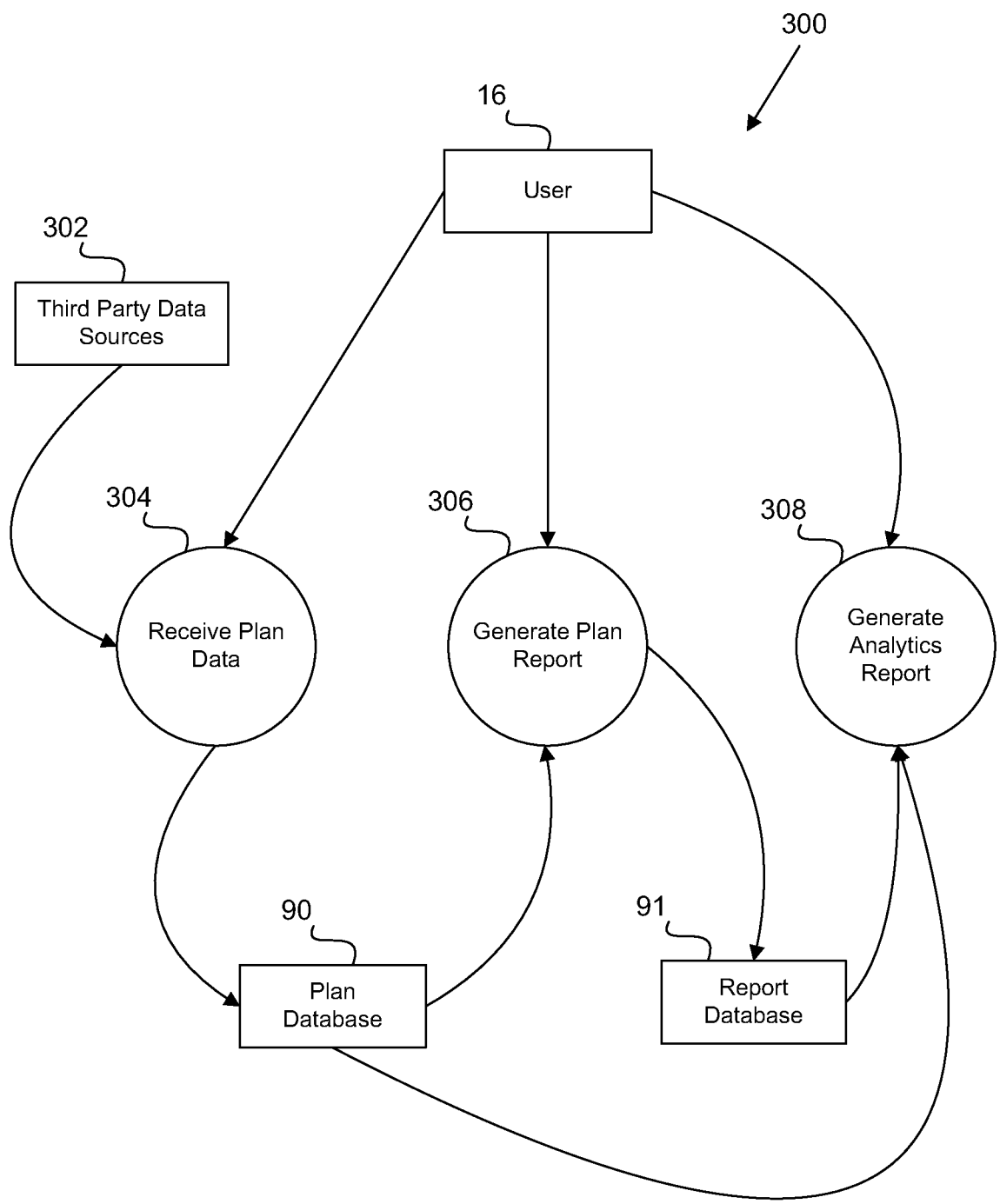
FIG. 44 illustrates an aspect of the present disclosure describing another exemplary system and method to collect data, including retirement plan data, and to generate one or more reports concerning the data.

Turning now to FIG. 44, there is shown another aspect of the present disclosure describing another exemplary system and method to collect data, including retirement plan data, and to generate one or more reports concerning the data.

In the embodiment of FIG. 44, which may include one or more aspects of system 10 described above, system 300 includes: (a) a web-based user interface portal (not shown) or other data interface configured to receive a variety of data including Plan data 25 from Third Party Data Sources 302 or User 16 at Receive Plan Data block 304 for entry into database 90, (b) a registration/login module (not shown) configured to permit authenticated login access to authorize a User 16 of system 300, (c) a database 90 configured to store and retrieve the data, such as Plan data 25 for thousands of Plans, (d) a benchmark group module (not shown) configured to determine an appropriate Benchmark Group of Plans that are similar characteristics to the Plan, (e) a report generation engine at Generate Plan Report block 306 configured to generate a selected report on demand or at predetermined intervals as may be selected by User 16, (f) Report Database 91 configured to store and/or recall any created report, and (g) analytics report generation engine at Generate Analytics block 308 configured to allow standard and customized reporting to be generated specific to the needs of the user as well as the download of information of that custom report to either Microsoft Excel or CSV formats. In other embodiments, data including Plan data may be received and stored in database 90 via any of a number of other mechanisms other than as described above.

As shown in FIG. 44, system 300 is configured to allow communication of data between User 16 and Receive Plan Data block 304, Generate Plan Report block 306, and Generate Analytics block 308. Receive Plan Data block 304 is configured to communicate data with Third Party Data Source block 302 and database 90. Database 90 is configured to communicate with Receive Plan Data block 304, Generate Plan Report block 306, and Generate Analytics block 308. Generate Plan Report block 306 is configured to communicate data with User 16, database 90, and Report Database block 91. Report Database block 91 is configured to communicate data with Generate Plan Report block 306 and Generate Analytics block 308. Generate Analytics block 308 is configured to communicate data with User 16, Report Database 91, and database 90. Directional arrows shown in FIG. 44 may include bi-directional communication of data between respective blocks or elements of system 300.

Figure 45:
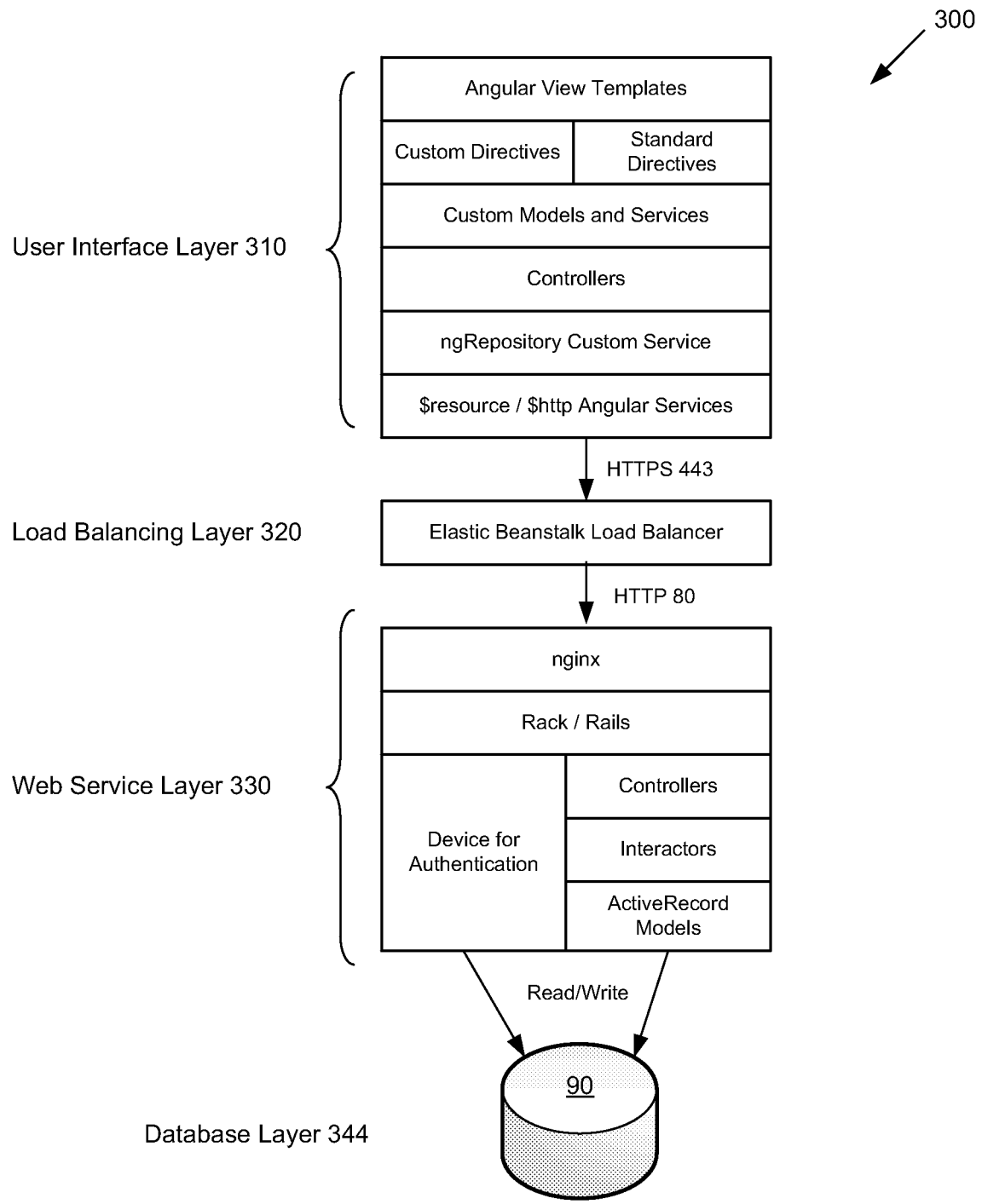
FIG. 45 illustrates another embodiment of a platform architecture of the present disclosure.

Moving to FIG. 45, there is shown an exemplary platform architecture for system 300. For example, system 300 may include: (a) a web user interface layer 310, (b) a load balancing layer 320, (c) a web service layer 330, and (d) database layer 344. Web user interface layer 310 may include platform user interface pages, such as one or more web pages operable for receiving user input and interacting with system 300, and particularly, for entering Plan data 25 into database 90, and for selecting one or more pre-styled reports or for selecting one or more options for customizing a dynamically prepared, user-customizable report.

Each of web user interface layer 310, load balancing layer 320, web service layer 330 and database layer 344 may include software, one or more CPU's and memory to perform the functions of displaying HTML user interface pages in a web browser to User 16 in user interface layer 310 and dynamically interacting with User 16, acquiring Plan data 25 or other input data or input selections from User 16, temporarily storing all input data in memory, real-time automatically and dynamically adjusting or manipulating user interface pages in response to various user selections and/or data input by toggling on and off subsequent input fields and selections according to pre-programmed rules, and causing the storage of input data and user selections in database 90. Consequently, User 16 may enter Plan data 25 after logging into a registration/login module, such as the previously described web portal 20 and, using user interface pages such as user interface pages 115, and interact with the software of system 300.

Figure 46:
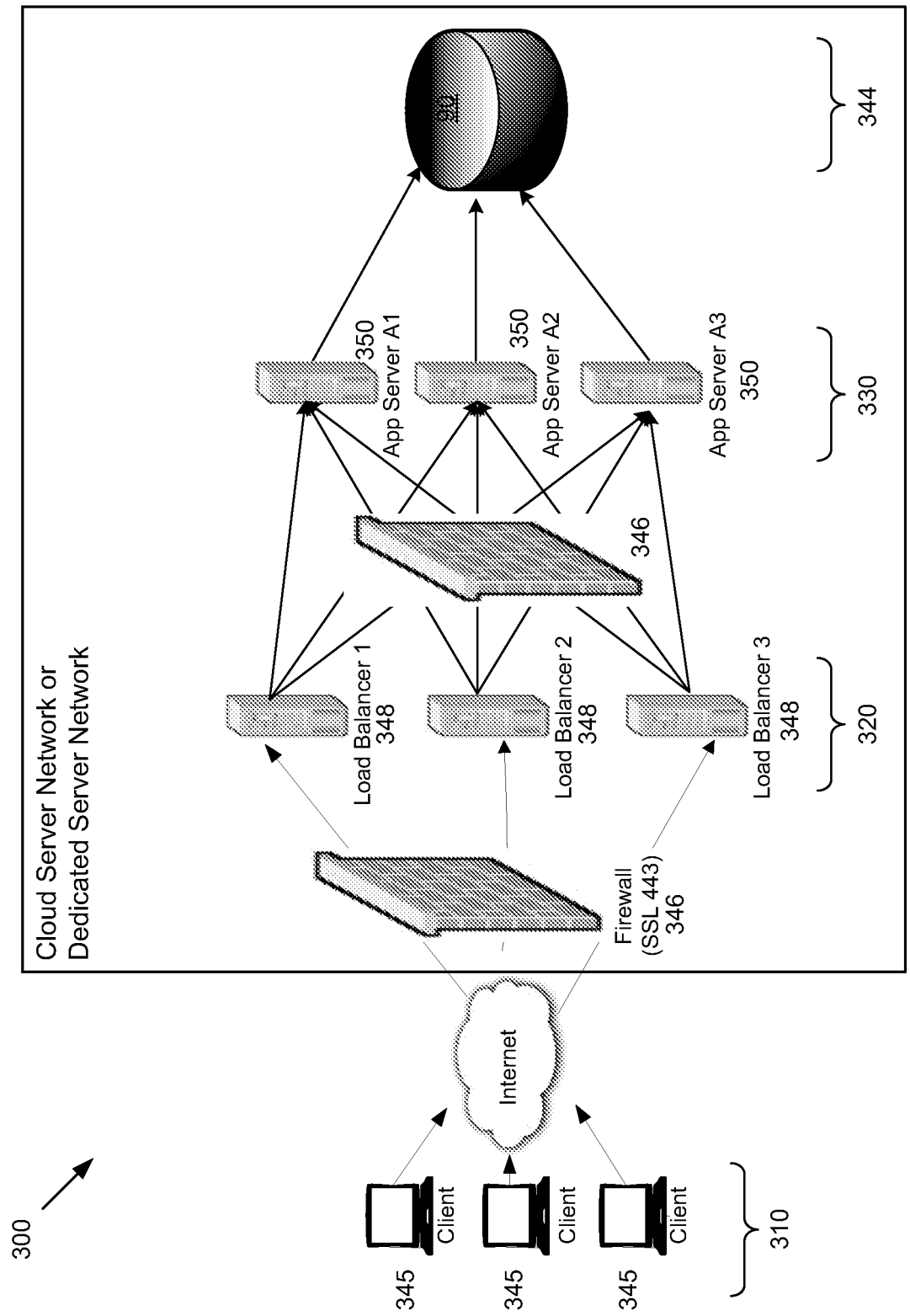
FIG. 46 illustrates another embodiment of a hardware infrastructure of the present disclosure.
Figure 49:
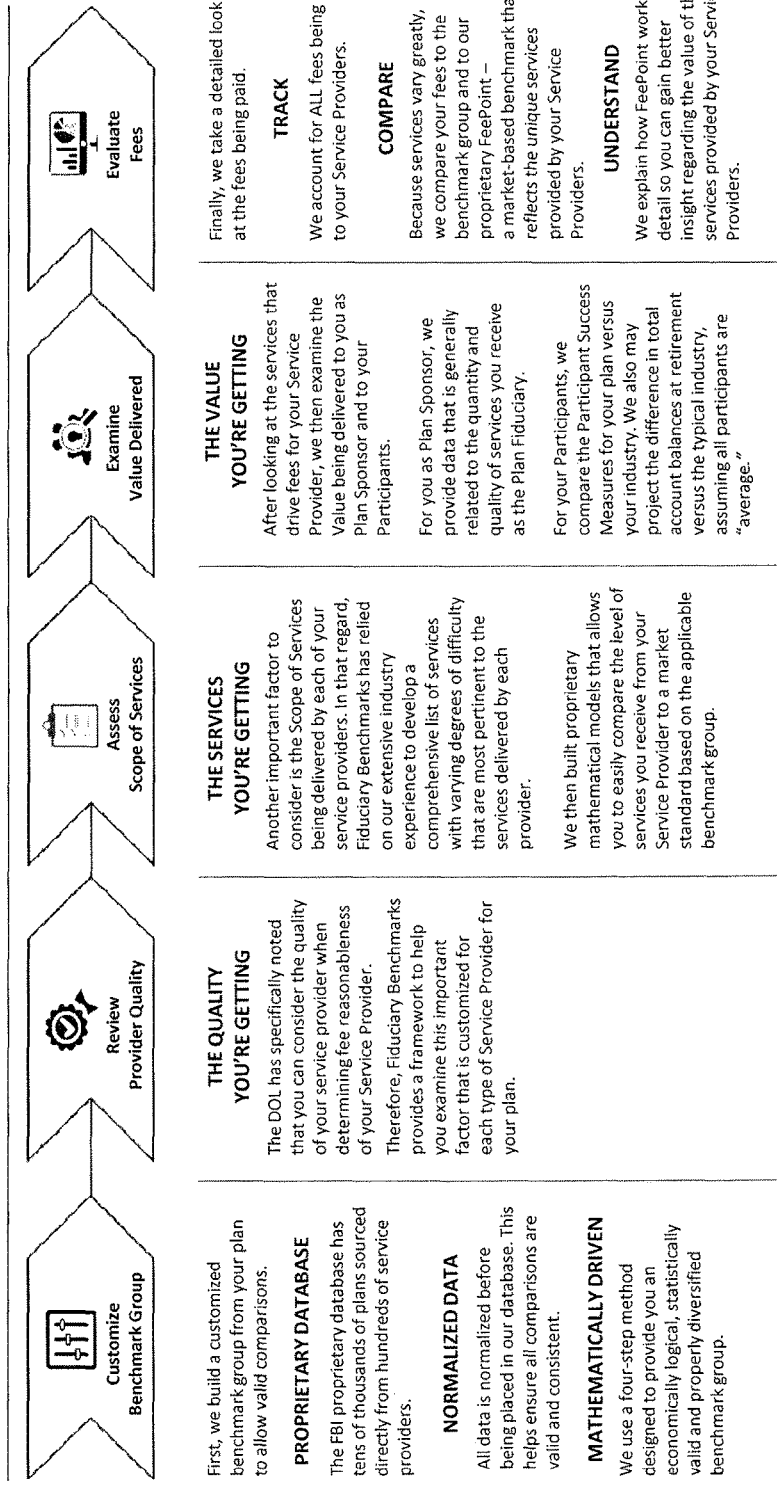
Figure 53:
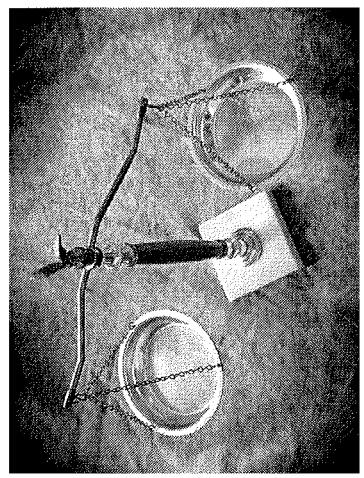
Figure 62:
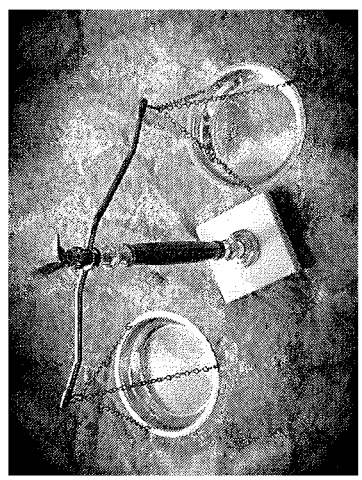
Figure 72:
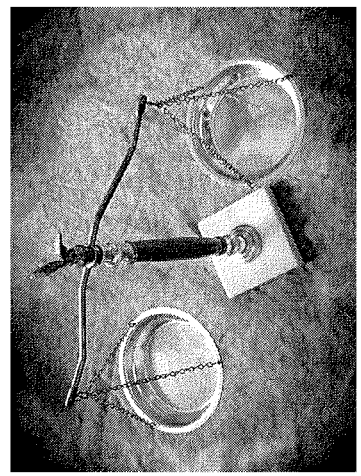
Figure 77:
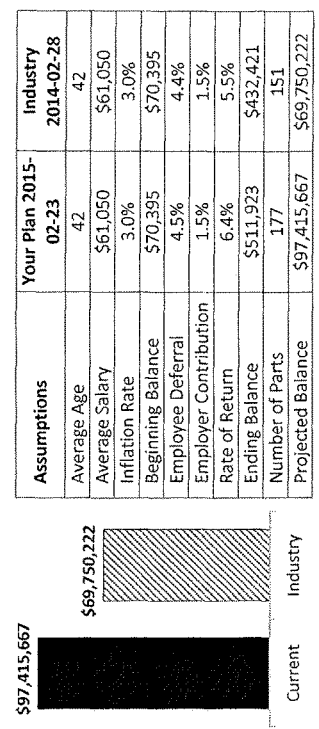
Figure 80:
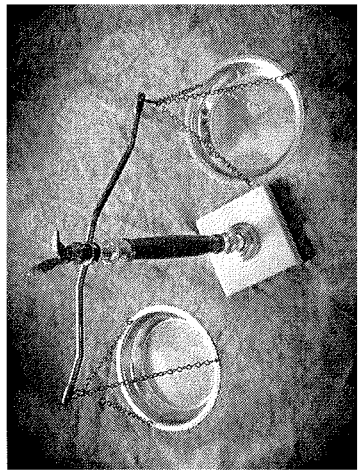

As best shown in FIG. 46, load balancing layer 320, web service layer 330, and database layer 344 including database 90 may reside behind one or more firewalls 346 on either a cloud-based server architecture or network or a dedicated server architecture or network, which may be accessible from the Internet. In one embodiment, a cloud-based server architecture or network may be implemented using Amazon web services available at http://aws.amazon.com/. Requests from user interface layer 310 by User 16 from client devices 345, which may include any standalone or mobile device, may be routed first to load balancing layer 320, which may comprise one or more load balancing cloud-based or dedicated web servers 348. Load balancing layer 320 is configured to route the user's request to web service layer 330, which may comprise one or more cloud-based or dedicated web servers 350. Load balancing layer 320 routes the user's request to an appropriate web server 350 based on availability and utilization of web servers 350, which may lie behind another firewall 346. Web server 350 is configured to communicate with database 90 to read and write data from and to database 90.

As described above, when a user selects or requests a particular report, a batch processor, such as batch processor 153, may execute software to generate the selected report using data stored in database 90. When such software completes the preparation of the selected report, system 30 may then communicate that report back to User 16 for display by the user through any one of a number of electronic means as a PDF or other electronic format via email or via real-time or near real-time display on client device 345, for example. In another embodiment, system 300 may communicate the selected report to User 16 using any other electronic or tangible means, including as an attachment to a text message or as an electronic file stored on a CD, flash drive, or any other storable media, as may be selected by User 16. In yet another embodiment, system 30 may communicate the selected report to User 16 via cellular communications, facsimile communications, radio frequency, Wi-Fi, satellite communications, and the like. User 16 may also schedule the delivery of a selected report at scheduled times or intervals as may be selected by User 16 using, for example, web portal 20.

As described above, system 300 may format the one or more reports selected for delivery to the user using various software means, including Big Faceless Java Report Generator (available at http://big.faceless.org/), which takes XML data, such as Plan data 25 stored in database 90, and converts such data into PDF format. In another embodiment, system 300 may use Microsoft Excel to create charts and tables, which may be assembled using, for example, Microsoft Publisher and output to, for example, PDF and delivered to User 16 as described above. The one or more reports may alternatively be formatted for delivery to User 16 as JPEG, TIFF, as a Microsoft Word document, as HTML web pages, or any other report format suitable for displaying comparison information between a selected Plan and a suitable Benchmark Group of Plans.

In various embodiments of system 300, a method to help a User 16, such as for example a Plan Fiduciary including a Plan Sponsor, determine if the fees and costs being paid to various Service Providers in connection with a particular Plan are reasonable in view of the value of the services provided by the Plan, may include some or all of the following steps: (1) building database 90 comprising a plurality of data including Plan data; (2) determining a customized group or subset of Plans (a "Benchmark Group of Plans") selected from a plurality of Plans described by data stored in database 90, where the Benchmark Group of Plans is customized for each category or type of Service Provider and determined using, for example, a plurality of Economic Factors that are considered most determinative of the fee reasonableness for that Service Provider. In some embodiments, this includes selecting characteristics among the universe of Plans stored in database 90 that are identical to identified characteristics of the given Plan or which correspond to a range bracketing identified characteristics of the Plan to the extent such characteristics are considered determinative of the fee reasonableness for that Service Provider; (3) examining the fees paid to the Service Provider of the Plan in comparison to the Benchmark Group of Plans; (4) examining the drivers of costs associated with the services provided by the Service Provider to the Plan; (5) examining various value factors associated with the services provided by the Service Provider to the Plan; and (6) generating a report for the User 16 comprising one or more of these comparisons.

In various embodiments of system 300, a method for evaluating a selected one of the Service Providers to a Plan may include (1) determining a Benchmark Group of Plans that is customized and relevant for comparison against the Plan and the Service Provider at issue, where the Benchmark Group of Plans is economically logical based on Economic Factors most aligned with the type of Service Provider, is statistically valid by removing outlier Plans that would skew the Benchmark Group of Plans, is diversified by the type of Service Provider being analyzed to avoid any one type of Service Provider to dominate and thereby skew the Benchmark Group of Plans, and diversified by Recordkeeper to avoid any one type of Recordkeeper to dominate and thereby skew the Benchmark Group of Plans, (2) determining the quality of the services provided by the Service Provider, (3) assessing the scope of services provided by the Service Provider and comparing those services against the services provided by the same type of Service Provider in the Benchmark Group of Plans, (4) assessing the value of services delivered to the Plan and to the Plan Participants by the Service Provider and comparing value metrics of the Service Plan against the same type of Service Provider in the Benchmark Group of Plans, and (5) assess the amount of fees paid to the Service Provider while accounting for credits to the Plan and to Plan Participants, and comparing the Service Provider's fees against the fees paid to the same type of Service Provider in the Benchmark Group of Plans as well as against a market-based benchmark that reflects the unique services provided by the Service Provider.

In one embodiment, the first step is to determine a Benchmark Group of Plans comprising a number of Plans from database 90 that are most similar to the given Plan. This task of determining a Benchmark Group of Plans from database 90, which may comprise potentially hundreds of thousands of Plans and millions of records, is challenging at least because Defined Contribution Plans come in a myriad of shapes and sizes, where no two Plans are exactly identical. However, system 300 may consider a number of characteristics that are economically logical and statistically valid with respect to a particular type of Service Provider, such as relative Plan size in terms of its assets (in dollars), Plan type such as 401(k), relative number of Plan Participants, average account balance held by each Plan Participant, how diversified the resultant Benchmark Group is relative to the type of Service Provider to avoid having one type of Service Provider, and in particular the Recordkeeper, dominate the Benchmark Group of Plans. A plurality of Benchmark Groups of Plans may be predetermined and stored in database 90 for quick recall by system 300 and to ease the number of calculations that must otherwise be performed on the fly whenever User 16 wants to evaluate the fees, costs, and value provided by one or more Service Providers of a given Plan. Such predetermined plurality of Benchmark Groups of Plans may be based on (1) the type of Service Provider (e.g., Advisor/Consultant, Recordkeeper, Investment Manager, etc.) that a user may desire to be evaluated, (2) the size of the various plan's asset's (in dollars) stored in database 90, the type of Plan at issue (such as 401(k)), (3) the number of Plan Participants, and (4) and according to rules establishing proper diversity of Service Providers. These characteristics may vary according to the type of Service Provider being evaluated.

In one embodiment, for example, to evaluate the services of an Investment Manager of a Plan, the following characteristics of plans in database 90 can be used to predetermine a Benchmark Group of Plans against which the given Plan can be compared with respect to the services provided by the Investment Manager: size of Plan assets, Plan type, diversity of Investment Managers, and diversity in Recordkeeper.

In another embodiment, to evaluate the services of a Recordkeeper or of a TPA of the same Plan, the following characteristics of plans in database 90 can be used to predetermine a different Benchmark Group of Plans than was or would be needed to evaluate the Investment Manager and which the given Plan can be compared with respect to the services provided by the Recordkeeper: size of Plan assets, number of Plan Participants, average account balance of each such Participant, Plan type, and diversity of Recordkeeper.

In another embodiment, to evaluate the services of an Advisor/Consultant of the same Plan, the following characteristics of plans in database 90 can be used to predetermine a different Benchmark Group of Plans than was or would be needed to evaluate the Investment Manager or the Recordkeeper and which the given Plan can be compared with respect to the services provided by the Advisor/Consultant: size of Plan assets, Plan type, diversity of Advisor/Consultants in the resulting benchmark group, and diversity of Recordkeepers in the resulting benchmark group.

In each of the foregoing instances, a different Benchmark Group of Plans would likely be most relevant for each type of Service Provider to evaluate the services of the different types of Service Providers.

In other embodiments of system 300, the Benchmark Group of Plans may be dynamically determined according to a category or type of services provided by the Service Provider. In one embodiment, the Service Provider includes a Recordkeeper. In another embodiment, the Service Provider includes a Third Party Administrator. In another embodiment, the Service Provider includes an Advisor. In another embodiment, the Service Provider includes an Investment Manager.

In one embodiment, a method to help a User 16 evaluate the reasonableness of an Advisor/Consultant's services in view of the Advisor's fees, costs, and value to a Plan may include the steps of:

1. receiving data corresponding to a plurality of retirement plans;
2. storing the data in at least one database, the database residing in memory on at least one web-accessible computer;
3. automatically predetermining from the data, via a processor associated with the at least one web-accessible computer
   (a) a customized plurality of comparison groups from the database of retirement plans, each comparison group defined by at least plan assets, plan type, diversity of advisors, and diversity of recordkeepers, and
   (b) one of the predetermined comparison groups of retirement plans most similar to the selected retirement plan based on at least plan assets, plan type, diversity of advisors, and diversity of recordkeepers;
4. automatically determining from the data and via the processor
   (a) a scope of services provided by the advisor to the selected retirement plan and by the advisors associated with the predetermined one of the comparison groups, the scope of services comprising a first plurality of service categories comprising at least one of investment services, vendor management services, plan management services, and participant services, each of the service categories comprising a plurality of services, wherein the scope of services is quantified by allocating a first constant sum of units across each of the services associated with each service category, applying a first weight factor to a most difficult service and a second weight factor to a least difficult service to allow a quantitative comparison of a relative effort expended to provide each of the plurality services to the selected retirement plan, and interpolating between the weighted most difficult and the weighted least difficult services, resulting in a 100% statistical confidence in the scope of services for each service category of the selected retirement plan and a 95% statistical confidence in the scope of services for each service category in the predetermined one of the comparison groups;
   (b) a first value component of services provided by the advisor to a plan sponsor of the selected retirement plan and to the advisors to the plan sponsors of the predetermined one of the comparison groups, the first value component comprising a score associated with a second plurality of service categories comprising at least one of investment services, vendor management services, and plan management services, each of the second plurality of service categories being quantified by allocating a second constant sum of units across each of the second plurality of service categories according to an assessment of whether the service is a best practice to the plan sponsor of the selected retirement plan, and comparing the quantity of the second constant sum of units of at least one of the second category of services to the quantity of the second constant sum of units of the same services associated with the predetermined one of the comparison groups of retirement plans, resulting in a 100% statistical confidence in the first value component of the selected retirement plan for each service category and a 95% statistical confidence in the first value component of the predetermined one of the comparison groups;

(c) a second value component of services provided by the advisor to the participants of the selected retirement plan and by the advisors to the participants of the predetermined one of the comparison groups based on the NAICS code of the selected retirement plan, wherein the second value component is quantified by
  (i) calculating current projected retirement balances for the selected retirement plan, projected retirement balances for an applicable NAICS industry associated with the selected retirement plan, and prior projected retirement balances for the selected retirement plan, all for an average participant in the selected retirement plan, by
    (A) approximating an average wage of a workforce according to the NAICS wage data for an industry associated with the plan,
    (B) using an average account balance of all participants in the selected retirement plan,
    (C) using an average deferral percent of all participants or an average deferral percent for the NAICS industry,
    (D) using an average employer contribution for the selected retirement plan,
    (E) using an industry rate of return adjusted for more or less assets in automatically diversified options, and
    (F) adding all of the foregoing projected balances to produce a total projected balances at retirement for all participants in the selected retirement plan;
  (ii) allowing a user to display one of three different outputs for the second value component according to
    (A) if a comparison of the total projected balances for the current selected retirement plan is greater than the projected balances for the NAICS industry plan, then displaying a bar chart reflecting the results,
    (B) if a comparison of the total projected balances for the current selected retirement plan is less than the projected balances for the NAICS industry plan, then displaying a text paragraph to encourage an improvement of an associated participant success measure,
    (C) if a comparison of the total project balances for the current selected retirement plan is less than the prior projected balances for the NAICS industry plan, then displaying a bar chart reflecting a comparison of the results;

(d) a fee component comprising an assessment of the advisor's fees associated with the selected retirement plan and of the advisors' fees associated with the predetermined one of the comparison groups, wherein the fee component comprises a base fee that is based on a power series regression analysis and market-based adjustments to the base fee reflecting unique fiduciary services, meetings or extra hours provided by the advisor to the selected retirement plan at market rates for such services, and comparing the fee component associated with the selected plan to the fee component associated with the predetermined one of the comparison groups; and 5. electronically delivering, via the processor, a PDF comprising a report to a user interface, the report comprising a visual summary and analysis of the scope of services, the first and second value components, and the fee component associated with the advisor to the selected retirement plan against the advisors to the predetermined one of the comparison groups of retirement plans.

In another embodiment, a method to help a User 16 evaluate the reasonableness of a Recordkeeper's or a Third-Party Administrator's services in view of the Recordkeeper's or Third-Party Administrator's fees, costs, and value to a Plan may include the steps of:

1. receiving data corresponding to a plurality of retirement plans;
2. storing the data in at least one database, the database residing in memory on at least one web-accessible computer;
3. automatically predetermining from the data, via a processor associated with the at least one web-accessible computer
   (a) a customized plurality of comparison groups from the database of retirement plans, each comparison group defined by at least plan assets, number of plan participants, average participant account balance, plan type, and diversity of recordkeepers or third-party administrators, and
   (b) one of the predetermined comparison groups of retirement plans most similar to the selected retirement plan based on at least plan assets, number of plan participants, average account balance of plan participants, plan type, and diversity of recordkeepers or third-party administrators;
4. automatically determining from the data and via the processor
   (a) a scope of services provided by the recordkeeper or the third-party administrator to the selected retirement plan and by the recordkeepers or the third-party administrators associated with the predetermined one of the comparison groups, the scope of services comprising a first plurality of service categories comprising at least one of recordkeeping, administration, compliance and consulting, and education and communication, each of the service categories comprising a plurality of services, wherein the scope of services is quantified by applying a weighted factor to each service provided by the recordkeeper of third-party administrator to the selected retirement plan according to a level of difficulty to provide each service, and multiplying the weighted factor to a volume component for each such service to allow a quantitative comparison of a relative effort expended to provide each such service, resulting in a 100% statistical confidence in the scope of services for each service category of the selected retirement plan and a 95% statistical confidence in the scope of services for each for each service category in the predetermined one of the comparison groups;
   (b) a value component of services provided by the recordkeeper or third-party administrator to participants of the selected retirement plan and by the recordkeeper or third-party administrators to participants of the predetermined one of the comparison groups based on the NAICS code of the selected retirement plan, wherein the value component is quantified by
  (i) calculating current projected retirement balances for the selected retirement plan, projected retirement balances for an applicable NAICS industry associated with the selected retirement plan, and prior projected retirement balances for the selected retirement plan, all for an average participant in the selected retirement plan, by
    (A) approximating an average wage of a workforce according to the NAICS wage data for an industry associated with the plan,
    (B) using the average account balance of participants in the selected retirement plan,
    (C) using an average deferral percent of all participants in the selected retirement plan or an average deferral percent for the NAICS industry,
    (D) using an average employer contribution for the selected retirement plan,
    (E) using an industry rate of return adjusted for more or less assets in automatically diversified options, and
    (F) adding all of the foregoing projected balances to produce a total projected balances at retirement for all participants in the selected retirement plan; and
  (ii) allowing a user to display one of three different outputs for the second value component according to
    (A) if a comparison of the total projected balances for the current selected retirement plan is greater than the projected balances for the NAICS industry plan, then displaying a bar chart reflecting the results,
    (B) if a comparison of the total projected balances for the current selected retirement plan is less than the projected balances for the NAICS industry plan, then displaying a text paragraph to encourage an improvement of an associated participant success measure,
    (C) if a comparison of the total project balances for the current selected retirement plan is less than the prior projected balances for the NAICS industry plan, then displaying a bar chart reflecting a comparison of the results;
  (c) a fee component comprising an assessment of the recordkeeper or third-party administrator's fees associated with the selected retirement plan and of the recordkeeper or third-party administrators' fees associated with predetermined one of the comparison groups, wherein the fee component comprises a base fee comprising a median of the fee of the predetermined comparison groups of retirement plans and market-based adjustments to the base fee reflecting unique fiduciary services, expenditures, meetings or extra hours provided by the recordkeeper or third-party administrator to the selected retirement plan at market rates for such services, and comparing the fee component associated with the selected plan to the fee component associated with the predetermined one of the comparison groups; and
5. electronically delivering, via the processor, a PDF comprising a report to a user interface, the report comprising a visual summary and analysis of the scope of services, the value component, and the fee component associated with the recordkeeper or third-party administrator to the selected retirement plan against the recordkeeper or third-party administrators to the predetermined one of the comparison groups of retirement plans.

In another embodiment, a method to help a User 16 evaluate the reasonableness of an Investment Manager's services in view of the Investment Manager's fees, costs, and value to a Plan may include the steps of:
1. receiving data corresponding to a plurality of retirement plans;
2. storing the data in at least one database, the database residing in memory on at least one web-accessible computer;
3. automatically predetermining from the data, via a processor associated with the at least one web-accessible computer
   (a) a customized plurality of comparison groups from the database of retirement plans, each comparison group defined by at least plan assets, plan type, diversity of investment managers, and diversity of recordkeepers, and
   (b) one of the predetermined comparison groups of retirement plans most similar to the selected retirement plan based on at least plan assets, plan type, diversity of investment managers, and diversity of recordkeepers;
4. automatically determining from the data and via the processor
   (a) a scope of services provided by the investment manager to the selected retirement plan and by the investment managers associated with the predetermined one of the comparison groups, the scope of services comprising a plurality of asset categories comprising at least one of an auto-diversified asset category, a core asset category, and a miscellaneous asset category, each of the plurality of asset categories comprising at least one investment option, wherein the scope of services is quantified by comparing each investment option of the selected retirement plan to the same or similar investment option in the predetermined one of the comparison groups based on a percent active and passive investing style, by comparing each asset category of the selected retirement plan to the same or similar asset category in the predetermined one of the comparison groups based on a quantity of investment options within each respective asset category, and by comparing a percent asset allocation of the selected retirement plan to the predetermined one of the comparison groups based on a plurality of asset types;
   (b) a fee component comprising an assessment of the investment manager's fees associated with the selected retirement plan and of the investment managers' fees associated with predetermined one of the comparison groups, wherein the fee component is quantified by
     (i) comparing each asset category of the selected retirement plan to the same or similar asset categories in the predetermined one of the comparison groups based on whether or not the plan uses revenue sharing and on the basis of a total expense ratio for each investment option of each asset category in which the predetermined one of the comparison groups have similar revenue sharing practices, (ii) comparing an investment manager fee associated with each asset class of investment options of the selected retirement plan to the same or similar asset classes in the predetermined one of the comparison groups, (iii) comparing fees and usage associated with any managed accounts and self-directed accounts associated with selected retirement plan to the predetermined one of the comparison groups, (iv) comparing at least one of usage, crediting rates, expense data, rate resets, credit quality, withdrawal provisions and market value adjustments associated with the selected retirement plan to the predetermined one of the comparison groups; and 5. electronically delivering, via the processor, a PDF comprising a report to a user interface, the report comprising a visual summary and analysis of the scope of services and the fee component associated with the investment manager to the selected retirement plan against the investment managers to the predetermined one of the comparison groups of retirement plans.

Turning now to FIGS. 47 to 90, there is shown an exemplary value and fee benchmarking report comprising a plurality of individual exemplary reports to evaluate each of the Service Providers of a given Plan against representative, customized Benchmark Groups of Plans tailored to the respective type of Service Provider.

FIGS. 47 to 52 illustrate an exemplary Total Plan Fee Detail, which collects and summarizes the fees paid by the Plan according to sources of fees (see, e.g., FIG. 50, item 50a) and allocation of fees (see, e.g., FIG. 50, item 50b) as well as other fees, payments, and credits (see, e.g., FIG. 50, item 50c). FIG. 50 at item 50d also shows, in graphical form, the percentage of the total Plan fees paid to each respective type of Service Provider. FIGS. 51 and 52 shows a summary of the investment fees paid to the various service providers of the Plan (see, e.g., items 51a-51d and 52a-52d) as well as the total investment expense per investment (see, e.g., 51e and 52e).

FIGS. 53 to 61 illustrate an exemplary evaluation of the fees, costs, and value of services provided by an Investment Manager of the Plan compared to a representative Benchmark Group of Plans. The first step in one embodiment of system 300 is to determine which of the predetermined one of the Benchmark Groups of Plans that is stored in database 90 is most pertinent to the evaluation of the services of the Investment Manager of a given Plan.

FIG. 54, for example, illustrates that Plan Assets, Plan Type, diversity of Investment Manager and diversity of Recordkeeper may be used as a basis to predetermine a plurality of Benchmark Groups of Plans that reside in database 90, waiting to be recalled when User 16 wants to evaluate the Investment Manager's services of a given Plan. More particularly, FIG. 54 shows that the Plan being evaluated has just over $12.4M in plan assets, as shown at item 54a, which lies between a $10.0M to $15M range of plan assets in the Benchmark Group of Plans, as shown at items 54b and 54c, respectively. Item 54d shows that the Plan is a 401(k) Plan and item 54e shows that there are 1318 401(k) plans in the Benchmark Group of Plans. Item 54f shows that 216 different investment firms are represented in the Benchmark Group of Plans representing more than 3930 different investment options (see, e.g., item 54g) in database 90. In addition, item 54h shows that 105 different Recordkeepers are represented in the Benchmark Group of Plans across 5 different business models, and item 54i shows that 1371 different plans are represented in the Benchmark Group of Plans according to percent per type of business model. Thus, the predetermined one of the Benchmark Groups of Plans to be used as a comparison to a given 401(k) Plan having approx. $12M in assets is a Benchmark Group of 401(k) Plans having between $10M and $15M in assets and which is represented by 216 different investment firms and 105 different Recordkeepers across 5 different business models.

The next step in one embodiment of system 300, as shown in the exemplary report of FIG. 55, is to evaluate the quality of the services provided by the Investment Manager to the Plan. FIG. 55 illustrates one embodiment of the factors that may be considered when evaluating the quality of an investment option inside a Plan, which may include organizational characteristics for the investment option, the actual investment decision makers for the investment option and the investment process of the investment option. FIG. 55 provides a framework for the Plan Sponsor to evaluate the quality of the investment options, which has been suggested by prior U.S. Department of Labor rulings.

The next step in one embodiment of system 300, as shown in the exemplary report of FIG. 56, is to assess the scope of services provided to the Plan by the Investment Manager. FIG. 56 shows, for example, the different categories of investment offerings provided to the Plan (see e.g., item 56a), as well as whether the Plan offers an active or passive approach to investments (see, e.g., item 56b) and how it compares to the Benchmark Group of Plans (see, e.g., item 56c). FIG. 56 also shows a quantitative summary of the different categories of investment offerings relative to the average Plan in the Benchmark Group of Plans (see, e.g., item 56d). FIG. 56 further shows a summary of the plan asset allocation, in percent, to each of a plurality of different plan asset types and as compared to the average Plan in the Benchmark Group of Plans (see, e.g., item 56e). FIG. 56 additionally shows a percentage allocation of plan investments that are active or passive as compared to the average Plan in the Benchmark Group of Plans (see, e.g., item 56f).

The next step in one embodiment of system 300, as shown in the exemplary report of FIG. 57, is to assess the value of the services provided to the Plan by the Investment Manager. This is done by not only referring to investment performance, which is one possible metric for evaluating investment options inside the Plan, but also by referring to how well the investment options comply with the Plan's investment policy statement (if one exists) as well as the use of indirect compensation to help pay for the other Service Providers for the Plan.

The next step in one embodiment of system 300, as shown in the exemplary report of FIGS. 58 to 60, is to evaluate the fees paid to the Investment Manager for the services provided to the Plan and compare those fees for those services against the average Plan in the Benchmark Group of Plans. This step may include an analysis of each investment option per more than 100 different asset classes. Each investment option is noted as to whether revenue sharing applies to the option and the benchmark group for the investment option is then predicated upon that answer. The total expense ratio for the Plan is then compared to the appropriate asset class of the benchmark group. In addition, the portion of the total expense ratio being paid to the Investment Manager is also compared to the appropriate asset class of the benchmark group. The aggregate results for each of these three measurements are shown above each item at the top of FIG. 58.

Turning to FIG. 61 there is shown a summary of the evaluation of the services provided to the Plan by the Investment Manager comprising (1) a first section (see, e.g., item 61a) summarizing the Plan's assets and other characteristics as compare to the Benchmark Group of Plans, (2) a second section (see, e.g., item 61b) summarizing the quality and scope of services provided to the Plan by the Investment Manager in both quantitative and qualitative terms, (3) a third section (see, e.g., item 61c) summarizing the Plan's investment options in terms of cost quartiles. In this way, the User 16 may easily and quickly assess the fees, costs, and value of the services provided to the Plan by the Investment Manager as compared to the average Investment Manager associated with the Benchmark Group of Plans.

Turning now to an evaluation of the Recordkeeper's services to the Plan, FIGS. 62 to 71 illustrate an exemplary evaluation of the fees, costs, and value of services provided by a Recordkeeper of the Plan compared to a representative Benchmark Group of Plans.

The first step in one embodiment of system 300 is to determine which of the predetermined one of the Benchmark Groups of Plans that is stored in database 90 is most pertinent to the evaluation of the services of the Recordkeeper of a given Plan.

FIG. 63, for example, illustrates that Plan Assets, number of Plan Participants, average account balance for each such Plan Participant, Plan Type, and diversity of Recordkeeper may be used as a basis to predetermine a plurality of Benchmark Groups of Plans that reside in database 90, waiting to be recalled when User 16 wants to evaluate the Record keeper's services of a given Plan. More particularly, as was the case for the Investment Manager analysis, FIG. 63 shows that the Plan being evaluated has just over $12.4M in plan assets, as shown at item 63a, which lies between a $10.0M to $15M range of plan assets in the Benchmark Group of Plans, as shown at items 63b and 63c, respectively. Item 63d shows that the Plan has 177 Plan Participants, which lies between 129 to 249 in the Benchmark Group of Plans, as shown at items 63e and 63f, respectively. Item 63g shows that the average account balance of Plan Participants' is approx. $70K, which lies between $50K and $90K in the Benchmark Group of Plans, as shown at items 63h and 63i, respectively. Item 63j shows that the Plan is a 401(k) Plan and item 63k shows that there are 29 401(k) plans in the Benchmark Group of Plans. Item 63l shows that 13 different Recordkeepers are represented in the Benchmark Group of Plans across 5 different business models, and item 63m shows that 30 different plans are represented in the Benchmark Group of Plans according to percent per type of business model. Thus, the predetermined one of the Benchmark Groups of Plans to be used as a comparison to a given 401(k) Plan having approx. $12M in assets is a Benchmark Group of 401(k) Plans having between $10M and $15M in assets, has between 129 and 249 Plan Participants, the Plan's average account balance per Plan Participant lies between 50K and $90K, and is represented by 13 different Recordkeepers across 5 different business models.

The next step in one embodiment of system 300, as shown in the exemplary report of FIG. 64, is to evaluate the quality of the services provided by the Recordkeeper to the Plan. FIG. 64 illustrates one embodiment of the factors that may be considered when evaluating the quality of a Recordkeeper for a Plan, which may include the recordkeeping organization, the services/processes they execute on behalf of the Plan Sponsor and their Participants as well as the people/technology/resources they have at their disposal to execute those services/processes. FIG. 64 provides a framework for the Plan Sponsor to evaluate the Recordkeeper, which has been suggested by prior U.S. Department of Labor rulings.

The next step in one embodiment of system 300, as shown in the exemplary report of FIG. 65, is to assess the scope of services provided to the Plan by the Recordkeeper. FIG. 65 shows, for example, the different categories of services provided to the Plan (see e.g., item 65a referring to, for example, recordkeeping services, administration services, compliance and consulting services, and education and communication services), as well as how those categories of services compares to the Benchmark Group of Plans (see, e.g., item 65b, referring to, for example, the side by side bars and numeric values attributed to each service category of the Plan and the Benchmark Group of Plans). FIG. 65 further shows which of the plurality of services within each service category is provided to the Plan (see, e.g., item 65c) and how such services impact the cost to the Plan relative to one another (see, e.g., item 65d).

FIG. 66 shows a more detailed analysis of the services provided to the Plan by the Recordkeeper. For example, each service within each of the service categories is quantified by multiplying a number of units associated with each service (see, e.g. numbers in column 66a) by an estimated measure of difficulty to provide each service to result in a number of points for each service (see, e.g., numbers in column 66b), wherein the relative measure of difficulty is defined by assigning a multiplier to each of the services, the multiplier representing an effort to provide each service relative to the other services, and where the scope of services results in a 95% statistical confidence in the quantified plurality of services for the Benchmark Group of Plans and a 100% statistical confidence in the quantified plurality of services for the Plan. The points computed for each service can be compared to the points associated with each such service in the Benchmark Group of Plans, as shown in column 66c of FIG. 66.

The next step in one embodiment of system 300, as shown in the exemplary report of FIG. 67, is to assess the value of the services provided to the Plan by the Recordkeeper. The value of the services provided to the Plan can be assessed as two components, a first value component delivered to the Plan Sponsor, and a second value component delivered to the Plan Participants, and both can be assessed qualitatively. For example, the first value component of services provided by the Recordkeeper to a Plan Sponsor may be associated with qualitative measures associated with a plurality of service categories comprising at least one of service quality: accuracy and timeliness, support services, and plan design assistance (see, e.g., item 67a). The second value component delivered to the Plan Participants can be associated with quantitative Participant Success Measures, including participation rate, deferral rate, percent company match, and the like (see, e.g., item 67b).

The next step in one embodiment of system 300, as shown in the exemplary report of FIGS. 68 to 70, is to evaluate the fees paid to the Recordkeeper for the services provided to the Plan and compare those fees for those services against the average Plan in the Benchmark Group of Plans. FIG. 68 provides an assessment of the source of all fees, payments, and credits associated with the Plan (see, e.g., 68a). FIG. 68 also shows the use of a predictive model comprising the median of the Benchmark Group of Plans to estimate a base fee for the Recordkeeper, and market-based adjustments to the base fee reflecting unique fiduciary services, meetings or extra hours provided by the Recordkeeper to the Plan at market rates for such services (see, e.g., 68b) resulting in a Feepoint, and comparing the adjusted fees of the Plan (i.e., the Feepoint) to the adjusted fees associated with the Benchmark Group of Plans (see, e.g., 68c).

FIGS. 69 to 70 show the Recordkeeper's fees, in percent, in relation to the Plan investments (see, e.g., 69a, 70a), and how those fees compare to various percentiles in the Benchmark Group of Plans (see, e.g., 69b, 70b). These figures help the Plan Sponsor understand the source of indirect compensation being paid to the Recordkeeper by the various investment options.

Turning to FIG. 71 there is shown a summary of the evaluation of the services provided to the Plan by the Recordkeeper comprising (1) a first section (see, e.g., item 71a) summarizing the Plan's assets and other characteristics as compare to the Benchmark Group of Plans, (2) a second section (see, e.g., item 71b) summarizing the quality, scope, and value of services provided to the Plan by the Recordkeeper in both quantitative and qualitative terms, (3) a third section (see, e.g., item 71c) summarizing the Plan's fees, and in particular the Plan's Feepoint, as compared to the fees in the Benchmark Group of Plans. In this way, the User 16 may easily and quickly assess the fees, costs, and value of the services provided to the Plan by the Recordkeeper as compared to the average Recordkeeper associated with the Benchmark Group of Plans.

Turning now to an evaluation of the TPA's services to the Plan, FIGS. 72 to 79 illustrate an exemplary evaluation of the fees, costs, and value of services provided by a TPA of the Plan compared to a representative Benchmark Group of Plans. As can be seen in this exemplary embodiment, the TPA's services may be reported in the same way based on the same analytical methods as may be used for evaluating the Recordkeeper's services.

Turning now to an evaluation of the Advisor/Consultant's services to the Plan, FIGS. 80 to 91 illustrate an exemplary evaluation of the fees, costs, and value of services provided by an Advisor/Consultant of the Plan compared to a representative Benchmark Group of Plans.

The first step in one embodiment of system 300 is to determine which of the predetermined one of the Benchmark Groups of Plans that is stored in database 90 is most pertinent to the evaluation of the services of the Advisor/Consultant of a given Plan.

FIG. 81, for example, illustrates that Plan Assets, Plan Type, diversity of Advisor/Consultant and diversity of Recordkeeper may be used as a basis to predetermine a plurality of Benchmark Groups of Plans that reside in database 90, waiting to be recalled when User 16 wants to evaluate the Advisor/Consultant's services of a given Plan. More particularly, FIG. 81 shows that the Plan being evaluated has just over $12.4M in plan assets, as shown at item 81a, which lies between a $10.0M to $15M range of plan assets in the Benchmark Group of Plans, as shown at items 81b and 81c, respectively. Item 81d shows that the Plan is a 401(k) Plan and item 81e shows that there are 306 401(k) plans in the Benchmark Group of Plans. Item 81f shows that 201 different Advisor/Consultant firms are represented in the Benchmark Group of Plans and that 273 different Advisor/Consultants are represented in the Benchmark Group of Plans (see, e.g., item 81g) in database 90. In addition, item 81h shows that 58 different Recordkeepers are represented in the Benchmark Group of Plans across 5 different business models, and item 81i shows that 325 different plans are represented in the Benchmark Group of Plans according to percent per type of business model. Thus, the predetermined one of the Benchmark Groups of Plans to be used as a comparison to a given 401(k) Plan having approx. $12M in assets is a Benchmark Group of 401(k) Plans having between $10M and $15M in assets and which is represented by 201 different Advisor/Consultant firms, 273 different Advisor/Consultants, and 58 different Recordkeepers across 5 different business models.

The next step in one embodiment of system 300, as shown in the exemplary report of FIG. 82, is to evaluate the quality of the services provided by the Advisor/Consultant to the Plan. FIG. 82 illustrates one embodiment of the factors that may be considered when evaluating the quality of an Advisor for a Plan, which may include characteristics of the Advisor serving the Plan, the services/processes they execute on behalf of the Plan Sponsor and their Participants as well as the people/technology/resources they have at their disposal to execute those services/processes. FIG. 82 provides a framework for the Plan Sponsor to evaluate the Advisor, which has been suggested by prior U.S. Department of Labor rulings.

The next step in one embodiment of system 300, as shown in the exemplary report of FIG. 83, is to assess the scope of services provided to the Plan by the Advisor/Consultant. FIG. 83 shows, for example, the different categories of services provided to the Plan (see e.g., item 83a referring to, for example, investment services, vendor management services, plan management services, and Participant services), as well as how those categories of services compares to the Benchmark Group of Plans (see, e.g., item 81b, referring to, for example, the side by side bars and numeric values attributed to each service category of the Plan and the Benchmark Group of Plans). FIG. 83 further shows which of the plurality of services within each service category is provided to the Plan (see, e.g., item 83c) and how such services impact the cost to the Plan relative to one another.

FIG. 84 shows a more detailed analysis of the services provided to the Plan by the Advisor/Consultant. For example, each service within each of the service categories (see, e.g. numbers in column 84a) is quantified by multiplying a number of units associated with each service by an estimated measure of difficulty to provide each service to result in a number of points for each service (see, e.g., numbers in column 84b), wherein the relative measure of difficulty is defined by assigning a multiplier to each of the services, the multiplier representing an effort to provide each service relative to the other services, and where the scope of services results in a 95% statistical confidence in the quantified plurality of services for the Benchmark Group and a 100% statistical confidence in the quantified plurality of services for the Plan. The points computed for each service can be compared to the points associated with each such service in the Benchmark Group of Plans, as shown in column 84c of FIG. 84.

The next step in one embodiment of system 300, as shown in the exemplary report of FIG. 85, is to assess the value of the services provided to the Plan by the Advisor/Consultant. The value of the services provided to the Plan can be assessed as two components, a first value component delivered to the Plan Sponsor, and a second value component delivered to the Plan Participants. The first value component comprises a score associated with a plurality of service categories comprising at least one of investment services, vendor management services, and plan management services (see, e.g., item 85a), each of the plurality of service categories being quantified by allocating a constant sum of units across each of the plurality of service categories according to whether the service is a best practice to the Plan Sponsor of the Plan, and comparing the quantity of the constant sum of units of at least one of the category of services to the quantity of the constant sum of units of the same services associated with the Benchmark Group of Plans, resulting in a 100% statistical confidence in the first value component of the Plan for each service category and a 95% statistical confidence in the first value component of the Benchmark Group of Plans (see, e.g., item 85*a*).

The second value component of services provided by the Advisor/Consultant to the Participants of the Plan (see, e.g., iem 85*b*) is based on the NAICS code associated with the Plan. The second value component is quantified by calculating current projected retirement balances for the Plan, projected retirement balances for an applicable NAICS industry associated with the Plan, and prior projected retirement balances for the Plan, all for an average participant in the Plan, by:
  (a) approximating the average wage of a workforce according to the NAICS wage data for an industry associated with the Plan,
  (b) using the average account balance of all Participants in the Plan,
  (c) using the average deferral percent of all participants in the selected retirement plan or an average deferral percent for the NAICS industry,
  (d) using an average employer contribution for the selected retirement plan,
  (e) using the industry rate of return adjusted for more or less assets in automatically diversified options, and
  (f) adding all of the foregoing projected balances to produce a total projected balances at retirement for all participants in Plan.

The foregoing followed by allowing the user to display one of three different outputs for this second value component as follows:
  (a) if the comparison of the total project balances for the Plan is greater than the projected balances for the NAICS industry plan, a bar chart is displayed comparing the results;
  (b) if the comparison of the total project balances for the Plan is less than the projected balances for the NAICS industry plan, a text paragraph encouraging the improvement of these Participant Success Measures is displayed;
  (c) if the comparison of the total project balances for the Plan is less than the prior projected balances for the NAICS industry plan, a bar chart is compared displaying the results.

The next step in one embodiment of system 300, as shown in the exemplary report of FIGS. 86 to 88, is to evaluate the fees paid to the Advisor/Consultant for the services provided to the Plan and compare those fees for those services against the average Plan in the Benchmark Group of Plans.

FIG. 86 provides an assessment of the source of all fees, payments, and credits associated with the Plan (see, e.g., 86*a*). FIG. 86 also shows the use of a predictive model comprising a power series regression analysis to estimate a base fee for the Advisor/Consultant, and market-based adjustments to the base fee reflecting unique fiduciary services, meetings or extra hours provided by the Advisor/Consultant to the Plan at market rates for such services (see, e.g., 86*b*) resulting in a Feepoint, and comparing the adjusted fees of the Plan (i.e., the Feepoint) to the adjusted fees associated with the Benchmark Group of Plans (see, e.g., 86*c*).

FIGS. 87 to 88 show the Advisor/Consultant's fees, in percent, in relation to the Plan investments (see, e.g., 87*a*, 88*a*), and how those fees compare to various percentiles in the Benchmark Group of Plans (see, e.g., 87*b*, 88*b*).

Turning to FIG. 89 there is shown a summary of the evaluation of the services provided to the Plan by the Advisor/Consultant comprising (1) a first section (see, e.g., item 89*a*) summarizing the Plan's assets and other characteristics as compare to the Benchmark Group of Plans, (2) a second section (see, e.g., item 89*b*) summarizing the quality, scope, and value of services provided to the Plan by the Advisor/Consultant in both quantitative and qualitative terms, (3) a third section (see, e.g., item 89*c*) summarizing the Plan's fees, and in particular the Plan's Feepoint, as compared to the fees in the Benchmark Group of Plans. In this way, the User 16 may easily and quickly assess the fees, costs, and value of the services provided to the Plan by the Advisor/Consultant as compared to the average Advisor/Consultant associated with the Benchmark Group of Plans.

While specific embodiments of the present disclosure have been described in detail, it will be appreciated by those skilled in the art that various modifications and alternatives to those details could be developed in light of the overall teachings of the disclosure. Accordingly, it should be understood that modifications and variations may be effected without departing from the scope of the novel concepts of the present disclosure, and it should be understood that this application is to be limited only by the scope of the appended claims.

What is claimed is:

1. A method of evaluating an advisor of a selected retirement plan, comprising the steps of:
  operating one or more load balancing web servers behind a first firewall;
  operating one or more application web servers behind a second firewall that is behind the first firewall;
  operating an XML database behind the second firewall and downstream of the one or more application web servers, the XML database being in communication with the one or more application web servers and the one or more application web servers being in communication with the one or more load balancing web servers, the XML database comprising plan data of the selected retirement plan in XML format and other plan data of other retirement plans in XML format, wherein the XML-formatted plan data and the other plan data numerically define numerical and non-numerical characteristics of the selected plan and of the other retirement plans;
  responsive to receiving an HTTP request from a user's web browser by a first processor at one of the one or more load balancing web servers, automatically performing in real-time the steps of:
    (i) electronically transmitting the HTTP request from the first processor to a second processor at one of the one or more application web servers;
    (ii) selecting by the second processor a comparison group from the other retirement plans stored in the XML database based on the characteristics of the selected retirement plan;
    (iii) generating by the second processor a numerical scope-of-services comparison for first service categories between a scope of services provided by the advisor of the selected retirement plan and scopes of services provided by advisors of the comparison group, wherein automatically generating the scope-of-services comparison includes automatically quantifying, via the second processor, each of the first service categories based on numerically assigned levels of difficulty of services provided by the advisor within each of the first service categories;

(iv) determining by the second processor a numerical first value component for services provided by the advisor to a plan sponsor of the selected retirement plan, the first value component comprising percentile scores, relative to respective industry averages, for second service categories as provided by the advisor, each of the second service categories comprising one or more services, each of the services of the second service categories being quantified based on whether the service is a best practice for the plan sponsor of the selected retirement plan;

(v) determining by the second processor a numerical second value component of services provided by the advisor based on projected account balances for an average account balance of an average participant in the selected retirement plan;

(vi) generating by the second processor a numerical advisor-value comparison of advisor-value delivered by the advisor of the selected retirement plan relative to industry averages, the advisor-value delivered by the advisor being quantified by the first value component and the second value component;

(vii) generating by the second processor a numerical fee comparison between a fee component of the advisor of the selected retirement plan and a fee component of advisors' fees of the comparison group, the fee component of the advisor comprising a base fee that is determined based on power series regression and market-based adjustments;

(viii) creating by the second processor a user-customizable, electronically displayable report in PDF format or HTML format that presents a visual summary of the scope-of-services comparison, the advisor-value comparison, and the fee comparison for the advisor of the plan sponsor of the selected retirement plan; and (ix) electronically delivering by the first processor the report to the user's web browser to provide proof of meeting fiduciary objectives for the selected retirement plan.

2. The method of claim 1, wherein, prior to automatically selecting the comparison group of retirement plans, automatically predetermining, via the second processor, a customized plurality of potential comparison groups based on the other data of the other retirement plans, each of the potential comparison groups being defined by at least one of plan assets, plan type, diversity of advisors, and diversity of recordkeepers.

3. The method of claim 2, wherein the comparison group is defined by and selected based on the at least one of plan assets, plan type, diversity of advisors, and diversity of recordkeepers.

4. The method of claim 3, wherein the first service categories comprise at least one of investment services, vendor management services, plan management services, and participant services, each of the first service categories comprising one or more services.

5. The method of claim 4, wherein the second service categories comprise at least one of investment services, vendor management services, and plan management services.

6. The method of claim 1, wherein each service of the first service categories is quantified such that there is a 100% statistical confidence in each of the first service categories for the selected retirement plan and a 95% statistical confidence in each of the first service categories for the comparison group.

7. The method of claim 6, wherein each of the second service categories is quantified such that there is a 100% statistical confidence in each of the second service categories for the selected retirement plan and a 95% statistical confidence in each of the second service categories for the comparison group.

8. The method of claim 1, wherein the projected account balances utilized to automatically determine the second value component are based on a NAICS code of the selected retirement plan.

9. The method of claim 8, wherein the projected account balances of the average account balance of the average participant in the selected retirement plan are based on current, prior, and NAICS industry data to Social Security Normal Retirement Age, wherein the projected account balances include one or more of an average wage of participants in the NAICS code for the selected retirement plan, an average account balance of all participants in the selected retirement plan, an average deferral percentage of all participants in the selected retirement plan, an employer contribution for each participant in the selected retirement plan, an industry rate of return adjusted according to a number of assets in automatically diversified options as well as for a participation rate associated with the selected retirement plan.

10. The method of claim 1, wherein the market-based adjustments that are utilized to determine the base fee correspond with one or more of fiduciary services, meetings, and extra hours provided by the advisor for the selected retirement plan at market rates for such services.

11. The method of claim 1, wherein the step of quantifying each of the first service categories includes
 a. allocating a first constant sum of units across the services of each of the first service categories,
 b. applying a first weight factor to a most difficult service and a second weight factor to a least difficult service, and
 c. interpolating between the weighted most difficult and the weighted least difficult services.

12. The method of claim 1, wherein the step of automatically determining the first value component comprises calculating the percentile scores, relative to the respective industry averages by
 a. allocating a second constant sum of units across the services of each of the second service categories according to an assessment of whether each of the services is a best practice for the plan sponsor of the selected retirement plan, and
 b. comparing a quantity of the second constant sum of units of at least one of the second service categories to the quantity of the second constant sum of units of the same services of the comparison group.

13. The method of claim 12, wherein the step of calculating the percentile scores for the first value component includes calculating the percentile scores to achieve a 100% statistical confidence in the first value component of the selected retirement plan for each of the second service categories and a 95% statistical confidence in the first value component of the comparison group.

14. The method of claim 1, wherein the step of creating the electronically displayable report includes generating, in real-time via the second processor, a qualitative comparison report that includes a qualitative comparison of at least one quality of the advisor of the selected retirement plan, the at least one quality including characteristics of the advisor of the selected retirement plan, services executed by the advisor for the plan sponsor and participants of the selected retirement plan, and resources available to the advisor for executing the services.

15. The method of claim 9, wherein the second value component is quantified by calculating, for the average participant in the selected retirement plan, current projected retirement balances for the selected retirement plan, projected retirement balances for an applicable NAICS industry associated with the selected retirement plan, prior projected retirement balances for the selected retirement plan, and total projected balances at retirement for all participants in the selected retirement plan based on
 i. an approximation of an average wage of a workforce according to the NAICS wage data for an industry associated with the selected retirement plan,
 ii. the average account balance of all participants in the selected retirement plan,
 iii. the average deferral percent of all participants in the selected retirement plan or an average deferral percent for the NAICS industry,
 iv. an average employer contribution for the selected retirement plan, and
 v. the industry rate of return adjusted for more or less assets in automatically diversified options.

16. A system for evaluating an advisor of a selected retirement plan, comprising:
 a. one or more web servers configure to
  (i) receive plan data of the selected retirement plan, and
  (ii) receive a report request from a user;
 (b) middleware memory configured to temporarily store the plan data of the selected retirement plan;
 (c) one or more database service including a database configured to store
  (i) the plan data of the selected retirement plan, and
  (ii) other plan data of other retirement plans; and
 (d) a batch processor configured to
  (i) electronically transmit the plan data from the middleware memory to the database of the one or more database servers,
  (ii) responsive to receipt of the report request, automatically select, in real-time, a comparison group from the other retirement plans stored in the database based on characteristics of the plan data of the selected retirement plan,
  (iii) automatically generate, in real-time, a scope-of-services comparison for first service categories between a scope of services provided by the advisor of the selected retirement plan and scopes of services provided by advisors of the comparison group, wherein, to automatically perform the scope-of-services comparison, the batch processor is configured to quantify each of the first service categories based on assigned levels of difficulty of services provided by the advisor within each of the first service categories,
  (iv) automatically determine, in real-time, a first value component for services provided by the advisor to a plan sponsor of the selected retirement plan, the first value component comprising percentile scores, relative to respective industry averages, for second service categories as provided by the advisor, each of the second service categories comprising one or more services, wherein the batch processor is configured to quantify each of the services of the second service categories based on whether the service is a best practice for the plan sponsor of the selected retirement plan,
  (v) automatically determine, in real-time, a second value component of services provided by the advisor based on projected account balances an average account balance of an average participant in the selected retirement plan,
  (vi) generate, in real-time, an advisor-value comparison of advisor-value delivered by the advisor of the selected retirement plan relative to industry averages, the advisor-value delivered by the advisor being quantified by the first value component and the second value component,
  (vii) automatically generate, in real-time, a fee comparison between a fee component of the advisor of the selected retirement plan and a fee component of advisors' fees of the comparison group, the fee component of the advisor comprising a base fee that the batch processor is configured to determine based on power series regression and market-based adjustments,
  (viii) create, in real-time, a user-customizable, electronically displayable report that presents a visual summary of the scope-of-services comparison, the advisor-value comparison, and the fee comparison for the advisor of the plan sponsor of the selected retirement plan, and
  (ix) electronically deliver, in real-time, the report to a user interface to provide proof of meeting fiduciary objectives for the selected retirement plan.

17. The system of claim 16, wherein, to quantify the second value component, the batch processor is configured to calculate, for the average participant in the selected retirement plan, current projected retirement balances for the selected retirement plan, projected retirement balances for an applicable NAICS industry associated with the selected retirement plan, prior projected retirement balances for the selected retirement plan, and total projected balances at retirement for all participants in the selected retirement plan based on
 i. an approximation of an average wage of a workforce according to NAICS wage data for an industry associated with the selected retirement plan,
 ii. an average account balance of all participants in the selected retirement plan,
 iii. an average deferral percent of all participants in the selected retirement plan or an average deferral percent for the NAICS industry,
 iv. an average employer contribution for the selected retirement plan, and
 v. an industry rate of return adjusted for more or less assets in automatically diversified options.

18. The system of claim 17, wherein, to create the report, the batch processor is configured to
 i. automatically perform, in real-time, a first comparison between the total projected balances for the selected retirement plan and the projected balances for the NAICS industry,
 ii. automatically performing, in real-time, a second comparison between the total projected balances for the selected retirement plan and the prior projected balances for the NAICS industry,
 iii. responsive to the batch processor determining that the total projected balances for the selected retirement plan is greater than the projected balances for the NAICS industry, generating a first bar chart for the first comparison,
 iv. responsive to the batch processor determining that the total projected balances for the selected retirement plan is less than the projected balances for the NAICS industry, generating a text block encouraging an improved associated participant success measure, and
v. responsive to the batch processor determining that the total projected balances for the selected retirement plan is less than the prior projected balances for the NAICS industry, generating a second bar chart for the second comparison.

19. The system of claim 16, wherein to create, in real-time, the user-customizable, electronically displayable report, the batch processor is configured to convert the scope-of-services comparison, the advisor-value comparison, and the fee comparison from XML format to PDF format.

20. The system of claim 16, wherein to create, in real-time, the user-customizable, electronically displayable report, the batch processor is configured to convert the scope-of-services comparison, the advisor-value comparison, and the fee comparison from XML format to HTML format for viewing in a web browser.

21. The method of claim 15, wherein the step of creating the report includes
  a. automatically performing, in real-time via the second processor, a first comparison between the total projected balances for the selected retirement plan and the projected balances for the NAICS industry,
  b. automatically performing, in real-time via the second processor, a second comparison between the total project balances for the selected retirement plan and the prior projected balances for the NAICS industry,
  c. responsive to the second processor determining that the total projected balances for the selected retirement plan is greater than the projected balances for the NAICS industry, generating a first bar chart for the first comparison,
  d. responsive to the second processor determining that the total projected balances for the selected retirement plan is less than the projected balances for the NAICS industry, generating a text block encouraging an improved associated participant success measure, and
  e. responsive to the second processor determining that the total project balances for the selected retirement plan is less than the prior projected balances for the NAICS industry, generating a second bar chart for the second comparison.

22. The method of claim 11, wherein the step of interpolating between weighted scores for the most and least difficult services of the first service categories includes interpolating to achieve a 100% statistical confidence in the scope of services for each of the first service categories of the selected retirement plan and a 95% statistical confidence in the scope of services for each of the first service categories in the predetermined one of the comparison groups.

\* \* \* \* \*